United States Patent
Kendall et al.

(10) Patent No.: US 11,059,235 B2
(45) Date of Patent: Jul. 13, 2021

(54) RECONFIGURABLE MANUFACTURING SYSTEM AND METHOD FOR MANUFACTURING COMPOSITE LAMINATES

(71) Applicant: The Boeing Company, Chicago, IL (US)

(72) Inventors: James R. Kendall, Mt. Pleasant, SC (US); Raviendra S. Suriyaarachchi, Daniel Island, SC (US); Paul D. Shaw, Charleston, SC (US); Darrell D. Jones, Mill Creek, WA (US); Lance O. McCann, Seattle, WA (US)

(73) Assignee: The Boeing Company, Chicago, IL (US)

( * ) Notice: Subject to any disclaimer, the term of this patent is extended or adjusted under 35 U.S.C. 154(b) by 94 days.

(21) Appl. No.: 16/449,215

(22) Filed: Jun. 21, 2019

(65) Prior Publication Data

US 2020/0101677 A1  Apr. 2, 2020

Related U.S. Application Data

(63) Continuation-in-part of application No. 16/146,760, filed on Sep. 28, 2018, now abandoned.

(51) Int. Cl.
*B29C 65/00* (2006.01)
*B29C 65/56* (2006.01)
(Continued)

(52) U.S. Cl.
CPC ...... *B29C 66/02242* (2013.01); *B29C 65/562* (2013.01); *B29C 66/0326* (2013.01);
(Continued)

(58) Field of Classification Search
CPC ............ B29C 66/02242; B29C 65/562; B29C 66/0326; B29C 70/30; B32B 38/0004; B32B 38/1808
See application file for complete search history.

(56) References Cited

U.S. PATENT DOCUMENTS 7,137,182 B2  11/2006  Nelson
7,527,759 B2   5/2009  Lee et al.
(Continued)

FOREIGN PATENT DOCUMENTS

EP  2889127       7/2015
EP  2889127 A1 *  7/2015  ............. B64C 3/182

OTHER PUBLICATIONS

EPO, European Search Report for Appl. No. EP 19198297 dated Feb. 17, 2020.
(Continued)

*Primary Examiner* — Vishal I Patel

(57) ABSTRACT

A manufacturing system includes a first mandrel, a second mandrel, and laminate securing mechanisms. The first mandrel has a first mandrel surface and a first mandrel surface edge. The second mandrel has a second mandrel surface and a second mandrel surface edge, and is positionable in a closed position in which the first mandrel surface edge and the second mandrel surface edge are in contact to form a continuous mandrel surface collectively defined by the first mandrel surface and the second mandrel surface. The second mandrel translates to an open position defining a gap between the first mandrel surface edge and the second mandrel surface edge for receiving a forming die. The laminate securing mechanisms secure the composite laminate on at least one of the first mandrel and the second mandrel during trimming and/or forming of the composite laminate.

24 Claims, 52 Drawing Sheets

(51) Int. Cl.
*B29C 70/30* (2006.01)
*B32B 38/00* (2006.01)
*B32B 38/18* (2006.01)

(52) U.S. Cl.
CPC .......... *B29C 70/30* (2013.01); *B32B 38/0004* (2013.01); *B32B 38/1808* (2013.01)

(56) References Cited

U.S. PATENT DOCUMENTS

| | | |
|---|---|---|
| 7,655,168 B2 | 2/2010 | Jones et al. |
| 7,879,177 B2 | 2/2011 | McCowin et al. |
| 7,922,856 B2 | 4/2011 | Hagman et al. |
| 8,012,291 B2 | 9/2011 | Kisch et al. |
| 8,206,540 B2 | 6/2012 | Evans |
| 8,336,596 B2 | 12/2012 | Nelson et al. |
| 8,465,613 B2 | 6/2013 | Rotter et al. |
| 8,640,757 B2 | 2/2014 | McCowin et al. |
| 8,758,538 B2 | 6/2014 | Borgmann et al. |
| 8,808,490 B2 | 8/2014 | Hagman et al. |
| 9,399,338 B1 | 7/2016 | Metschan |
| 2006/0231981 A1* | 10/2006 | Lee ........................ B29C 33/307 264/320 |

OTHER PUBLICATIONS

Gulf States Patent Office, Examination Report for Appl. No. GC 2019-38345 dated Sep. 11, 2020.

* cited by examiner

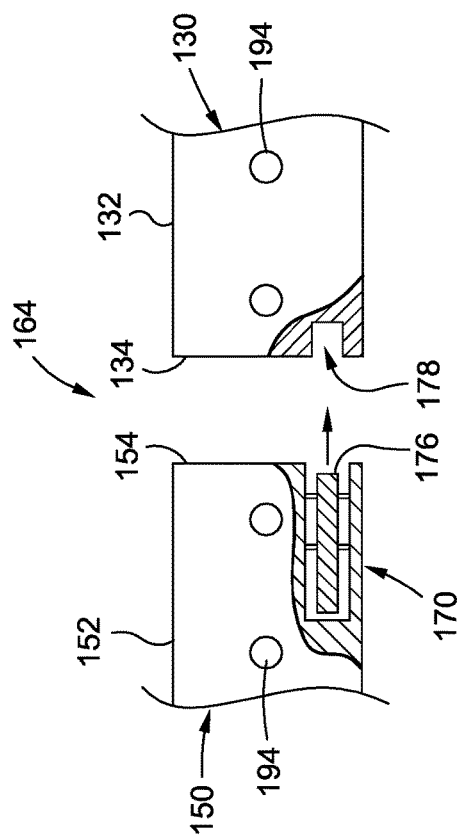
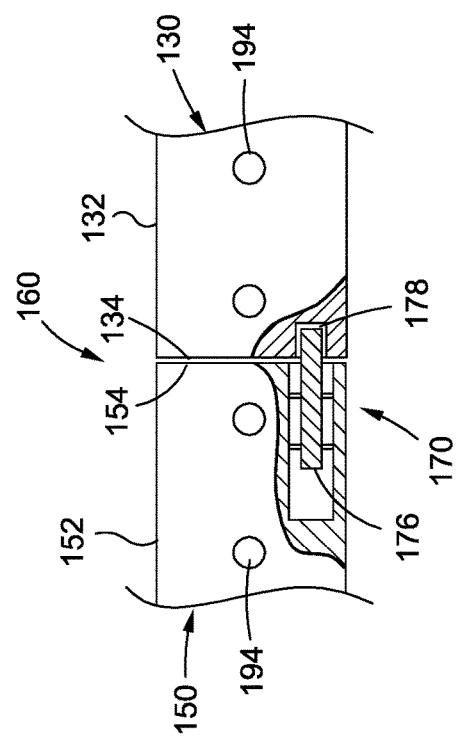

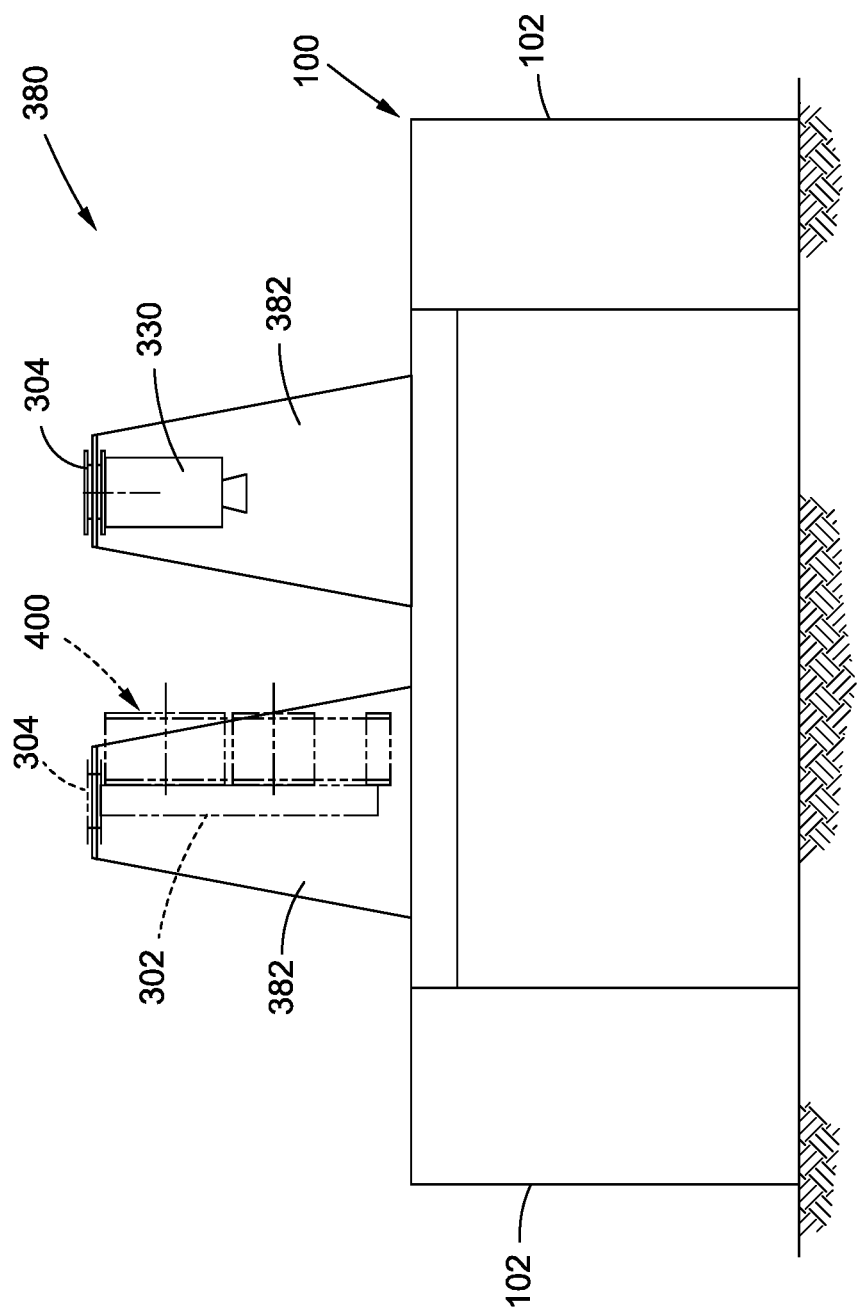

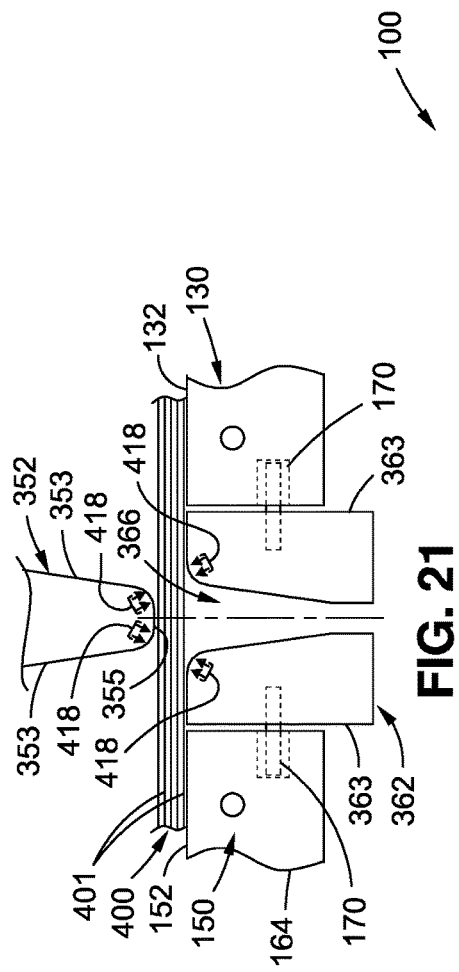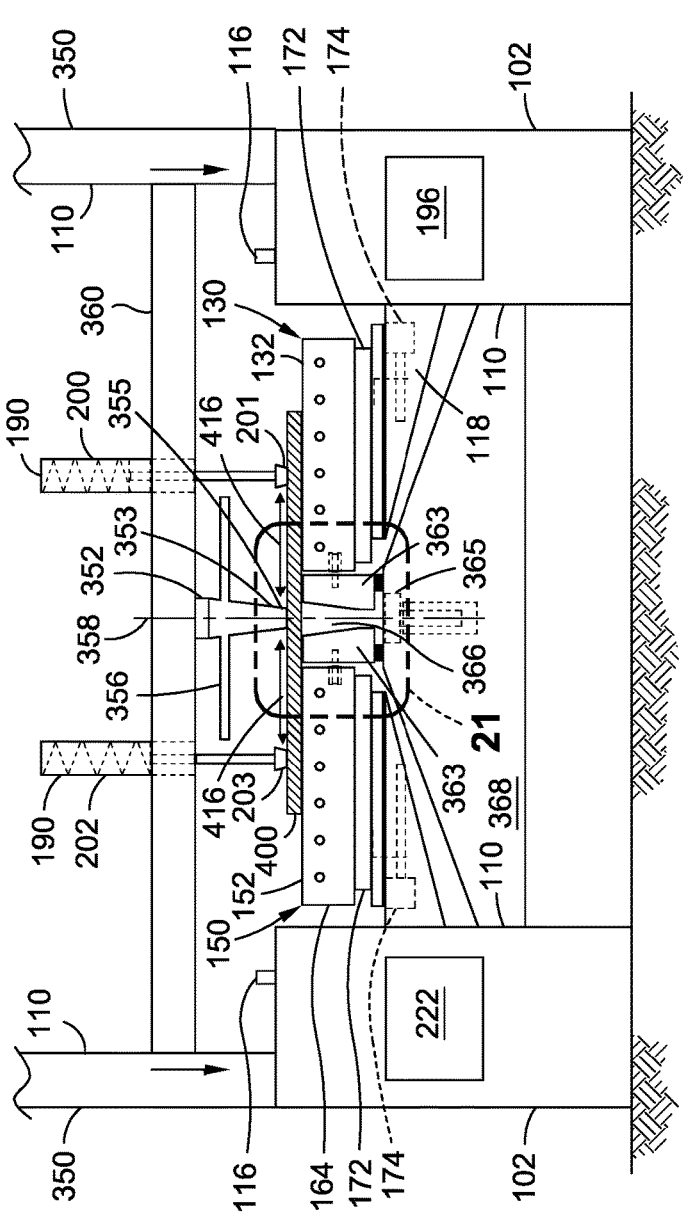

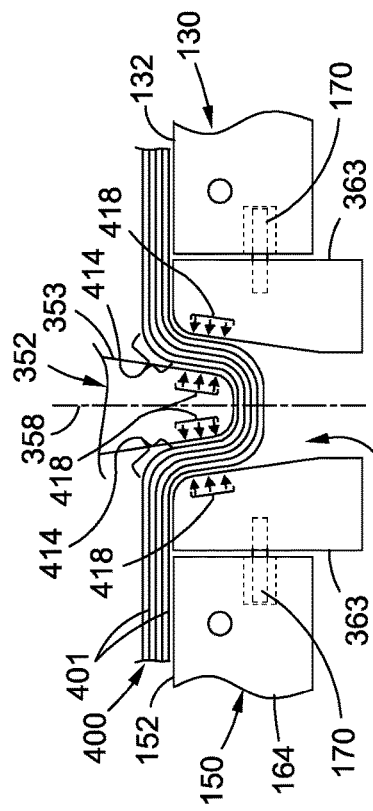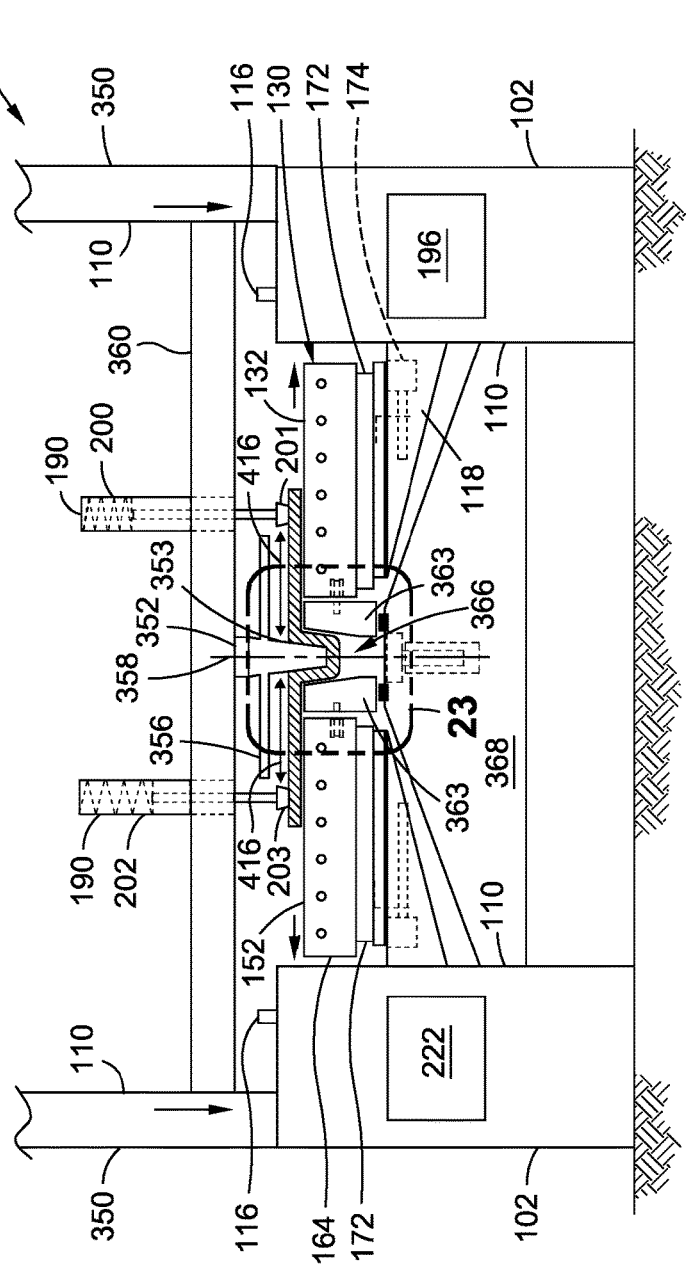

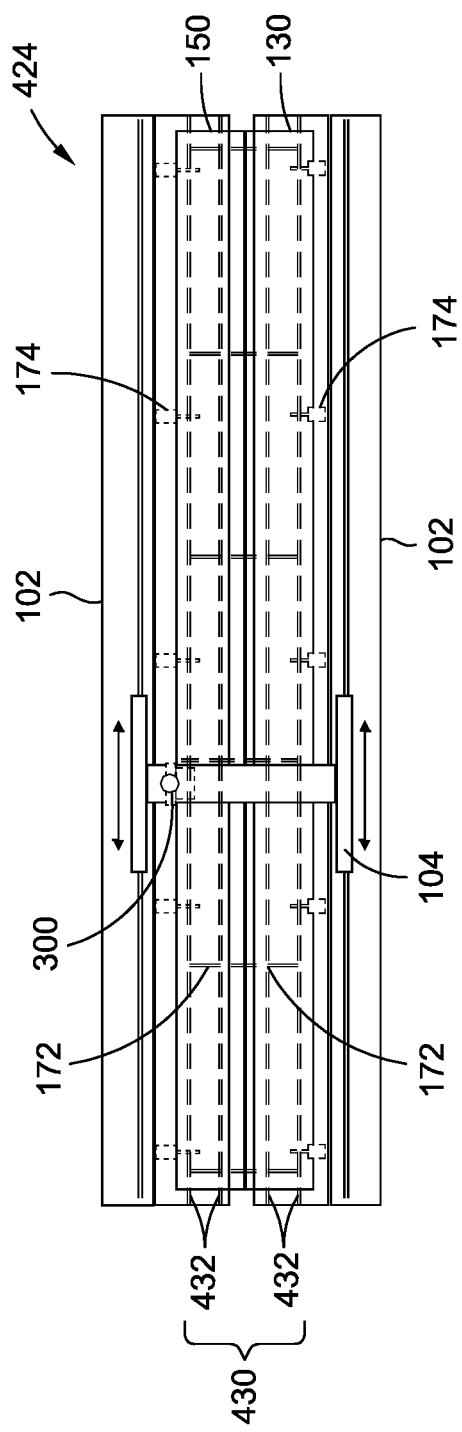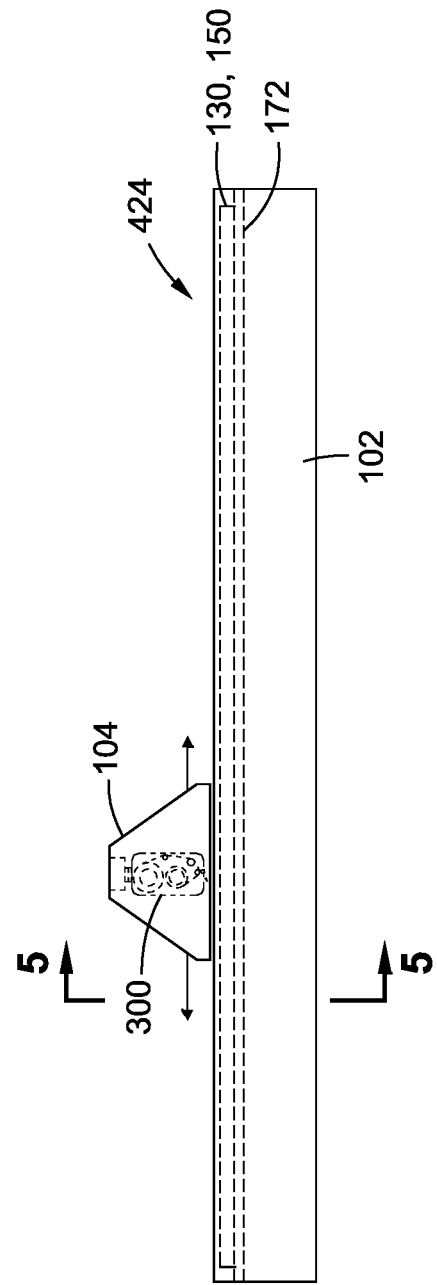

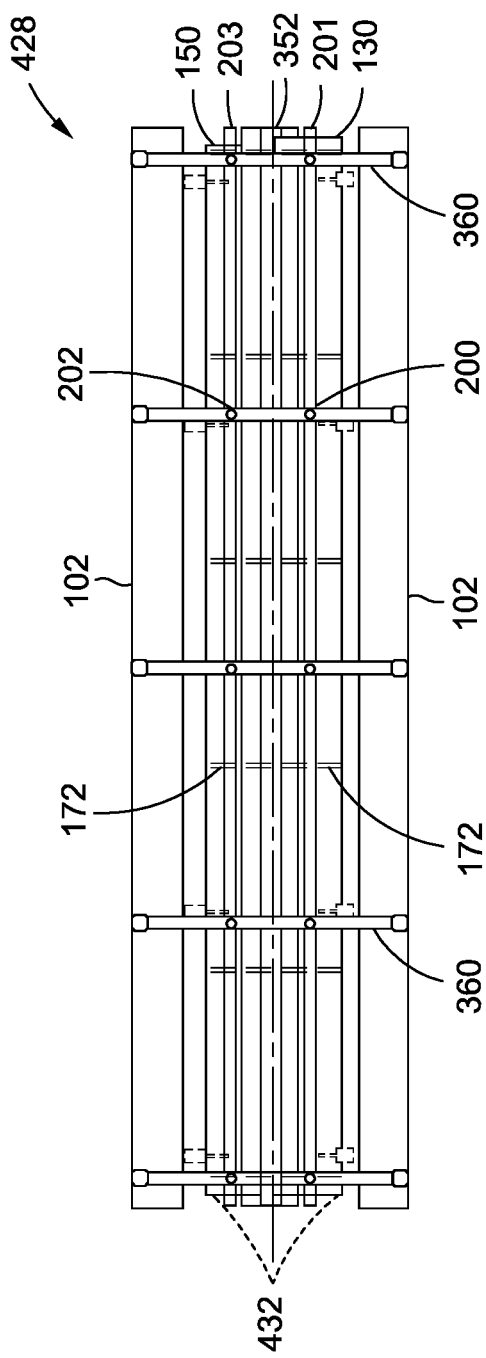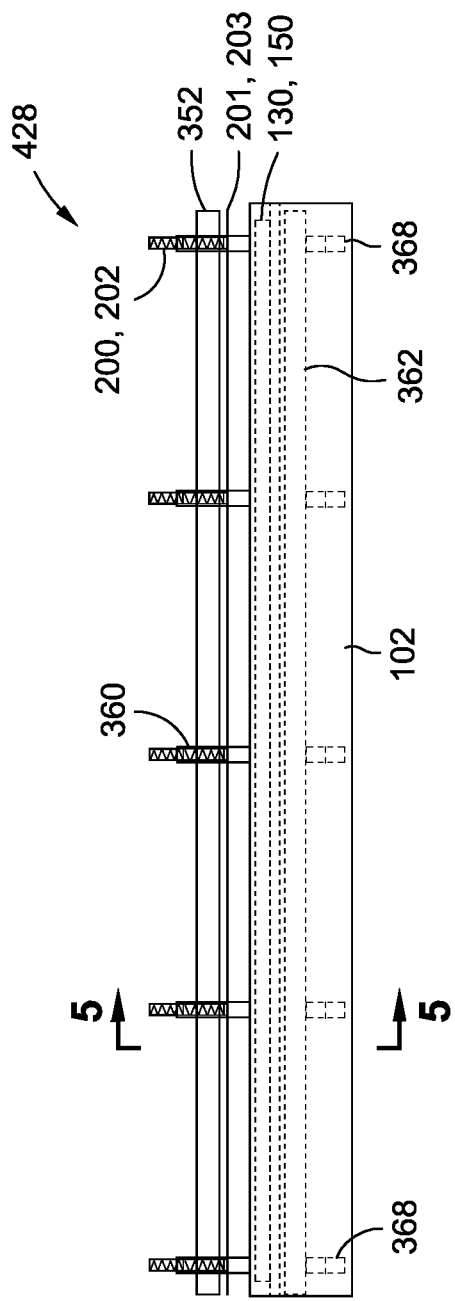

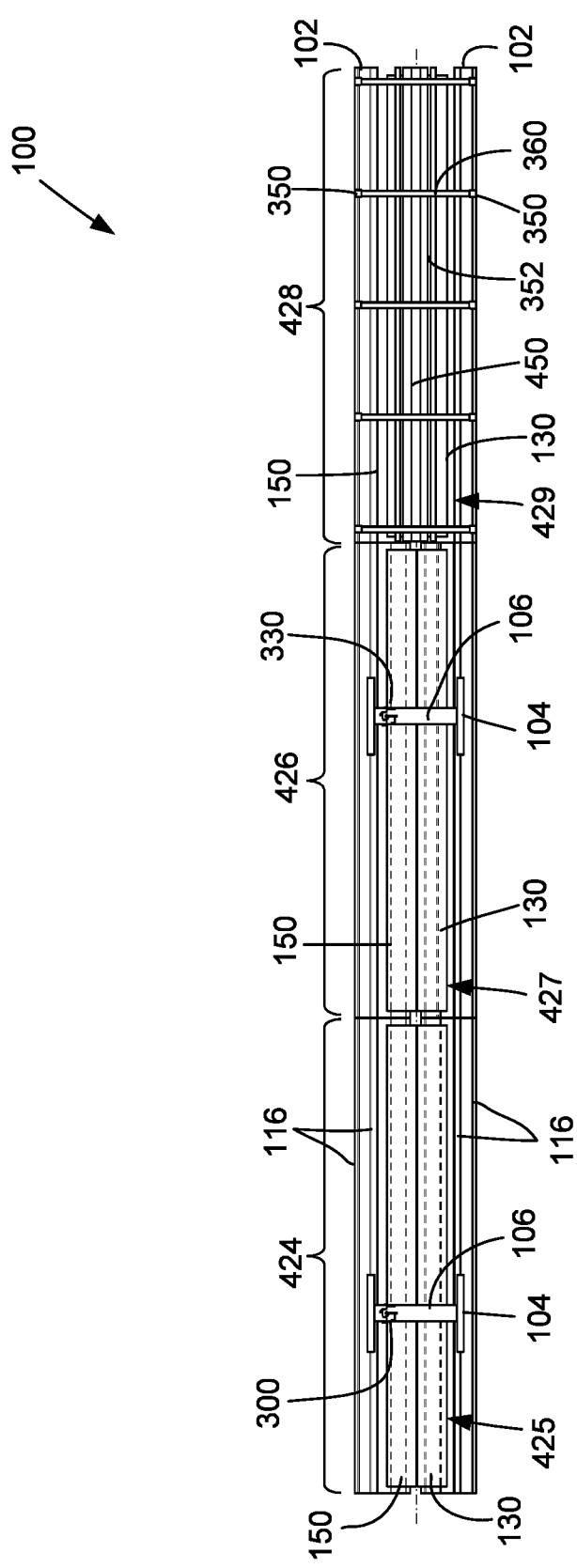
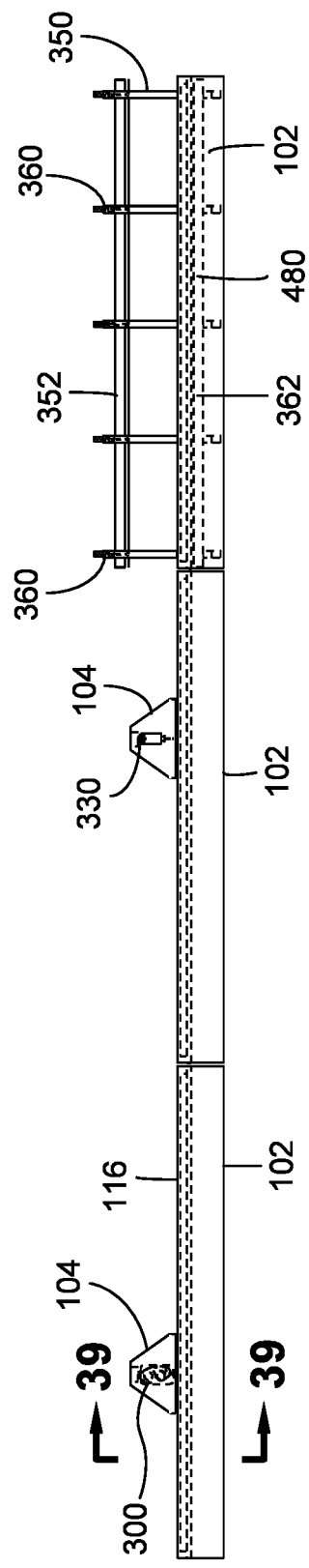

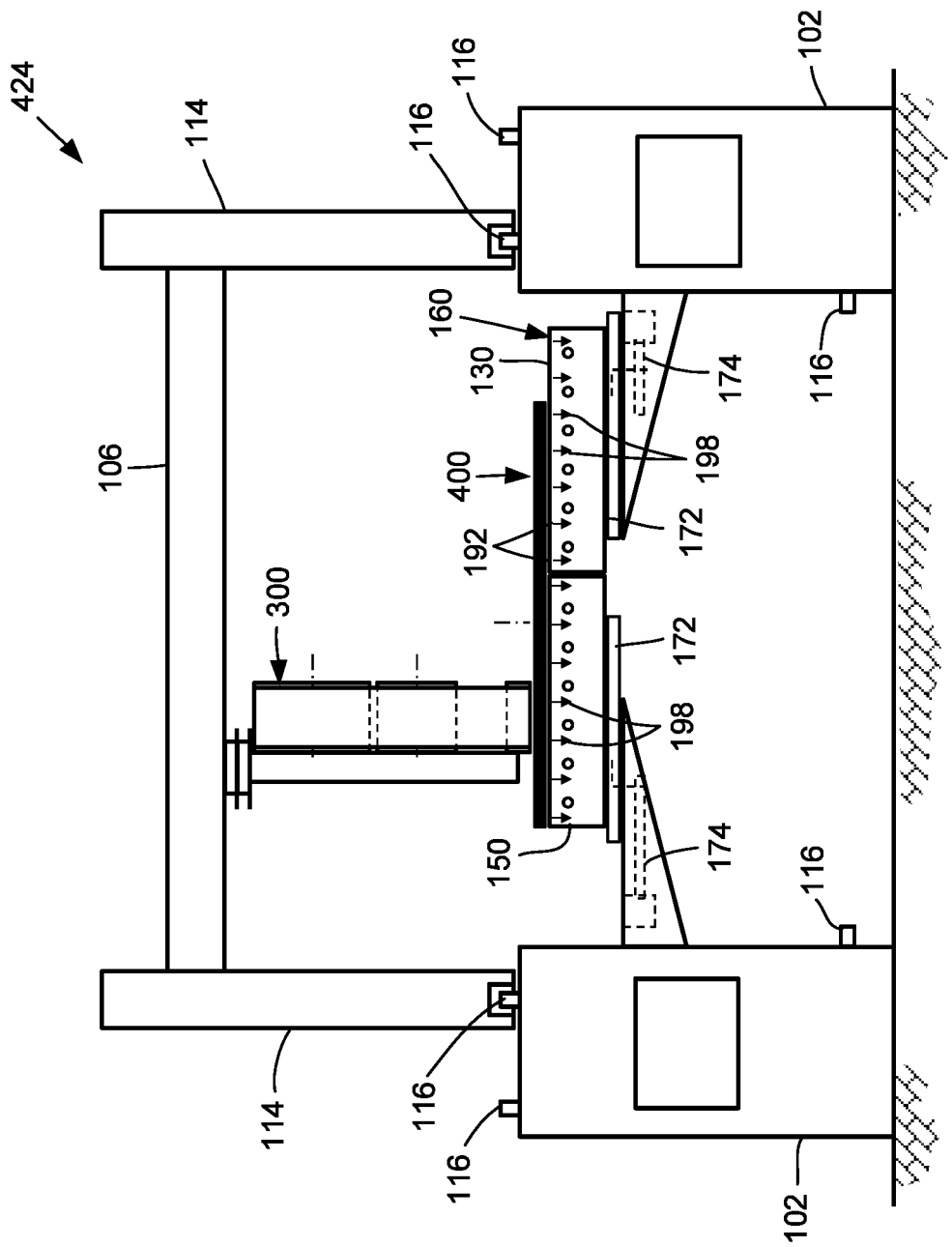

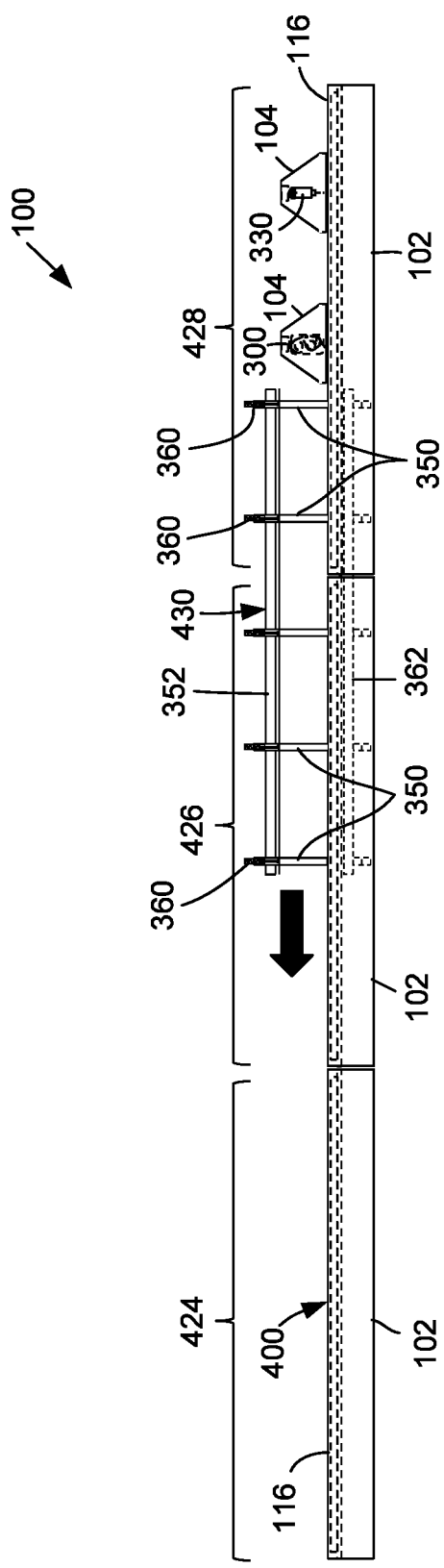
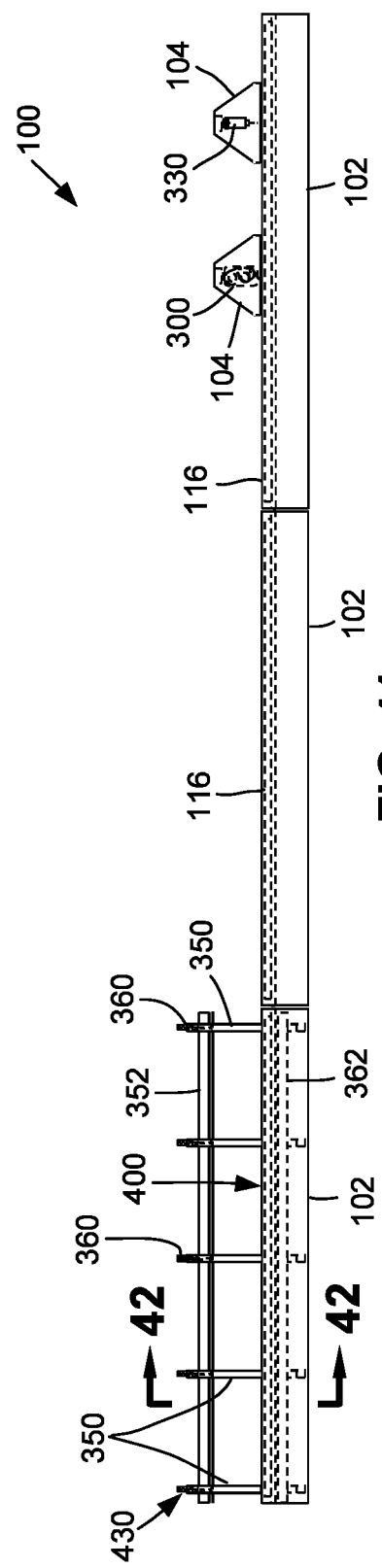

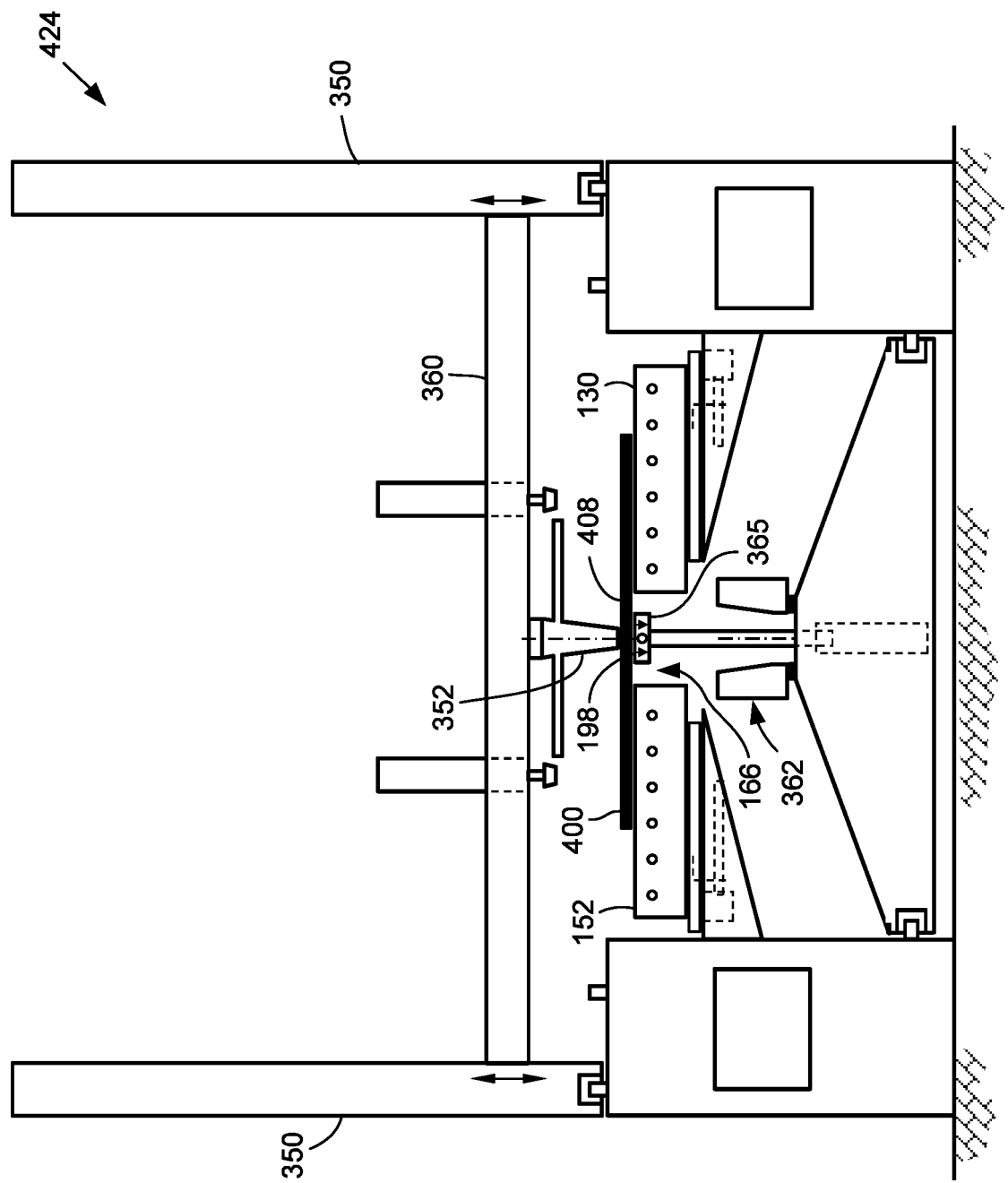

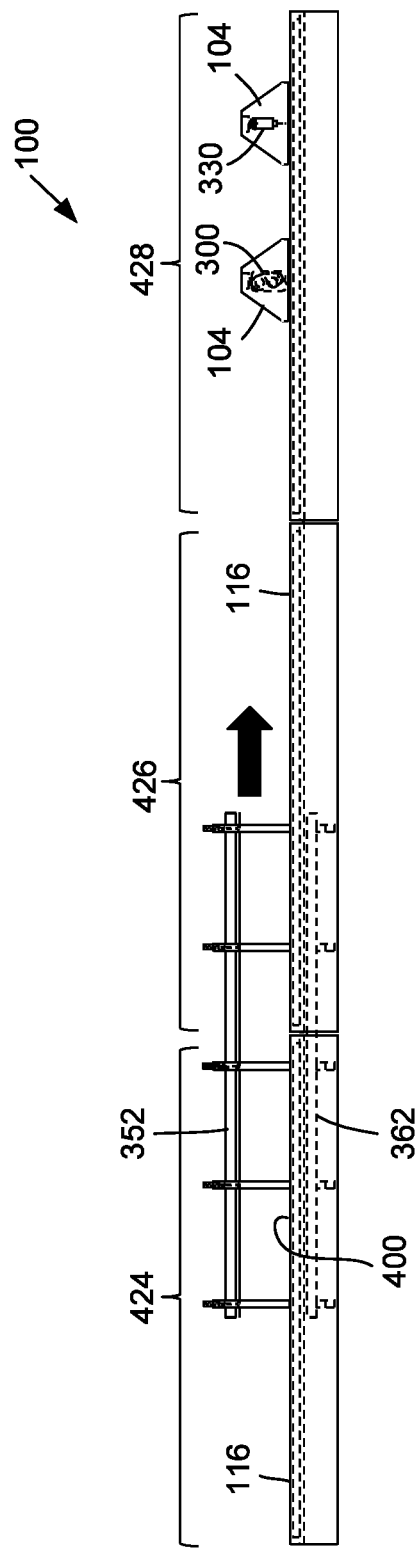
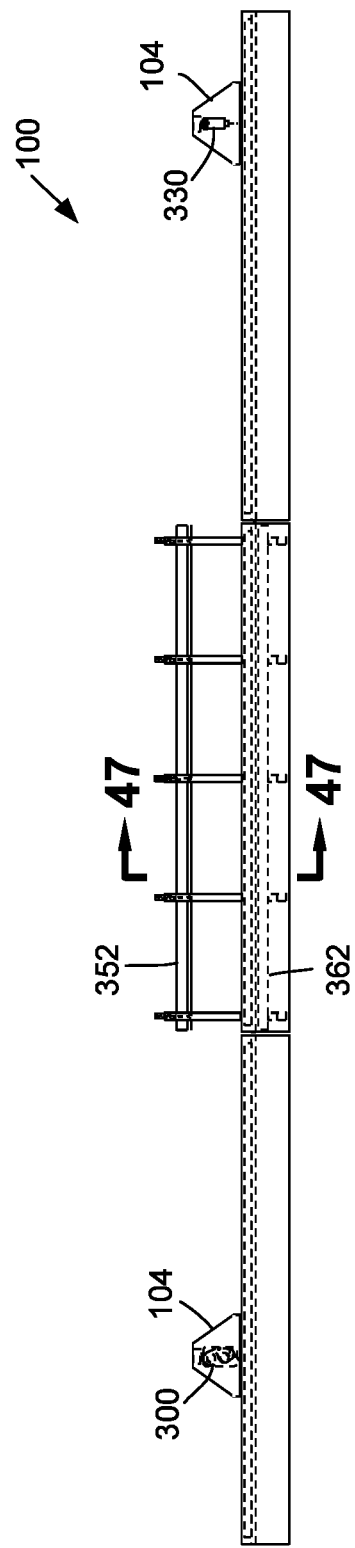

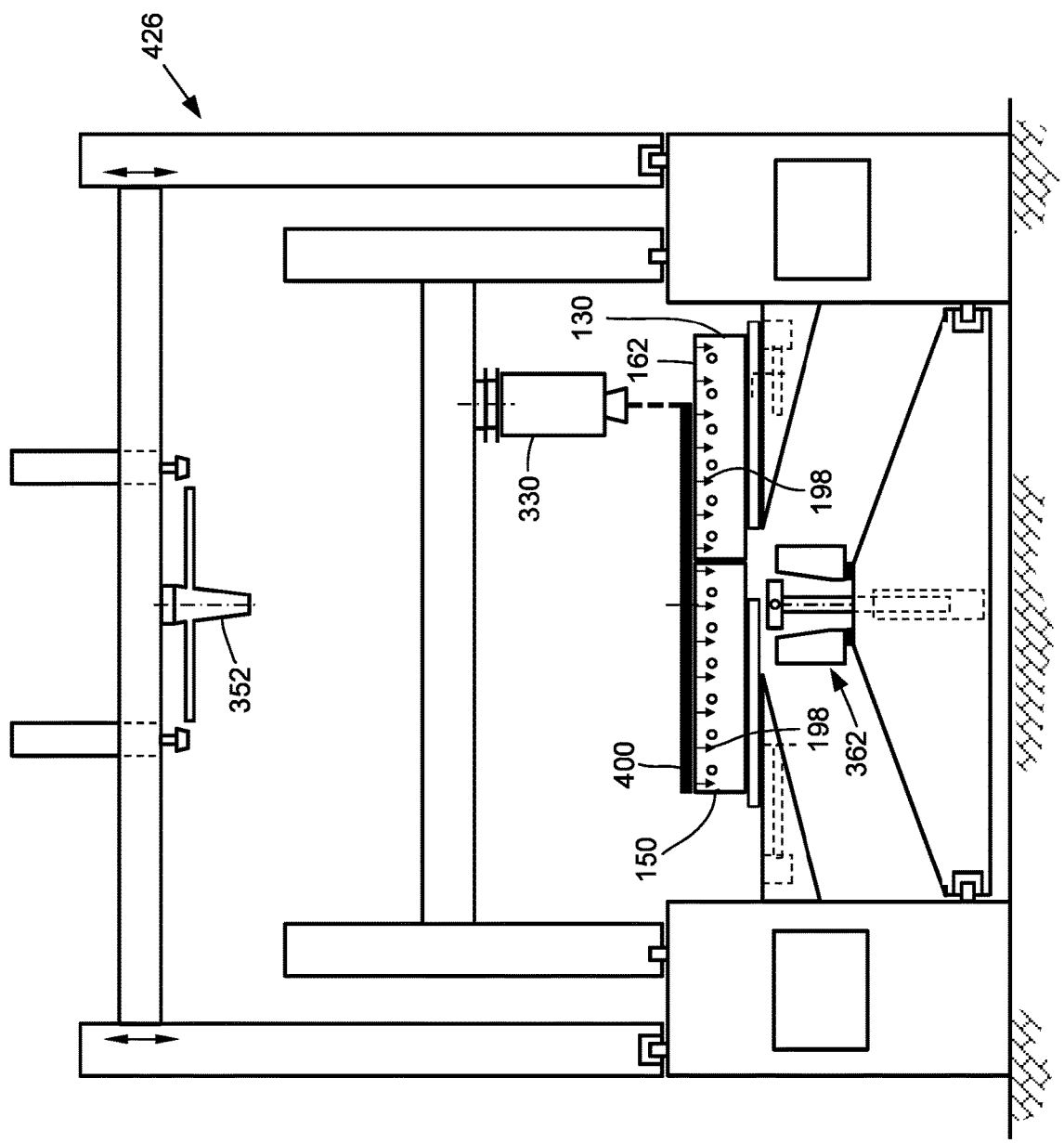

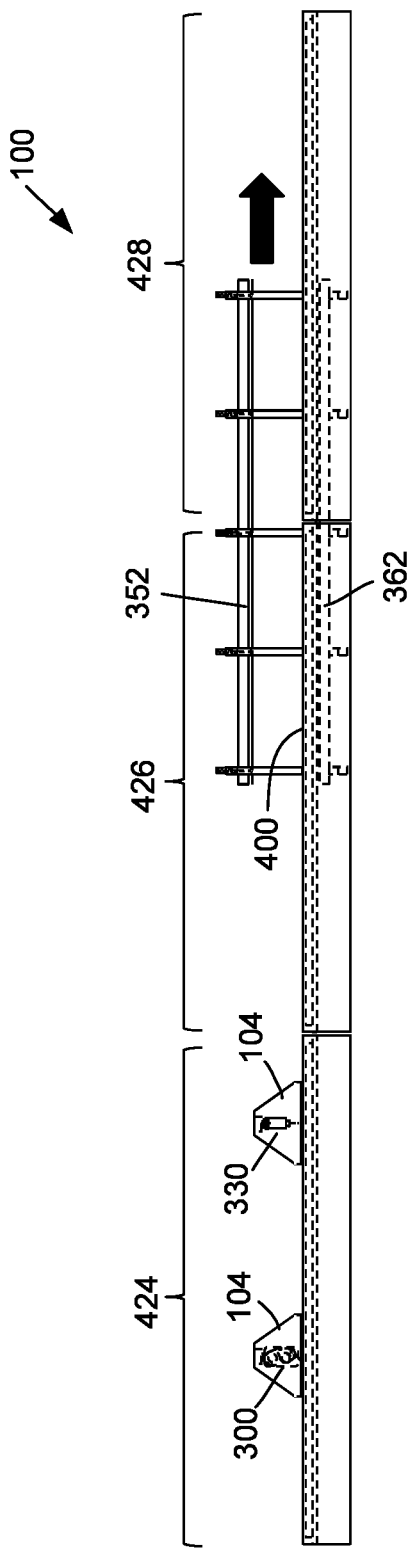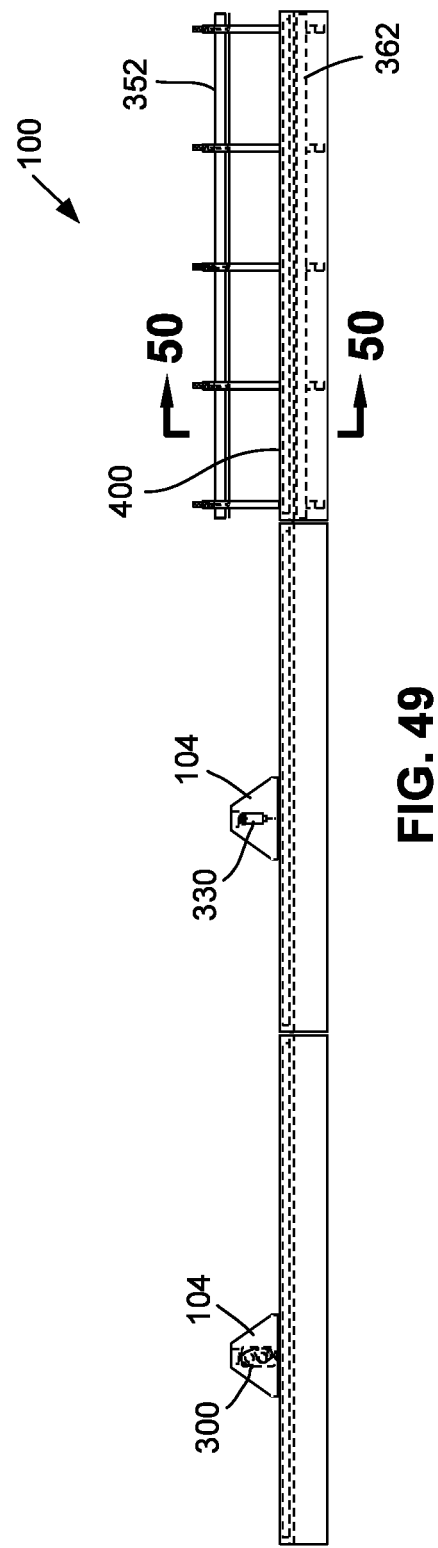

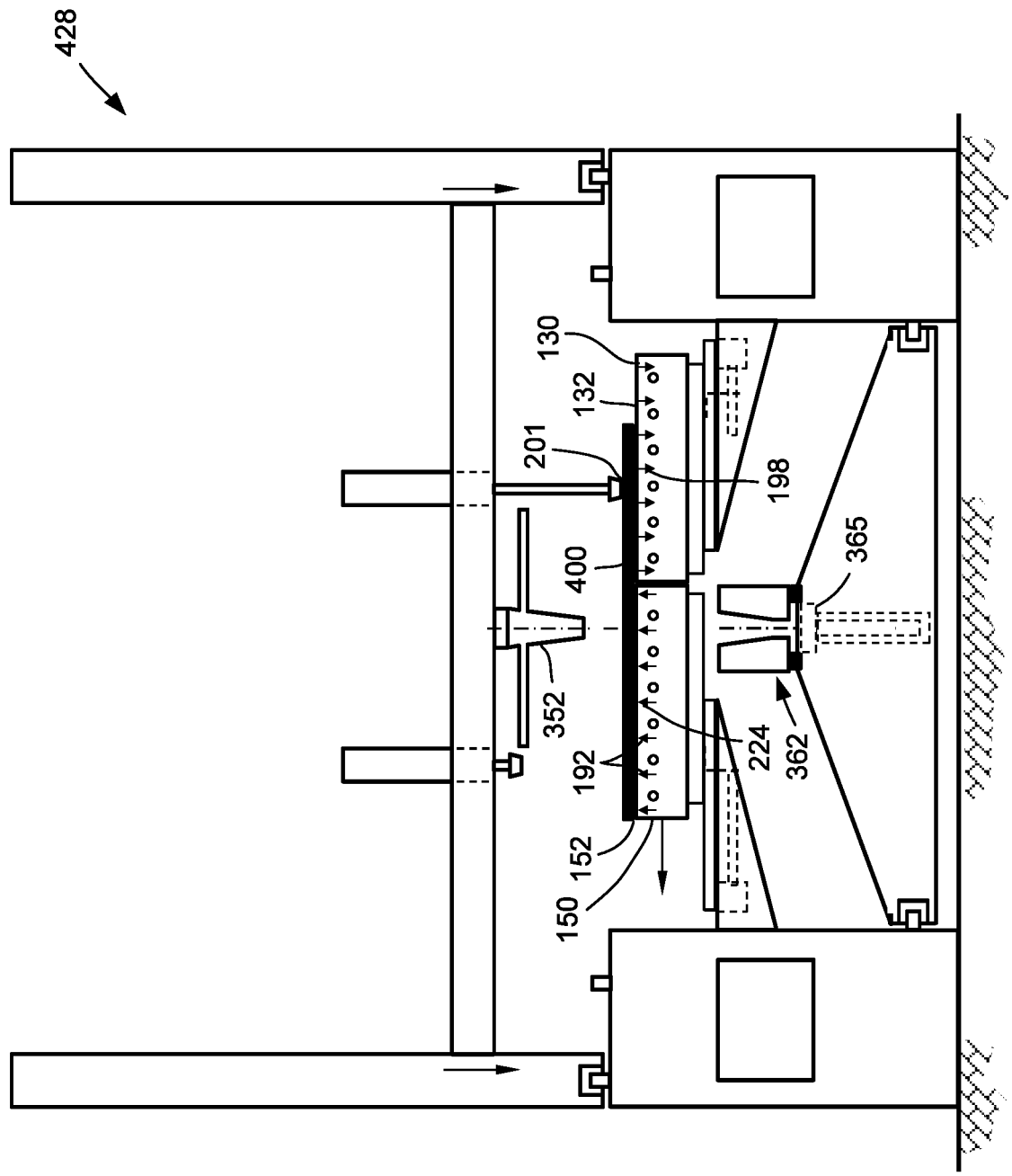

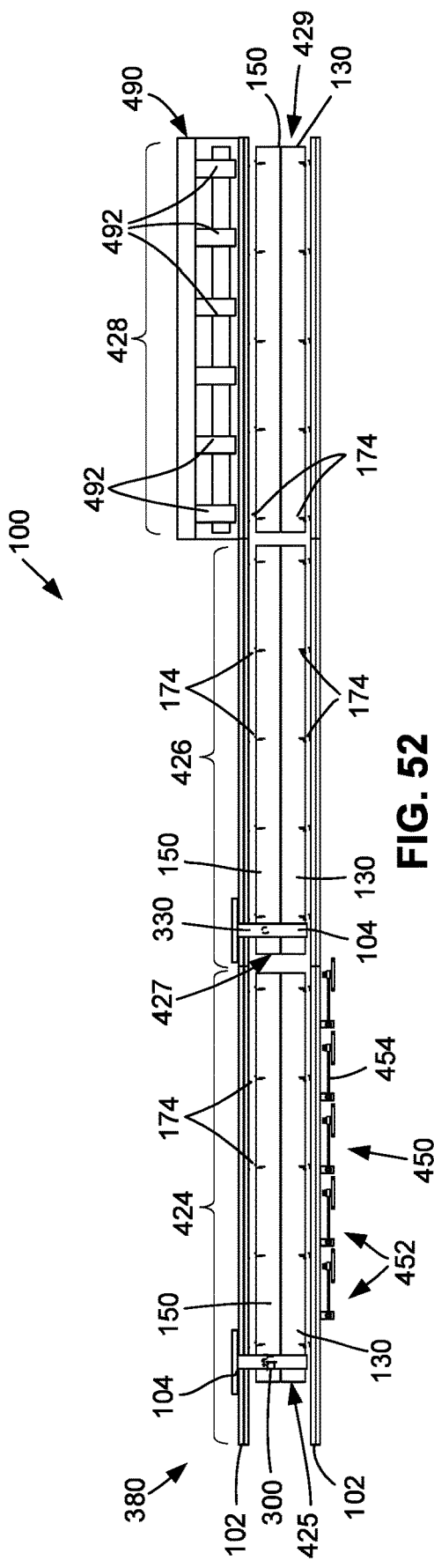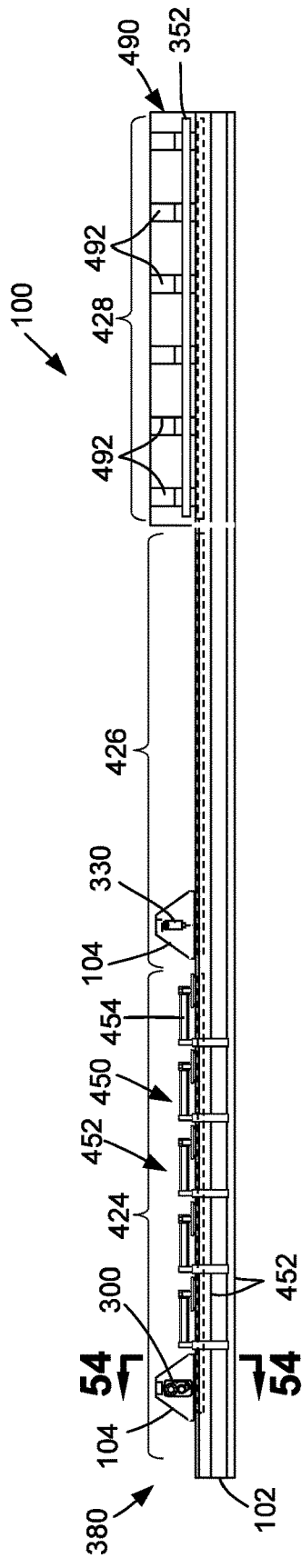

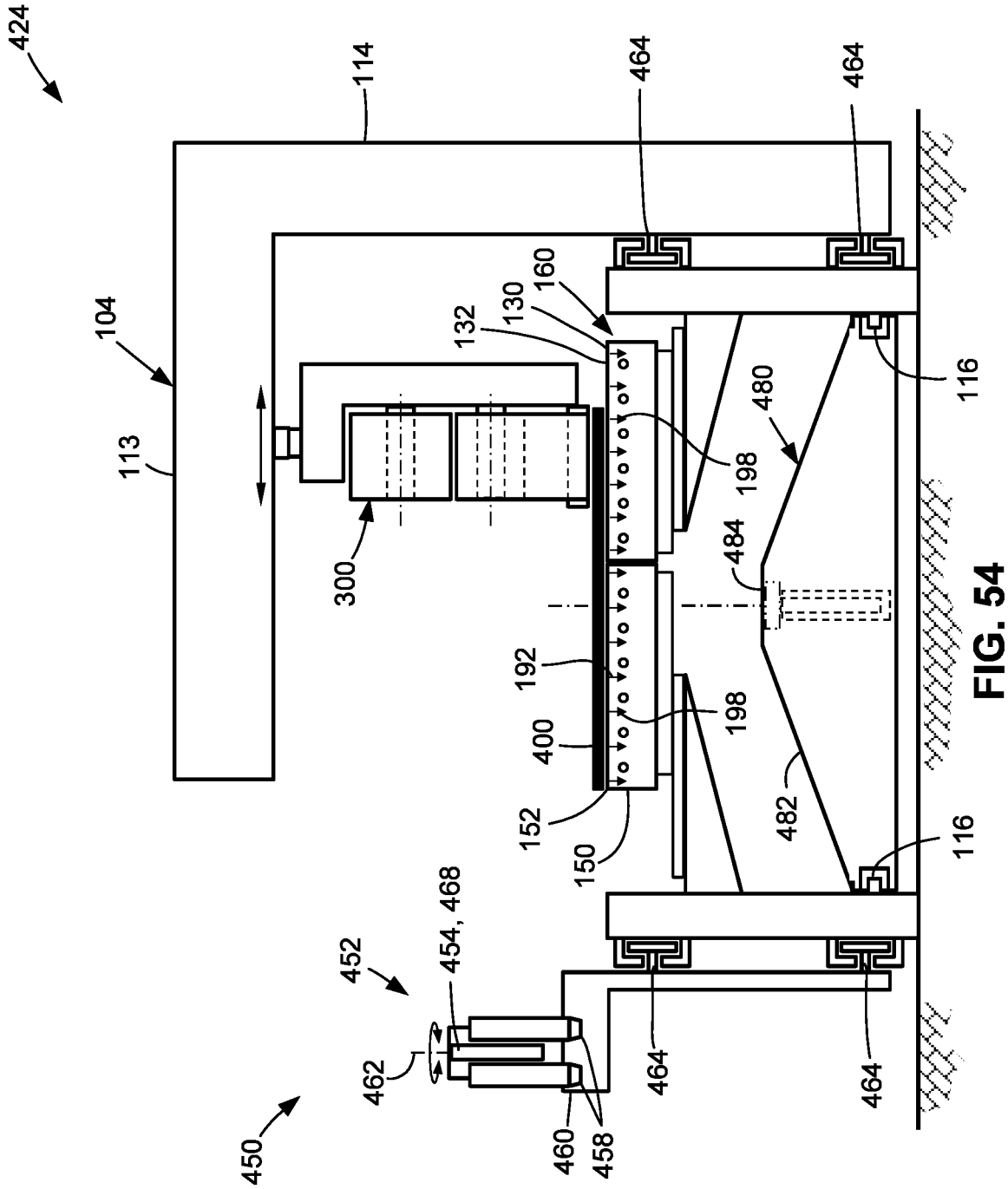

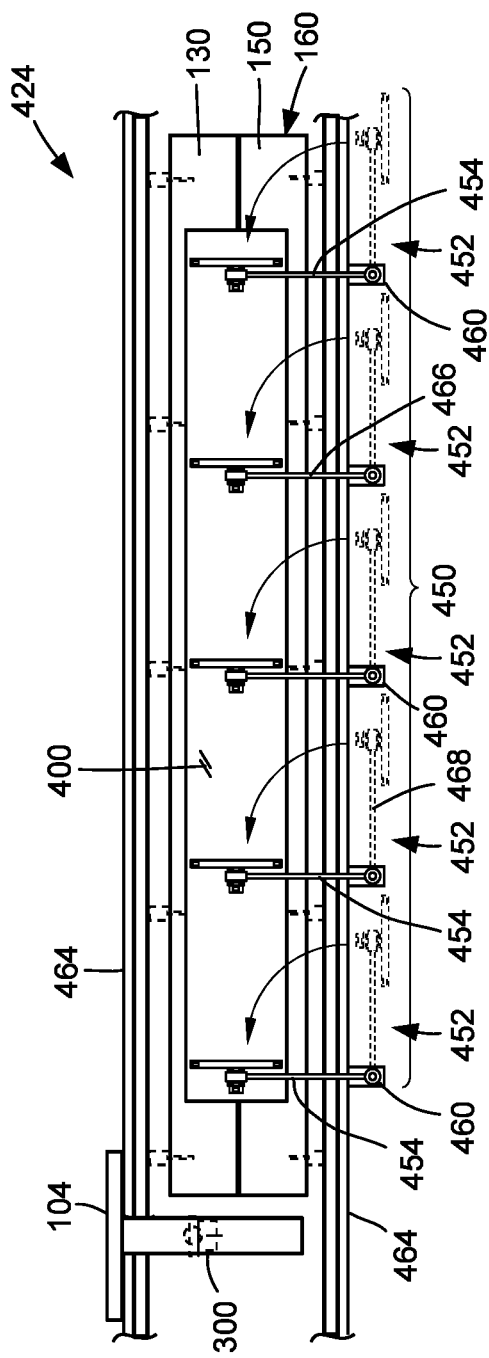
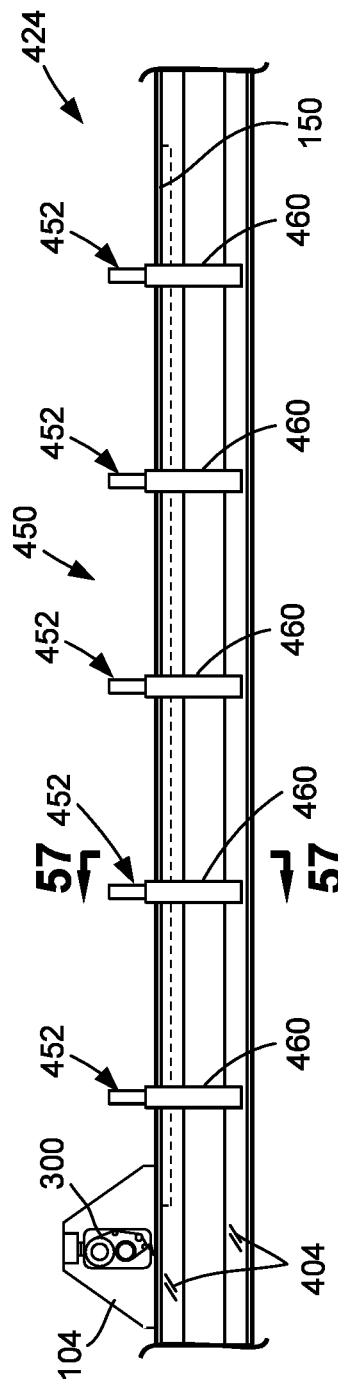
FIG. 55
FIG. 56

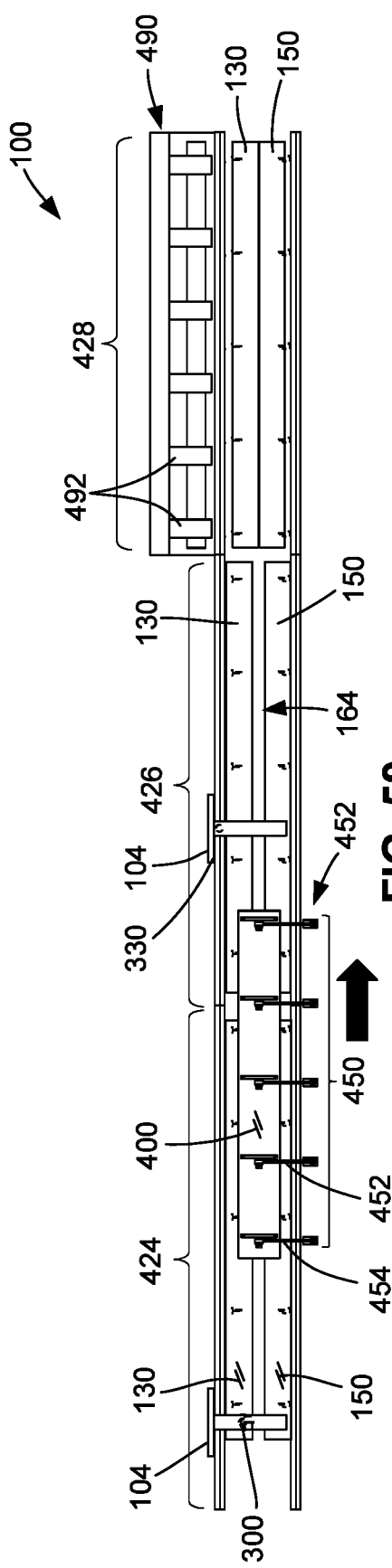
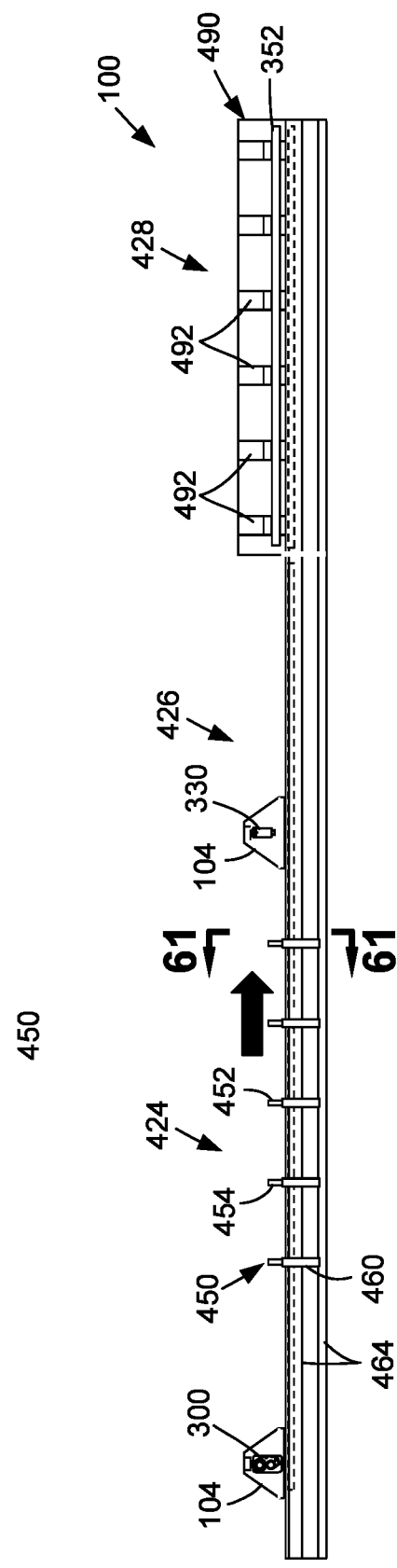

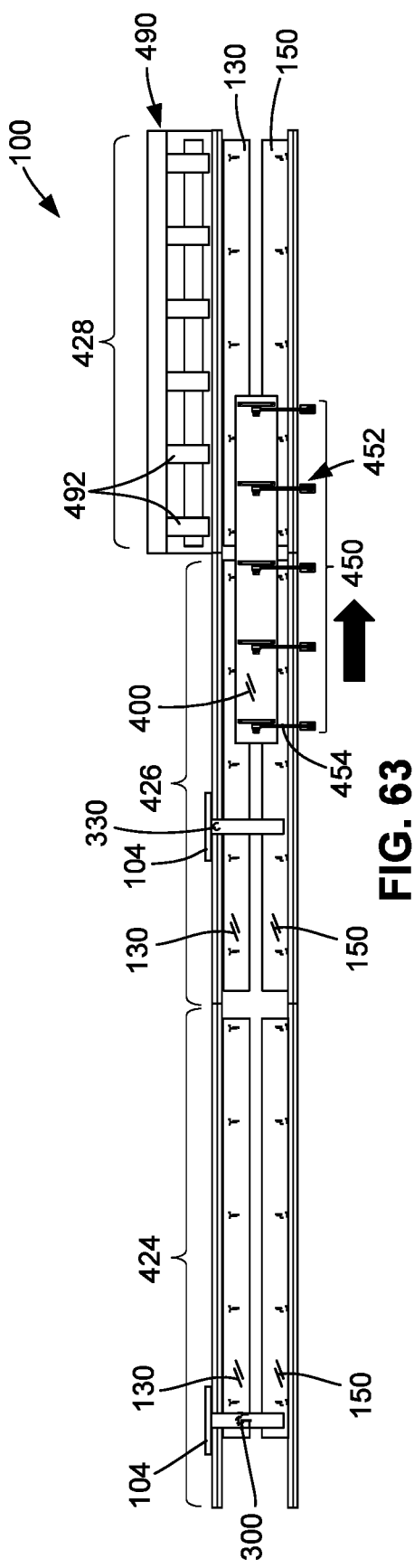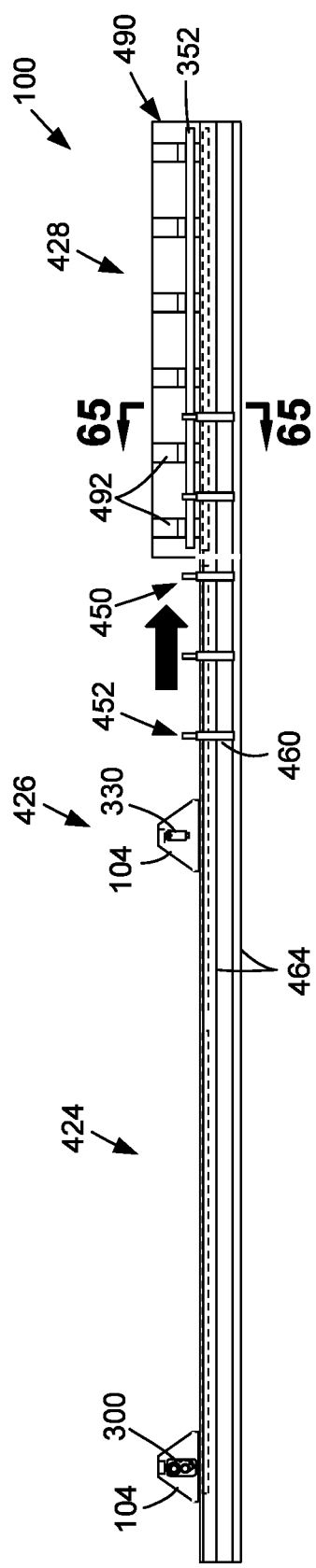

RECONFIGURABLE MANUFACTURING SYSTEM AND METHOD FOR MANUFACTURING COMPOSITE LAMINATES

CROSS-REFERENCE TO RELATED APPLICATIONS

The present application is a continuation-in-part application of and claims priority to pending U.S. application Ser. No. 16/146,760 filed on Sep. 28, 2018, and entitled RECONFIGURABLE MANUFACTURING SYSTEM AND METHOD FOR MANUFACTURING COMPOSITE LAMINATES, the entire contents of which is expressly incorporated by reference herein.

FIELD

The present disclosure relates generally to manufacturing systems and, more particularly, to a reconfigurable system and method for laminating, trimming, and forming a composite laminate.

BACKGROUND

Composite materials are used in a wide variety of applications due to their favorable properties such as high specific strength, high specific stiffness, and high corrosion resistance. The manufacturing of a composite structure typically involves the layup of multiple plies of composite laminate material onto a mandrel to form a composite laminate. The layup material is typically a fibrous material that is pre-impregnated with resin (e.g., prepreg). For example, the layup material may be epoxy-impregnated carbon fiber prepreg.

To manufacture a complex composite structure having a non-planar shape, the composite laminate is typically laid up and then formed into its final shape prior to curing. In addition, the composite laminate is typically trimmed. One manufacturing method involves trimming the composite laminate on a trimming surface, and then transferring the trimmed composite laminate to a forming surface for forming prior to curing.

A pick-and-place method is typically used to transfer the composite laminate from the trimming surface to the forming surface. However, pick-and-place systems require a significant capital investment to provide a machine that is capable of lifting the composite laminate, for example through the use of vacuum pressure, and which has adequate stiffness to support the composite laminate during the transfer process. Any factor that impacts reliability of such pick-and-place systems could, in turn, impact the production rate. For example, possible disruption of vacuum pressure may affect the accuracy with which the composite laminate is positioned on the forming surface.

As can be seen, there exists a need in the art for a system and method for manufacturing a complex composite laminate that avoids the above-noted challenges associated with conventional manufacturing methods.

SUMMARY

The above-noted needs associated with manufacturing composite laminates are specifically addressed and alleviated by the present disclosure which provides a manufacturing system having a first mandrel, a second mandrel, and one or more laminate securing mechanisms. The first mandrel has a first mandrel surface and a first mandrel surface edge. The second mandrel has a second mandrel surface and a second mandrel surface edge and is positionable in a closed position in which the first mandrel surface edge and the second mandrel surface edge are in side-by-side abutting contact to form a continuous mandrel surface collectively defined by the first mandrel surface and the second mandrel surface at least for trimming of a composite laminate. The second mandrel is configured to translate along a direction perpendicular to the first mandrel surface edge to an open position defining a gap between the first mandrel surface edge and the second mandrel surface edge for receiving a forming die for forming the composite laminate. The laminate securing mechanisms are configured to secure the composite laminate to at least one of the first mandrel and the second mandrel at least during trimming and forming of the composite laminate, and secure the composite laminate in fixed position on the first mandrel during translation of the second mandrel to the open position.

In a further example, disclosed is a manufacturing system having a first mandrel and a second mandrel as described above. In addition, the manufacturing system includes a plurality of apertures formed in the first mandrel surface and in the second mandrel surface. Furthermore, the manufacturing system includes a vacuum pressure source and a positive air pressure source. The vacuum pressure source is fluidly coupled at least to the apertures in the first mandrel surface and is configured to generate vacuum pressure securing the composite laminate on the first mandrel during layup, trimming, and/or forming of the composite laminate, and non-movably secure the composite laminate in fixed position on the first mandrel during translation of the second mandrel to the open position. The positive air pressure source is fluidly coupled to the apertures in the second mandrel surface and is configured to generate positive air pressure urging the composite laminate away from the second mandrel surface during translation of the second mandrel to the open position.

Also disclosed is a method of manufacturing a composite laminate including the step of positioning a second mandrel surface edge of a second mandrel in a closed position in side-by-side abutting contact with a first mandrel surface edge of a first mandrel to form a continuous mandrel surface collectively defined by a first mandrel surface and a second mandrel surface. The method additionally includes providing a composite laminate on the continuous mandrel surface while securing the composite laminate in fixed position to the continuous mandrel surface. The method also includes trimming the composite laminate on the continuous mandrel surface, and releasing the composite laminate from the second mandrel surface after trimming the composite laminate. The method further includes translating the second mandrel along a direction perpendicular to the first mandrel surface edge to an open position defining a gap between the first mandrel surface edge and the second mandrel surface edge while continuing to secure the composite laminate to the first mandrel surface. Additionally, the method includes forming the composite laminate by urging the composite laminate into the gap.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a magnified view of a portion of the first mandrel and second mandrel in an open position and illustrating an example of an alignment mechanism for aligning the first mandrel with the second mandrel;

FIG. 8 is a view of the encircled region identified by reference numeral 8 of FIG. 5 and illustrating the first mandrel and second mandrel in the closed position and maintained in alignment via the alignment mechanism;

FIG. 9 is an end view of an example of a staging area of the manufacturing system shown supporting a trimming device and a lamination head for selective coupling to the gantry;

FIG. 20 is an end view of the manufacturing system showing the upper forming die further vertically lowered into engagement with the composite laminate while the first clamping bar and second clamping bar clamp the composite laminate respectively to the first mandrel surface and the second mandrel surface;

FIG. 21 is a view of the encircled region identified by reference number 21 of FIG. 20 and illustrating laminate clamping pressure applied between the upper forming die and the opposing pair of lower die web portions on opposite sides of the laminate centerline;

FIG. 22 is an end view of the manufacturing system showing the upper forming die urging the composite laminate into the gap between the opposing pair of lower die web portions and causing simultaneous laterally outward movement of the first mandrel and the second mandrel while the first clamping bar and the second clamping bar maintain clamping pressure on the composite laminate and resulting in lateral tension in the composite laminate on opposite sides of the laminate centerline;

FIG. 23 is a view of the encircled region identified by reference number 23 of FIG. 22 and illustrating the laminate clamping pressure applied between the upper forming die and the opposing pair of lower die web portions during forming of the composite laminate;

FIG. 30 is a top view of an example of the layup station having a gantry supporting a lamination head during the layup of the composite laminate on the first mandrel and second mandrel in the closed position;

FIG. 31 is a side view of the layup station of FIG. 30;

FIG. 33 is a top view of an example of a forming station having an upper forming die and lower forming die for forming the composite laminate while supported on the first mandrel and the second mandrel in the open position;

FIG. 34 is a side view of the forming station of FIG. 32;

FIG. 37 is a top view of an example of a manufacturing system having a layup station, a trimming station, and a forming station respectively having a layup mandrel set, a trimming mandrel set, and a forming mandrel set each including a first mandrel and a second mandrel, and further illustrating an interstation transfer mechanism comprised of an upper clamping mechanism and a lower clamping mechanism configured to clamp onto the composite laminate and transfer the composite laminate between the stations while the first mandrel and the second mandrel at each station remain stationary;

FIG. 38 is a side view of the example of the manufacturing system shown in FIG. 37;

FIG. 39 is a sectional view of the layup station taken along line 39-39 of FIG. 38 and illustrating the lamination head laying up the composite laminate on the first mandrel and the second mandrel in the closed position;

FIG. 40 is a side view of the manufacturing system illustrating the upper forming die and the lower forming die moving from the forming station to the layup station;

FIG. 41 is a side view of the manufacturing system showing the upper forming die and lower forming die at the layup station in preparation for clamping onto the composite laminate;

FIG. 44 is a sectional view of the layup station showing the upper forming die and the lower die cap portion clamping onto the composite laminate;

FIG. 45 is a side view of the manufacturing system showing the upper forming die and lower forming die transferring the composite laminate from the layup station to the trimming station;

FIG. 46 is a side view of the manufacturing system showing the upper forming die and lower forming die at the trimming station;

FIG. 47 is a sectional view of the trimming station taken along line 47-47 of FIG. 46 and showing the upper forming die and the lower forming die retracted away from the composite laminate and showing a trimming device trimming the composite laminate on the continuous mandrel surface;

FIG. 48 is a side view of the manufacturing system showing the upper forming die and lower forming die transferring the composite laminate from the trimming station to the forming station;

FIG. 49 is a side view of the manufacturing system showing the upper forming die and lower forming die at the forming station in preparation for forming the composite laminate;

FIG. 50 is a sectional view of the forming station taken along line 50-50 of FIG. 49 and showing the upper forming die and lower die cap portion retracted away from the composite laminate and showing the second mandrel translating away from the first mandrel;

FIG. 52 is a top view of a further example of a manufacturing system having a layup station, a trimming station, and a forming station respectively including a layup mandrel set, a trimming mandrel set, and a forming mandrel set each having a first mandrel and a second mandrel, and further illustrating an upper clamping mechanism configured as a plurality of pivotable clamping arms, and a lower clamping mechanism configured as a lower clamp member for transferring the composite laminate between the layup station, the trimming station, and the forming station;

FIG. 53 is a side view of the manufacturing system of FIG. 52;

FIG. 54 is a sectional view taken of the layup station taken along line 54-54 of FIG. 53 and showing an example of a lamination head laying up a composite laminate on the first mandrel and the second mandrel of the layup mandrel set;

FIG. 55 is a top view of the layup station showing the clamping arms of the upper clamp modules pivoted into a clamping position in which each clamping arm extends over the top of the composite laminate;

FIG. 56 is a side view of the layup station shown in FIG. 55;

FIG. 59 is a top view of the manufacturing system showing the plurality of upper clamp modules and the lower clamping mechanism (hidden) transferring the composite laminate from the layup station to the trimming station;

FIG. 60 is a side view of the manufacturing system of FIG. 60;

FIG. 63 is a top view of the manufacturing system showing the plurality of upper clamp modules and the lower clamp mechanism (hidden) transferring the composite laminate from the trimming station to the forming station;

FIG. 64 is a side view of the manufacturing system of FIG. 63;

DETAILED DESCRIPTION

Figure 1:
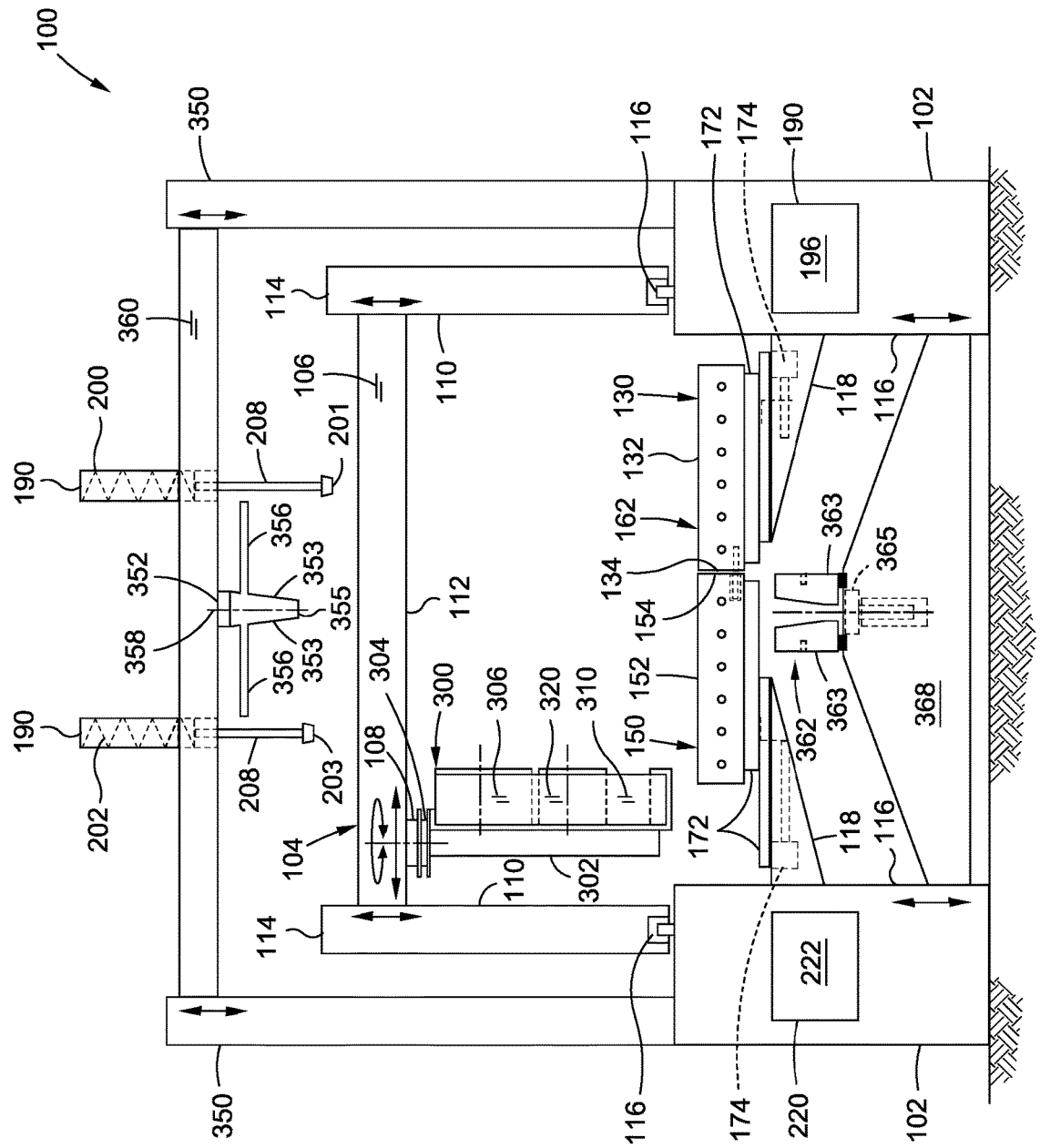
FIG. 1 is an end view of an example of a manufacturing system as disclosed herein.
Figure 2:
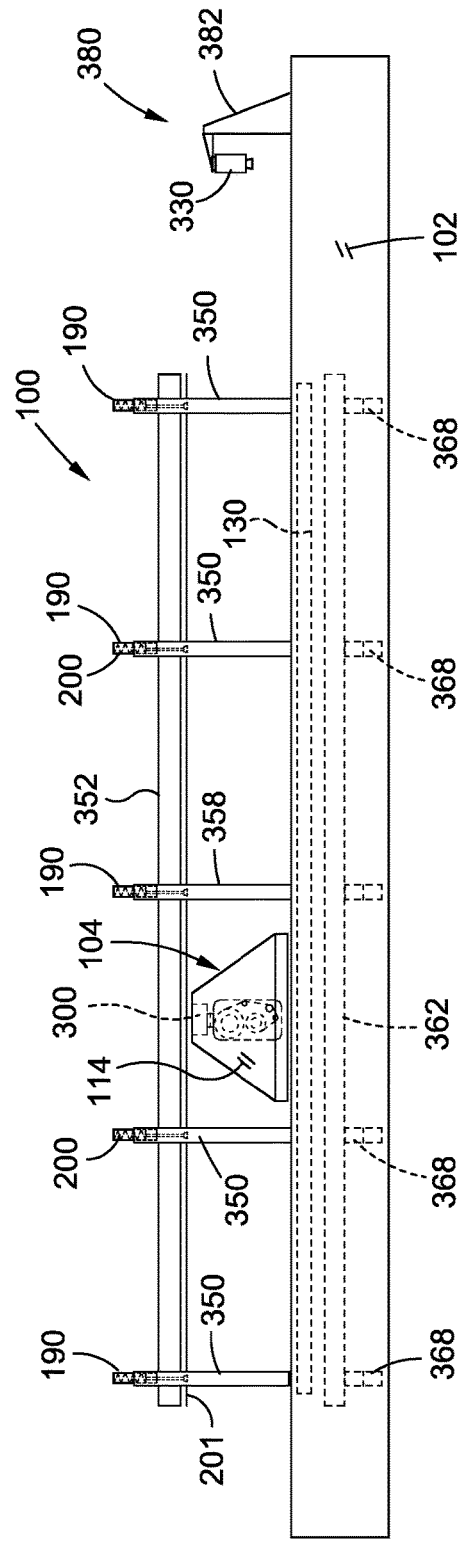
FIG. 2 is a side view of the manufacturing system of FIG. 1.
Figure 27:
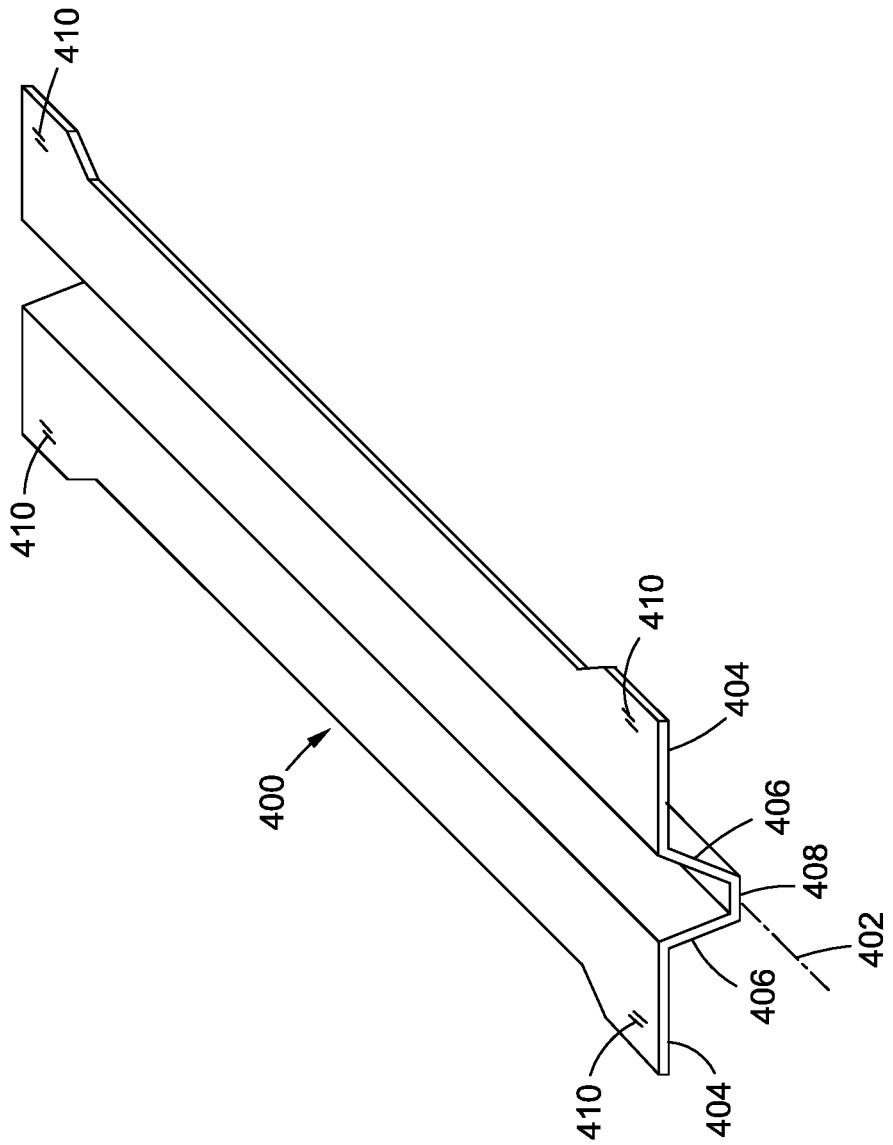
FIG. 27 is a perspective view of an example of a composite laminate after layup, trimming, and forming using the manufacturing system.

Referring now to the drawings which illustrate preferred and various examples of the disclosure, shown in FIG. 1 is an end view of an example of a manufacturing system 100 for manufacturing a composite laminate 400 (FIG. 27). FIG. 2 is a side view of the manufacturing system 100 and FIG. 3 a top view of the manufacturing system 100 of FIG. 1. As described in greater detail below, the manufacturing system 100 includes a first mandrel 130 and a second mandrel 150 which, in combination with one or more laminate securing mechanisms 190 (e.g. FIGS. 5-6, 16-25), enable the composite laminate 400 to be laid up, trimmed, and formed using a single tool (i.e., the manufacturing system 100). The manufacturing system 100 includes an upper forming die 352 for forming the composite laminate 400 when the first mandrel 130 and second mandrel 150 are in an open position 164 (FIG. 17). The ability to lay up, trim, and form the composite laminate 400 on a single tool avoids the costs and complexity associated with prior art methods that require specialized equipment (e.g., a pick-and-place system) for transferring the composite laminate 400 from a trimming surface (not shown) to a forming surface (not shown). In addition, the manufacturing system 100 enables the ability to trim the composite laminate 400 prior to forming. In this regard, the composite laminate 400 may be trimmed while fully supported on a continuous mandrel surface 162 defined by the first mandrel 130 and second mandrel 150, and which results in an increase in dimensional accuracy of the composite laminate 400 relative to the accuracy achievable using prior art methods in which the composite laminate 400 is either partially unsupported during trimming after forming, or the composite laminate 400 is transferred (e.g., via a pick-and-place system) from a trimming surface to a forming surface.

Figure 3:
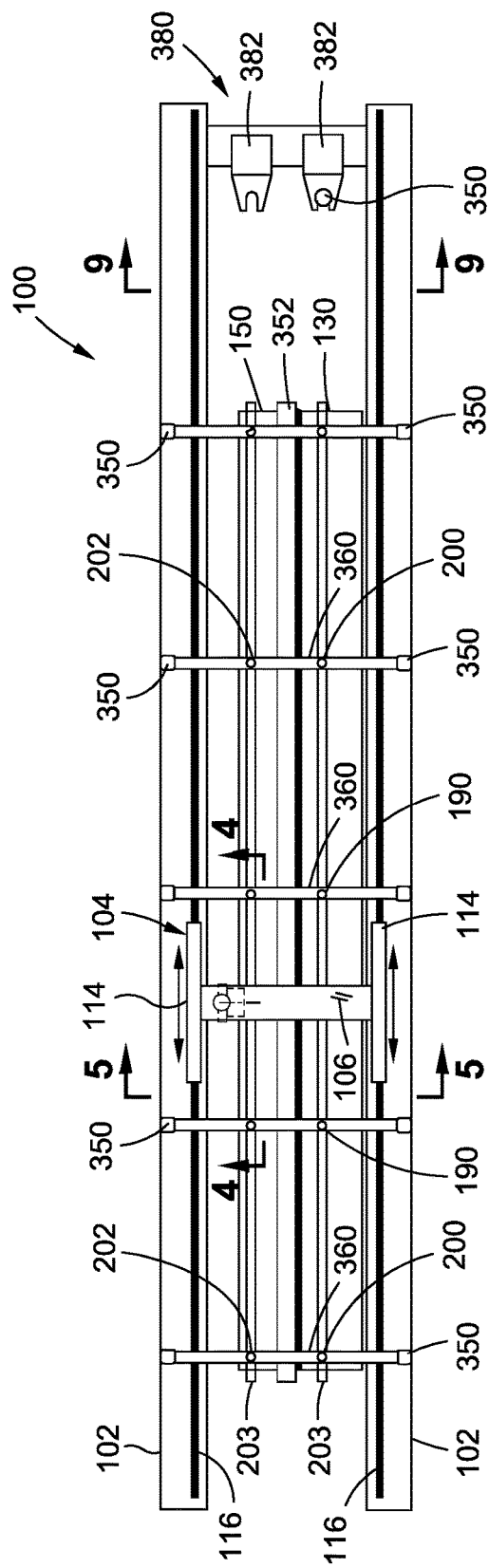
FIG. 3 is a top view of the manufacturing system of FIG. 1.

Referring to FIGS. 1-3, the manufacturing system 100 may include one or more elongated base members 102 supported on a surface such as a factory floor. The first mandrel 130 and the second mandrel 150 may each extend along a lengthwise direction of the manufacturing system 100. The first mandrel 130 has a first mandrel surface 132 and a first mandrel surface edge 134. The second mandrel 150 has a second mandrel surface 152 and a second mandrel surface edge 154. The first mandrel 130 may be coupled to one of the base members 102 by one or more mandrel supports 118. Similarly, the second mandrel 150 may be coupled to one of the base members 102 by one or more mandrel supports 118. Although shown the first mandrel 130 and the second mandrel 150 are each configured as a single unitary structure, the first mandrel 130 and/or the second mandrel 150 may be configured as a series of end-to-end mandrel segments (not shown).

The manufacturing system 100 may further include a set of lateral rails 172 interposed between the first mandrel 130 and the mandrel supports 118 to facilitate lateral movement of the first mandrel 130 during forming of the composite laminate 400 as described in greater detail below. Similarly, a set of lateral rails 172 may be interposed between the second mandrel 150 and the mandrel supports 118 to facilitate movement of the second mandrel 150 between a closed position 160 (FIG. 1) and an open position 164 (FIG. 17) as described in greater detail below. In some examples, the lateral rails 172 may function as an alignment mechanism 170 configured to maintain the first mandrel surface 132 and the second mandrel surface 152 at the same height when the first mandrel 130 and the second mandrel 150 are in the closed position 160 and/or when the first mandrel 130 and the second mandrel 150 are in the open position 164. As described below, the manufacturing system 100 may include alternative or additional alignment mechanisms 170 for maintaining the first mandrel 130 and second mandrel 150 in vertical alignment with each other.

Translation of the first mandrel 130 during forming operations may be facilitated by one or more mandrel actuators 174. Translation of the second mandrel 150 prior to the initiation of forming operations may similarly be facilitated by one or more mandrel actuators 174. In the example shown, the mandrel actuators 174 of the first mandrel 130 may be mounted to the mandrel supports 118 extending from one of the base members 102. The mandrel actuators 174 of the second mandrel 150 may similarly be mounted to the mandrel supports 118 extending from an opposite one of the base members. The mandrel actuators 174 may be provided in any one of a variety of different configurations including as actively-control devices or passive devices. In one example, the mandrel actuators 174 for the first mandrel 130 may be passive devices such as compression springs configured to bias the first mandrel 130 toward the second mandrel 150 as the first mandrel 130 and second mandrel 150 are urged laterally outwardly during plunging of the upper forming die 352 into the gap between the first mandrel 130 and second mandrel 150 during forming operations as described below. In some examples, the mandrel actuators 174 of the first mandrel 130 and/or of the second mandrel 150 may be configured as linear actuation mechanisms. For example, the mandrel actuators 174 may be configured as electro-mechanical actuators having a drive screw (not shown) coupled to the second mandrel 150 and rotatable by a servo motor (not shown). Alternatively or additionally, the mandrel actuators 174 may be configured as pneumatic actuators and/or hydraulic actuators. However, the mandrel actuators 174 may be provided in any one of a variety of different examples and may be coupled to the manufacturing system 100 in any one of a variety of different arrangements, and are not limited to the configuration shown in the figures and/or described herein.

Figure 4:
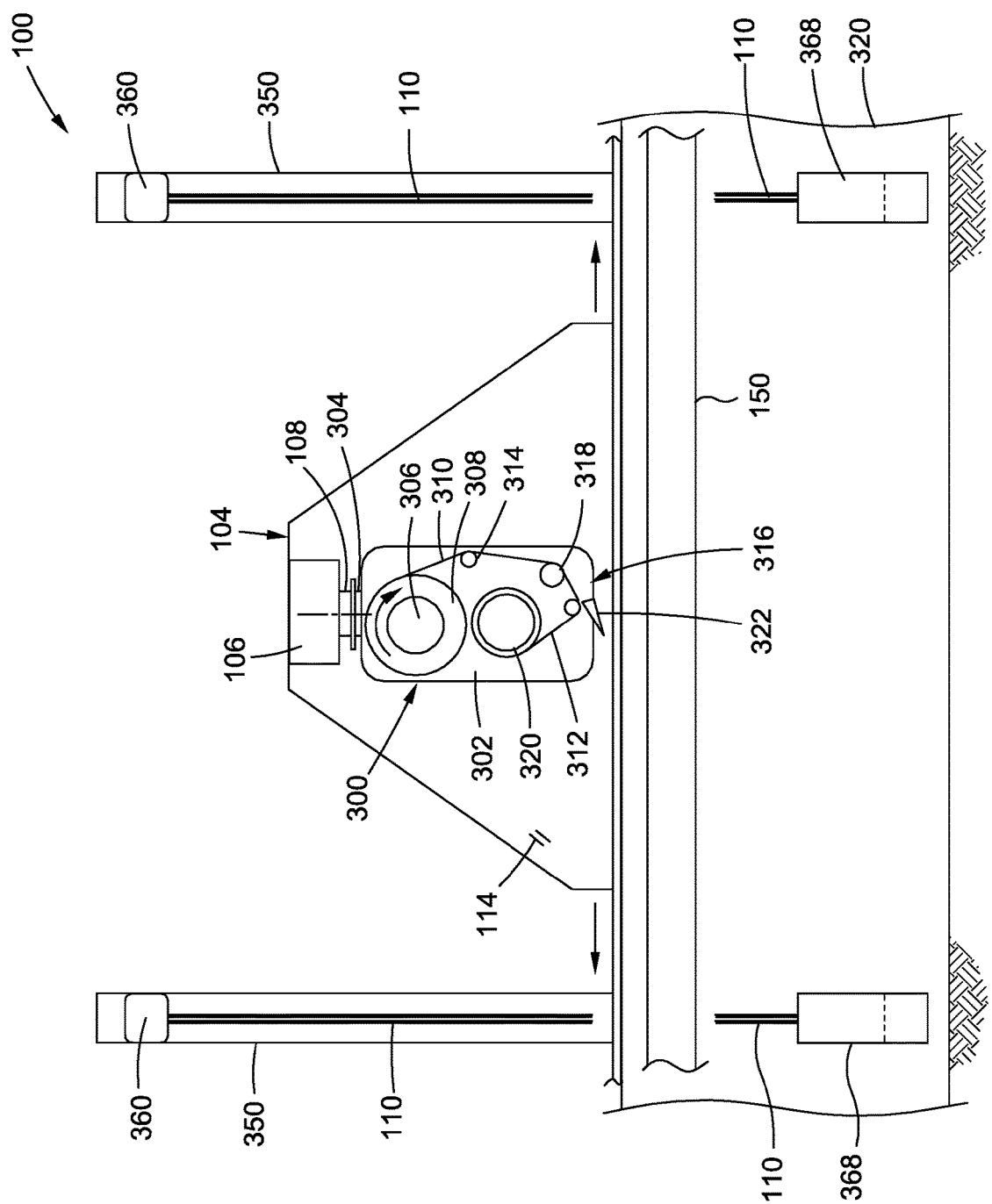
FIG. 4 is a side view of a portion of the manufacturing system taken along line 4-4 of FIG. 3 and illustrating an example of a lamination head supported on a gantry of the manufacturing system.
Figure 5:
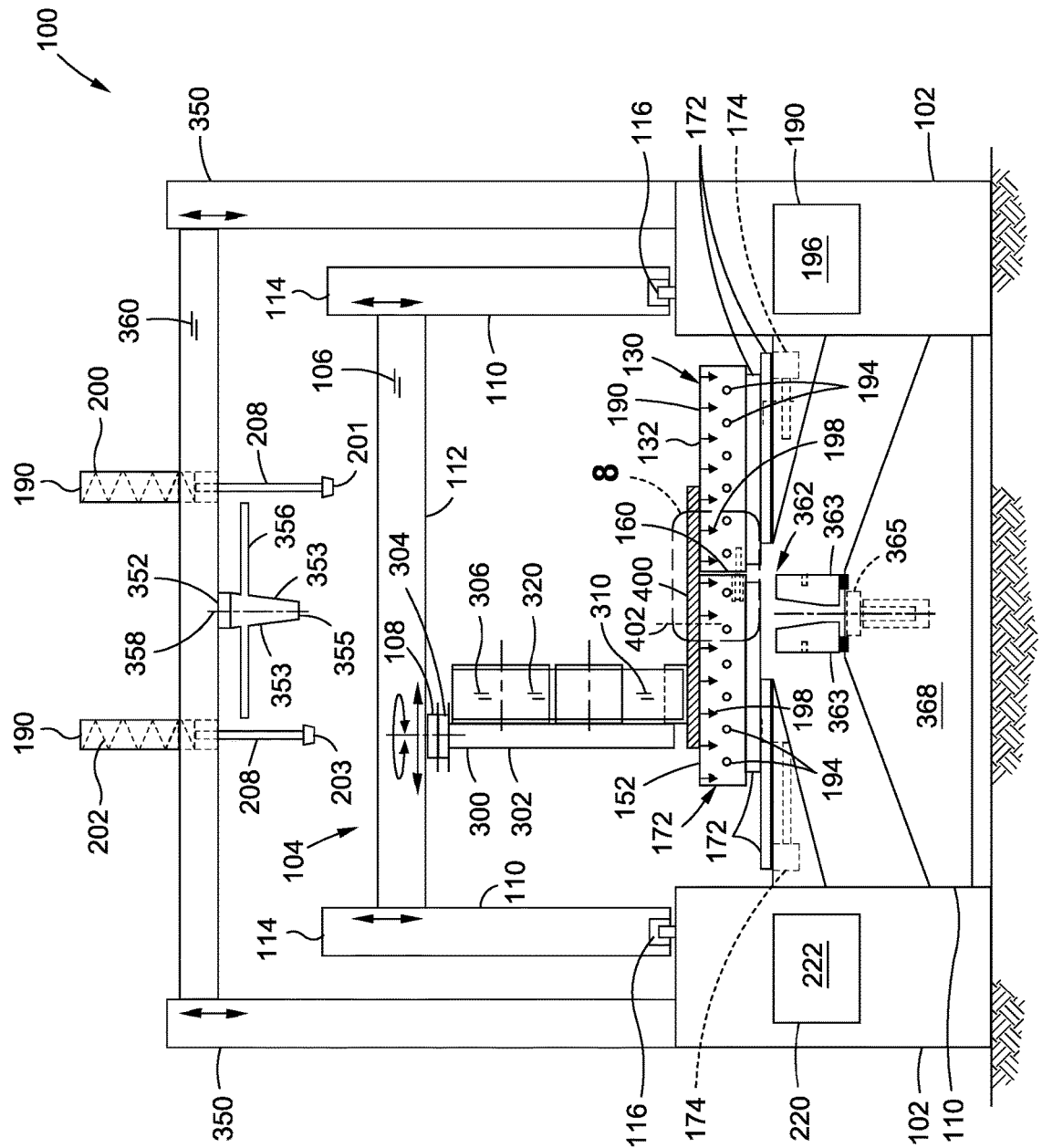
FIG. 5 is a view of the manufacturing system taken along line 5-5 of FIG. 3 and illustrating the lamination head laying up a composite laminate on a continuous mandrel surface collectively defined by a first mandrel and a second mandrel in a closed position.
Figure 6:
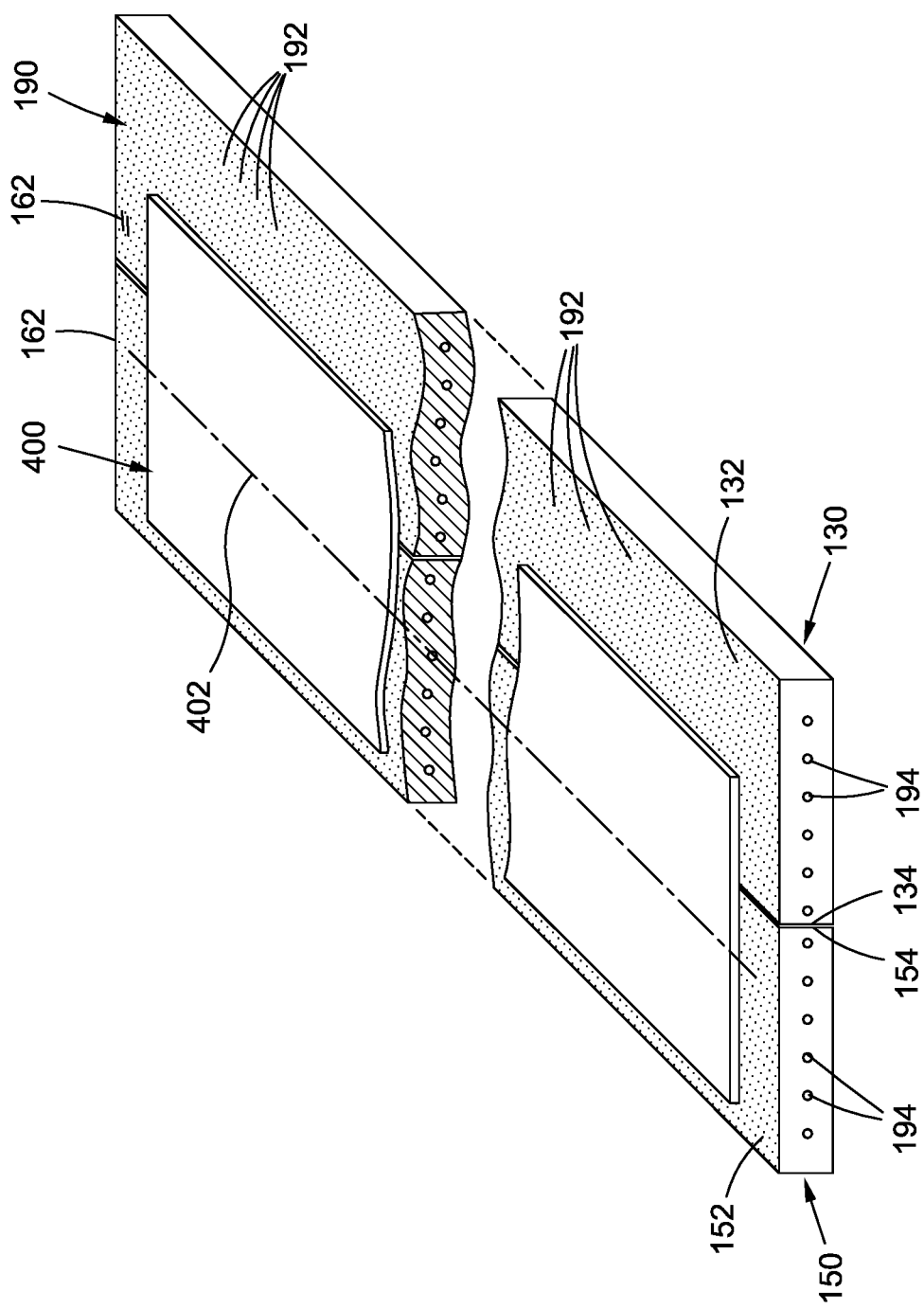
FIG. 6 is a perspective view of an example of the continuous mandrel surface having a plurality of apertures formed in the first mandrel surface and the second mandrel surface and showing a composite laminate supported on the continuous mandrel surface.

Referring briefly to FIGS. 1, 5, and 6, when the second mandrel 150 is in the closed position 160, the first mandrel surface edge 134 and the second mandrel surface edge 154 are in side-by-side abutting contact with each other such that the first mandrel surface 132 and the second mandrel surface 152 form the continuous mandrel surface 162. The continuous mandrel surface 162 is devoid of steps, gaps, breaks, interruptions, or discontinuities such that an entirety of the composite laminate 400 is supported by the continuous mandrel surface 162 during operations such as layup, trimming and forming. Such steps, gaps, breaks, interruptions and discontinuities in the continuous mandrel surface 162 may be separate from normal wear and tear of the first mandrel surface 132 and second mandrel surface 152 that may occur during trimming operations. Prior to trimming, the composite laminate 400 may be positioned on the continuous mandrel surface 162. For example, the composite laminate 400 may be laid up at a remote location (not shown) and then transferred to the continuous mandrel surface 162 for trimming. In other examples described below and illustrated in FIGS. 4-6, the composite laminate 400 may be laid up on the continuous mandrel surface 162 such as by using a lamination head 300, after which the composite laminate 400 may be trimmed on the continuous mandrel surface 162 using a trimming device 330 as described below.

Referring to FIGS. 1-5, the manufacturing system 100 may include at least one lamination head 300 that is movable over the first mandrel 130 and the second mandrel 150 and configured to apply layup material 310 onto the continuous mandrel surface 162 defined by the first mandrel 130 and the second mandrel 150 in the closed position 160. In the example shown, the lamination head 300 is supported by a gantry 104. The gantry 104 may include a generally horizontally-oriented gantry crossbeam 106 having opposing ends respectively coupled to a pair of generally vertically-oriented beam supports 114. Each one of the beam supports 114 may be supported on one of the base members 102 via a gantry track 116 that extends along a lengthwise direction of the base members 102. The beam supports 114 are movable along the gantry track 116 via a linear actuation mechanism (not shown) for positioning the lamination head 300 along a lengthwise direction of the first mandrel 130 and second mandrel 150. In addition, the lamination head 300 may be movable via a linear actuation mechanism (not shown) along a horizontal track 112 incorporated into the gantry crossbeam 106 for positioning the lamination head 300 along a transverse direction of the first mandrel 130 and second mandrel 150. Furthermore, the gantry crossbeam 106 may be vertically movable. For example, the opposing ends of the gantry crossbeam 106 may be movable along vertical tracks 110 (not shown) via linear actuation mechanisms (not shown) that may be incorporated into the beam supports 114.

Referring to FIGS. 4-5, shown is an example of a lamination head 300 for applying layup material 310 to the continuous mandrel surface 162 (FIG. 5) collectively defined by the first mandrel 130 (FIG. 5) and second mandrel 150 (FIG. 5). The lamination head 300 may include a mounting frame 302 configured to support the components of the lamination head 300. The mounting frame 302 is shown coupled to the gantry crossbeam 106. The lamination head 300 may include a material supply drum 306 which may support a material roll 308 of layup material 310. In some examples, the layup material 310 may be backed by a backing layer 312. For example, the layup material 310 may be a prepreg composite material backed by a backing layer 312.

The lamination head 300 may further include one or more redirect rollers 314 for guiding the layup material 310 from the material supply drum 306 to downstream lamination head components such as toward a cutter assembly 318 having one or more cutter blades (not shown) for cutting the layup material 310 during layup of a composite laminate 400. In addition, the lamination head 300 may include a backing layer separation assembly 316 configured to separate the backing layer 312 from the layup material 310. After separation from the layup material 310, the backing layer 312 may be wound on a backing layer collection drum 320 as the layup material 310 is applied to the continuous lamination surface. The lamination head 300 may additionally include a compaction device 322 such as a compaction roller or a compaction shoe for applying compaction pressure to the layup material 310 during the laying up of the composite laminate 400. Although not shown, a layer of low-friction material (not shown) may be applied to the continuous mandrel surface 162 prior to the layup of a composite laminate 400. After layup, a layer of low-friction material may also be applied on top of the composite laminate 400 to facilitate forming of the composite laminate 400 as described below.

Referring to FIGS. 1, 5, and 6, the manufacturing system 100 includes one or more of the above-mentioned laminate securing mechanisms 190 configured to non-movably secure the composite laminate 400 in fixed position at least on the first mandrel 130 at least during trimming of the composite laminate 400. In addition, one or more of the laminate securing mechanisms 190 are configured to non-movably secure the composite laminate 400 in fixed position on the first mandrel 130 during translation of the second mandrel 150 to the open position 164 (FIG. 17). Furthermore, one or more laminate securing mechanisms 190 may clamp the composite laminate 400 to the first mandrel 130 and/or the second mandrel 150 during any operation that may be performed on the composite laminate 400 including forming of the composite laminate 400, as described below. In one example, the laminate securing mechanisms 190 may be configured to mechanically clamp the composite laminate 400 to the first mandrel surface 132 and/or the second mandrel surface 152. Mechanical clamping may be performed using any one of a variety of different configurations of clamping devices such as one or more pinch mechanisms described below, or any one of a variety of other mechanical clamping configuration such as ratchet straps (not shown), pivoting clamps (not shown) pivotably coupled to the base members, or any one of a variety of other clamping configurations.

In one example, the laminate securing mechanism 190 may be provided as a plurality of apertures 192 (FIG. 6) formed in the first mandrel surface 132 and/or in the second mandrel surface 152. The apertures 192 may be fluidly coupled to a vacuum source 196 via a plurality or network of fluid conduits 194 that may be formed in the first mandrel 130 and the second mandrel 150. One or both of the opposing ends of the first mandrel 130 and/or one or both of the opposing ends of the second mandrel 150 may include a manifold (not shown) coupling the fluid conduits 194 to one or more vacuum sources 196 such as one or more vacuum pumps. When activated, one or more vacuum sources 196 may generate vacuum pressure 198 at the apertures 192 for drawing or urging the composite laminate 400 against the first mandrel 130 and/or the second mandrel 150. For example, during layup (FIG. 5) and/or trimming (FIG. 12) of the composite laminate 400, one or more vacuum sources 196 may be activated for generating vacuum pressure 198 between the composite laminate 400 and the first mandrel surface 132 and/or between the composite laminate 400 and the second mandrel surface 152 for securing the composite laminate 400 respectively on the first mandrel 130 and the second mandrel 150. During translation of the second mandrel 150 from the closed position 160 to the open position 164 (FIG. 17), the vacuum source(s) 196 for the second mandrel 150 may be deactivated to prevent vacuum pressure 198 of the composite laminate 400 against the second mandrel surface 152 to allow the second mandrel 150 to translate away from the first mandrel 130. Alternatively, the manufacturing system 100 may include an internal mechanism such as a valve (not shown) to block the vacuum otherwise applied to the apertures 192 by the vacuum source 196. For the first mandrel 130, the internal mechanism (e.g., a valve) may be adjusted or one or the vacuum sources 196 may be activated for generating vacuum pressure 198 between the composite laminate 400 and the first mandrel surface 132 to maintain the composite laminate 400 in fixed position relative to the first mandrel 130 while allowing the composite laminate 400 to slip or slide relative to the second mandrel 150.

Advantageously, by securing the composite laminate 400 in fixed position on the first mandrel 130 and/or the second mandrel 150, the laminate securing mechanisms 190 maintain the position of the composite laminate 400 relative to the upper forming die 352 and optional lower forming die 362. For example, the laminate securing mechanisms 190 maintain the laminate centerline 402 of the composite laminate 400 in alignment with the die centerline 358 of the upper forming die 352 and lower forming die 362 during layup (e.g., FIG. 5) and trimming (e.g., FIG. 12) of the composite laminate 400. During forming of the composite laminate 400 (e.g., FIGS. 16-25), the composite laminate 400 is clamped between the upper die web portion 353 and the lower die web portion 363 as shown in the FIGS. 21 and 23 which maintains the laminate centerline 402 in alignment with the die centerline 358 of the upper forming die 352 and the lower forming die 362 such that after forming, the final dimensions of the formed composite laminate 400 are within design tolerances and/or manufacturing tolerances. For the example of a composite laminate 400 formed into a composite stringer as shown in FIG. 23, maintaining the laminate centerline 402 in alignment with the die centerline 358 of the upper forming die 352 and lower forming die 362 during layup, trimming, and forming results in a composite stringer that has the appropriate lateral width of material on both sides of the laminate centerline 402 along an entire length of the composite stringer.

Referring to FIG. 7-8, shown is a portion of the first mandrel 130 and second mandrel 150 in the open position 164 (FIG. 7) and in the closed position 160 (FIG. 8). Also shown is a further example of an alignment mechanism 170 that may be included with the manufacturing system 100 for interconnecting and maintaining vertical alignment between the first mandrel 130 and the second mandrel 150 in the closed position 160. In the example shown, the alignment mechanism 170 comprises a socket 178 included formed in one of the mandrels and configured to receive a pin 176 included with the adjacent mandrel. The pin 176 may be linearly actuated by a linear actuator (not shown).

In the example shown, the socket 178 is formed in the first mandrel 130 and the pin 176 is included with the second mandrel 150. However, one or more sockets 178 may be formed in the second mandrel 150 and a corresponding number of pins 176 may be included with the first mandrel 130. Each socket 178 and pin 176 may be sized to provide a relatively close tolerance fit between the pin 176 and socket 178 as a means to minimize the amount of vertical movement of the second mandrel surface 152 relative to the first mandrel surface 132. Although illustrated as a pin 176 and socket 178 arrangement, the alignment mechanisms 170 may be provided in any number of alternative structural configurations for maintaining vertical alignment between the second mandrel surface 152 relative to the first mandrel surface 132.

The manufacturing system 100 may include a plurality of the alignment mechanisms 170 arranged at spaced intervals along the length of the first mandrel 130 and the second mandrel 150. Although the alignment mechanism 170 in FIG. 8 is illustrated as maintaining alignment of the first mandrel 130 and second mandrel 150 in the closed position 160, the manufacturing system 100 may include one or more alignment mechanisms 170 configured to maintain vertical alignment of the first mandrel 130 relative to the second mandrel 150 at one or more points during the manufacturing of the composite laminate 400. For example, one or more of the alignment mechanisms may be engaged to maintain vertical alignment between the first mandrel 130 and the second mandrel 150 in the open position 164 and/or when at least one of the forming dies (e.g., the lower forming die 362) is positioned within the gap 166 between the first mandrel 130 and the second mandrel 150, as described below and shown in FIG. 19.

Figure 11:
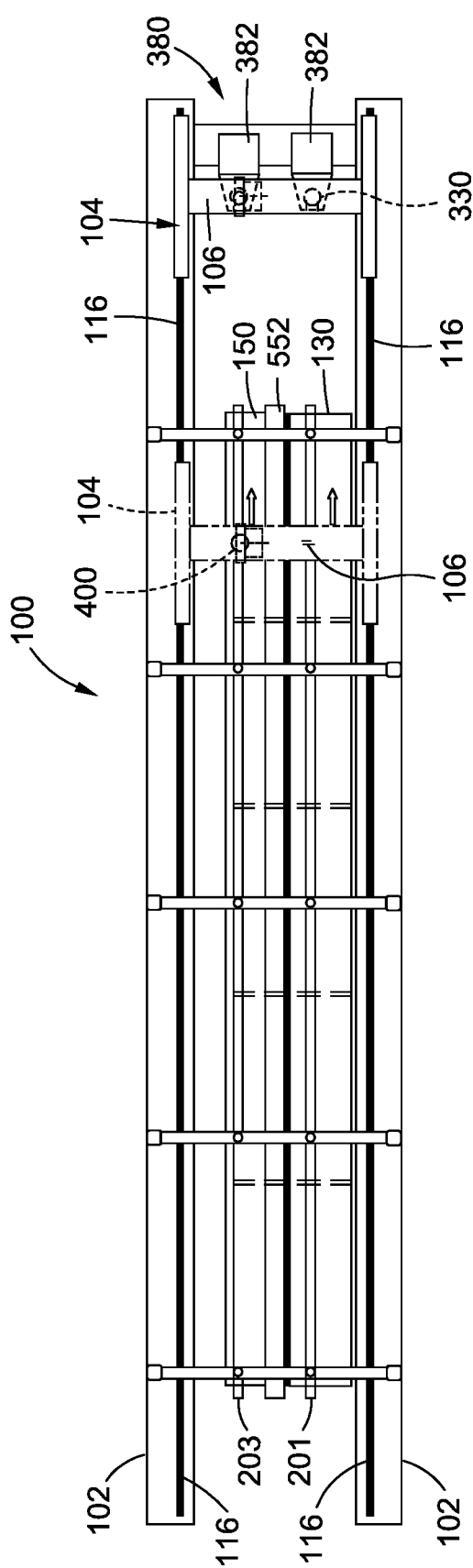
FIG. 11 is a top view of the manufacturing system of FIG. 10.
Figure 10:
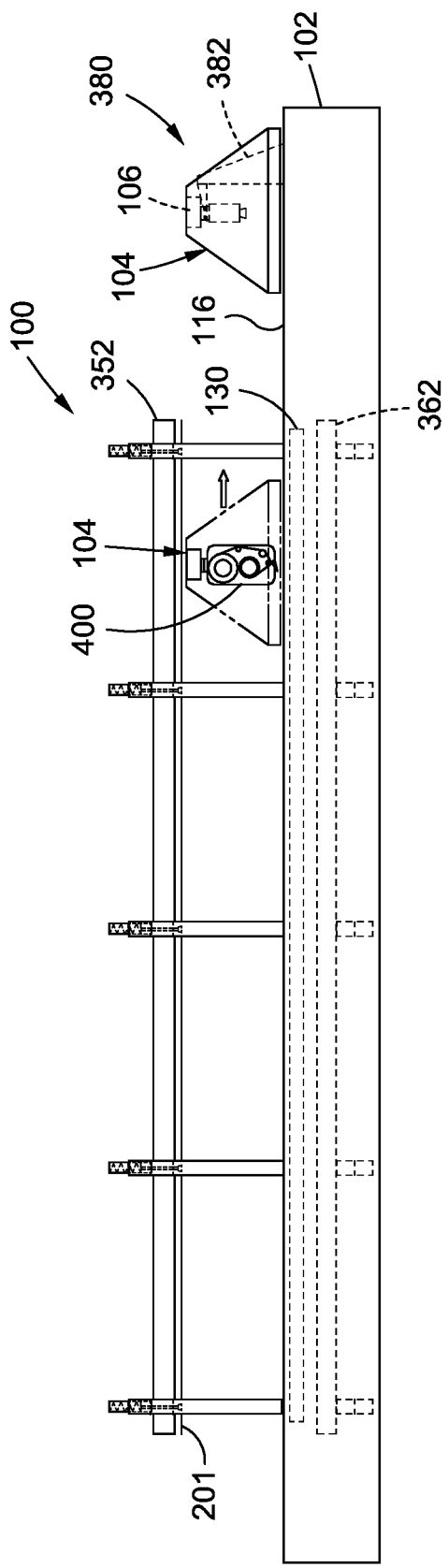
FIG. 10 is a side view of the manufacturing system illustrating the gantry positioned in the staging area for exchanging the lamination head for the trimming device.

Referring to FIGS. 9-11, the gantry 104 (FIGS. 1-5) may be configured to support one or more different types of devices. In this regard, the gantry crossbeam 106 may include a gantry coupling mechanism 108 (FIG. 5) configured to be releasably coupled to a device coupling mechanism 304 (FIG. 5) of a device. The gantry coupling mechanism 108 and the device coupling mechanism 304 may collectively define a quick-disconnect assembly allowing for rapid substitution of one type of device (e.g., a lamination head 300) with another type of device (e.g., a trimming device 330) without manual intervention.

In some examples, the manufacturing system 100 may include a staging area 380 at one or both ends of the manufacturing system 100. The staging area 380 may include one or more device stands 382 each configured to support one or more devices that may be releasably coupled (e.g., via the gantry coupling mechanism 108 and the device coupling mechanism 304) to the gantry 104 for performing an operation associated with the manufacturing of the composite laminate 400. For example, the staging area 380 of FIG. 9 includes one device stand 382 for supporting a lamination head 300 and another device stand 382 for supporting a trimming device 330. Substitution of one type of device on the gantry 104 with another type of device may involve moving the gantry 104 into position over an empty one of the device stands 382 (e.g., see FIGS. 10-11), releasing a currently-mounted device (e.g., a lamination head) from the gantry 104 onto the empty device stand 382 by disengaging the device coupling mechanism 304 from the gantry coupling mechanism 108, laterally translating the gantry coupling mechanism 108 along the gantry crossbeam 106 until aligned with a device stand 382 occupied by a different type of device (e.g., a trimming device 330), and engaging the gantry coupling mechanism 108 with the device coupling mechanism 304 of the different type of device.

Figure 12:
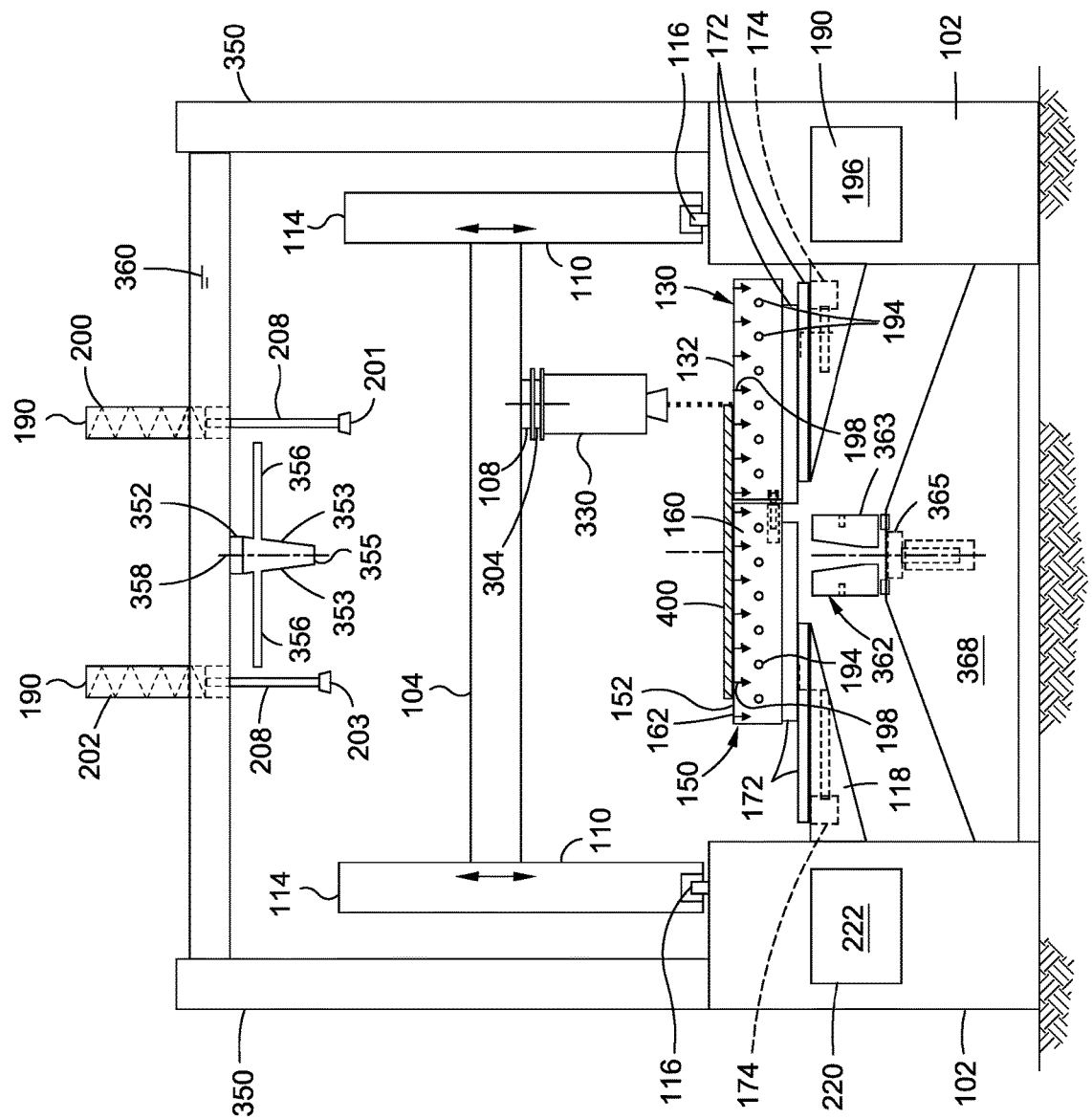
FIG. 12 is an end view of the manufacturing system showing the trimming device during trimming of the composite laminate.

Referring to FIG. 12, shown is a trimming device 330 supported by the gantry 104. The trimming device 330 is movable by the gantry 104 along a lengthwise direction and transverse direction of the first mandrel 130 and second mandrel 150. The trimming device 330 is configured to trim the composite laminate 400 while supported on the continuous mandrel surface 162. As mentioned above, the composite laminate 400 may be trimmed prior to translation of the second mandrel 150 to the open position 164 for forming the composite laminate 400. In one example, the trimming device 330 may be an ultrasonic cutter. However, the trimming device 330 may be provided in alternative configurations such as a laser cutter (not shown) or a mechanical blade (not shown).

Figure 13:
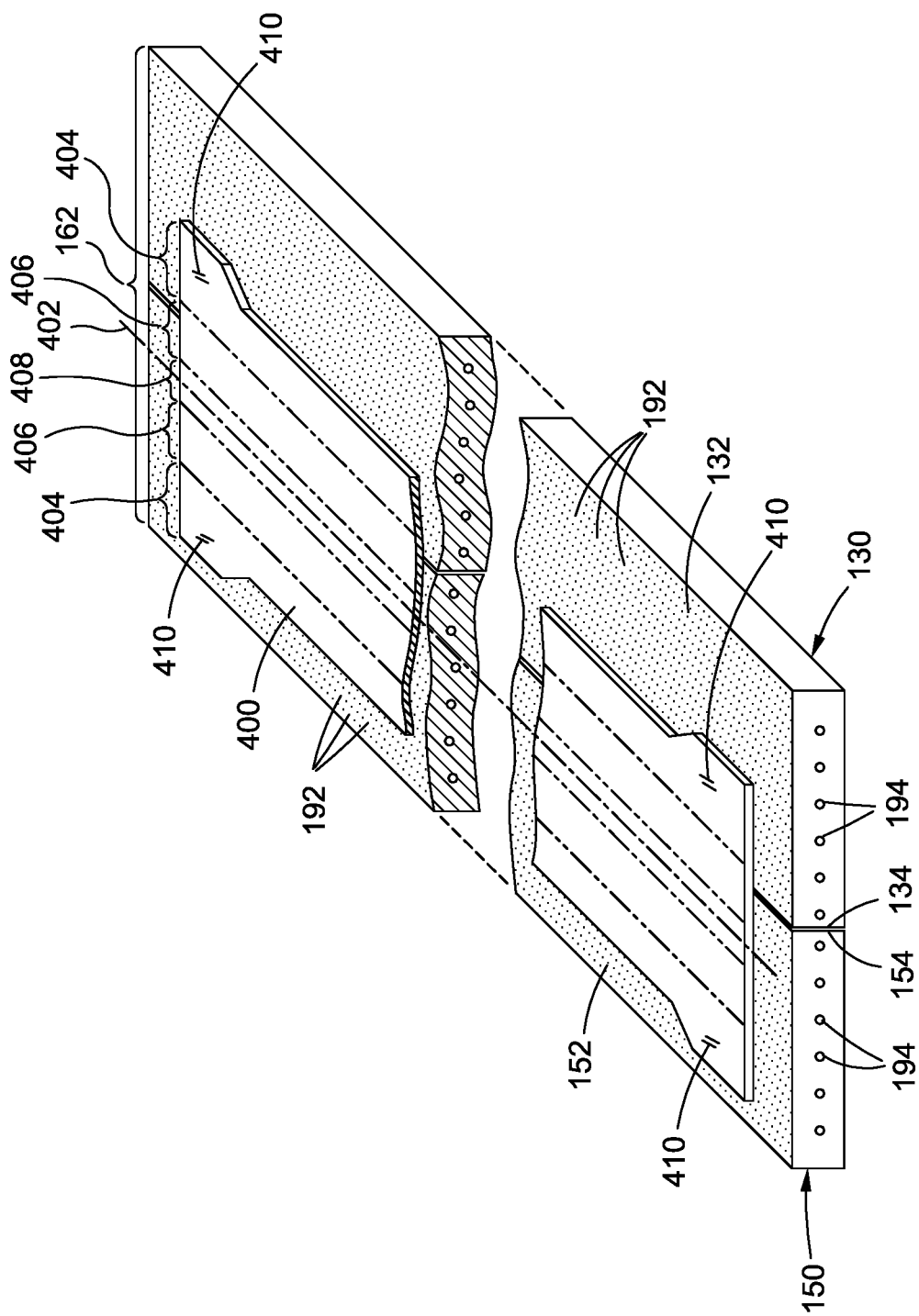
FIG. 13 is a perspective view of the continuous mandrel surface supporting the composite laminate after trimming by the trimming device.

Referring to FIG. 13, shown is the composite laminate 400 of FIG. 6 after being trimmed while supported on the continuous mandrel surface 162. In the example shown, the composite laminate 400 is configured to be formed into the above-mentioned composite stringer (e.g., FIG. 23) and therefore has opposing flange portions 404 on the laterally outboard sides of the composite laminate 400, a pair of web portions 406 located respectively inboard of the web portions 406, and a cap portion 408 located between the web portions 406. The trimming device 330 may accurately trim the composite laminate 400 into a symmetric or asymmetric shape (e.g., about the laminate centerline 402) and which may include any number of a variety of different types of geometric features. For example, in FIG. 13 the trimming device 330 has trimmed the perimeter of the composite laminate 400 to create tabs 410 on each of opposing ends of each of the flange portions 404. Other geometric features may be formed by the trimming devices 330 such as tab outs, cutouts, holes, notches, and other geometric shapes. Advantageously, trimming the composite laminate 400 while supported on the continuous mandrel surface 162 results in a level of trimming accuracy that may be unobtainable if portions of the composite laminate 400 were unsupported during trimming. For example, trimming the composite laminate 400 while the web portions 406 are unsupported may result in a reduction in the accuracy with which the web portions 406 are trimmed due to the inability to prevent movement of the unsupported portions during trimming.

The first mandrel surface 132 and/or the second mandrel surface 152 may be formed of metallic material or a polymeric material. For example, the first mandrel surface 132 and/or the second mandrel surface 152 may be formed of a polymeric material (Vyon™) configured to withstand slices, cuts, or other surface interruptions and/or minimize topographical damage that may be generated (up to a specific number of cuts) during trimming of the composite laminate 400 without affecting the quality of the trimmed composite laminate 400. In addition, the material of the first mandrel surface 132 and/or the second mandrel surface 152 may have a porosity that avoids damage to cutter blades that would otherwise occur if the first mandrel surface 132 and/or the second mandrel surface 152 were metallic. In some examples, the material of the first mandrel surface 132 and/or the second mandrel surface 152 may be resistant to chemical reaction with the composite layup material 310. Alternatively, a barrier film or release film may be placed between the composite laminate 400 and the first mandrel surface 132 and/or the second mandrel surface 152.

As mentioned above, the first mandrel surface 132 and/or the second mandrel surface 152 may include a plurality of apertures 192 fluidly coupled to the vacuum source 196 for generating vacuum pressure 198 (FIG. 12) to secure the composite laminate 400 in fixed position such as during layup and/or trimming. As mentioned above, the manufacturing system 100 may also include the capability to couple the apertures 192 in the second mandrel 150 to a positive air pressure source 222 for generating positive pressure 224 (FIG. 16) to urge the composite laminate 400 away from the second mandrel surface 152 to allow the second mandrel 150 to translate from the closed position 160 (FIGS. 12-13) to the open position 164 (FIG. 17). For example, the manufacturing system 100 may include one or more valves that allow for selectively fluidly coupling the apertures 192 of the first mandrel surface 132 and/or the second mandrel surface 152 to either a vacuum source 196 or to a positive air pressure source 222 to allow for the selection of either vacuum pressure 198 or positive air pressure 224 on the composite laminate 400. The combination of the air pressure source 222 and the apertures 192 define a laminate releasing mechanism 220. The combination of the vacuum source 196 and the apertures 192 define a laminate securing mechanism 190. It should be noted that trimming of the composite laminate 400 is preferably performed prior to forming such that during trimming, an entirety of the composite laminate 400 is supported on the continuous laminate surface which is defined by the first mandrel 130 and the second mandrel 150 in the closed position 160 (FIGS. 12-13). However, in an alternative example, the manufacturing system 100 may be operated in a manner in which the composite laminate 400 is trimmed after forming. For example, the composite laminate 400 may be trimmed while supported by the first mandrel 130 and the second mandrel 150 in the open position 164, and optionally additionally supported by the lower forming die 362 when positioned within the gap 166 (FIG. 17) between the first mandrel 130 and the second mandrel 150.

Figure 15:
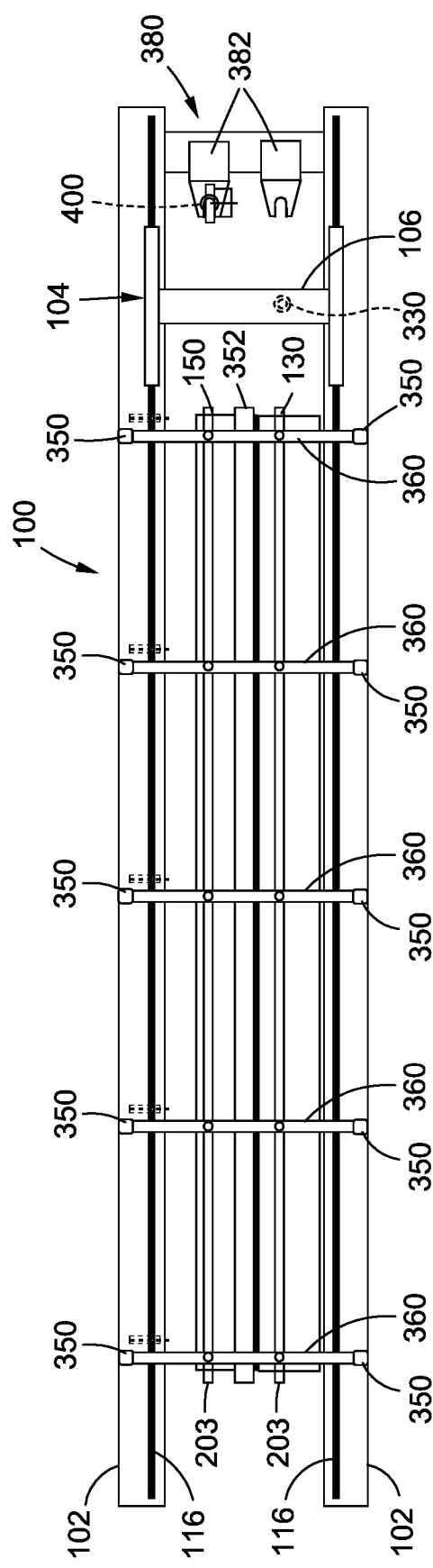
FIG. 15 is a top view of the manufacturing system of FIG. 14.
Figure 14:
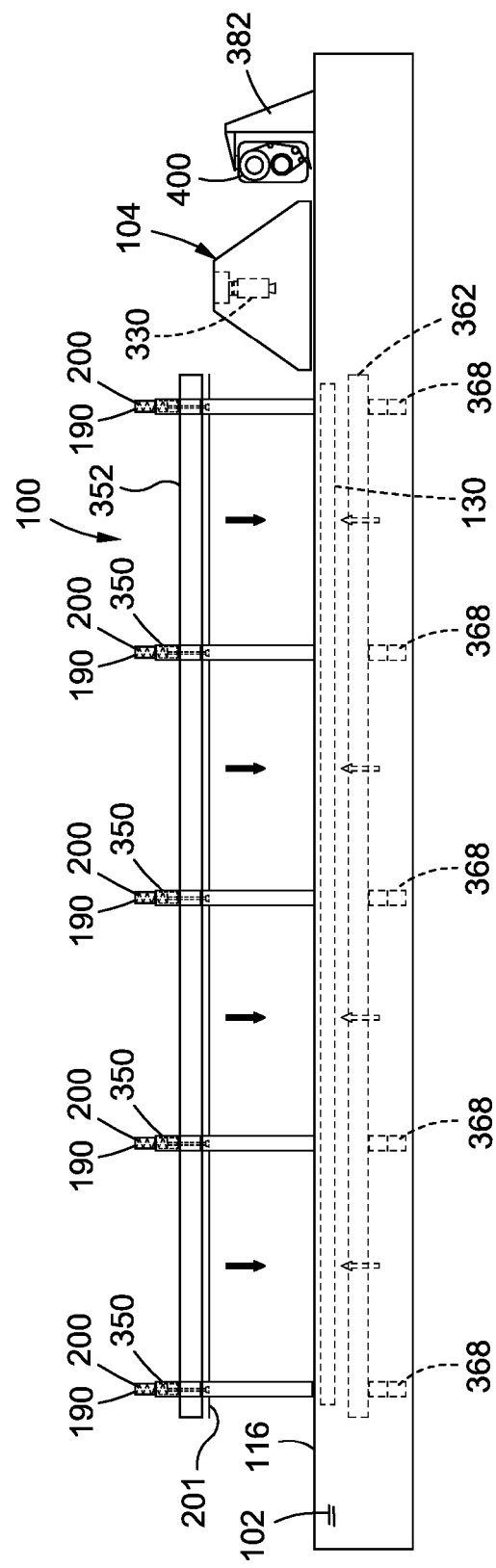
FIG. 14 is a side view of the manufacturing system showing the gantry moved out from underneath the upper forming die which is supported over the first mandrel and second mandrel.

Referring to FIGS. 14-15, shown is a side view (FIG. 14) and a top view (FIG. 15) of the manufacturing system 100 showing the gantry 104 positioned adjacent to the staging area 380 and out from underneath the upper forming die 352. Positioning the gantry 104 out from underneath the upper forming die 352 allows for unimpeded vertical movement of the upper forming die 352 as required during the below-described process of forming the composite laminate 400.

Figure 16:
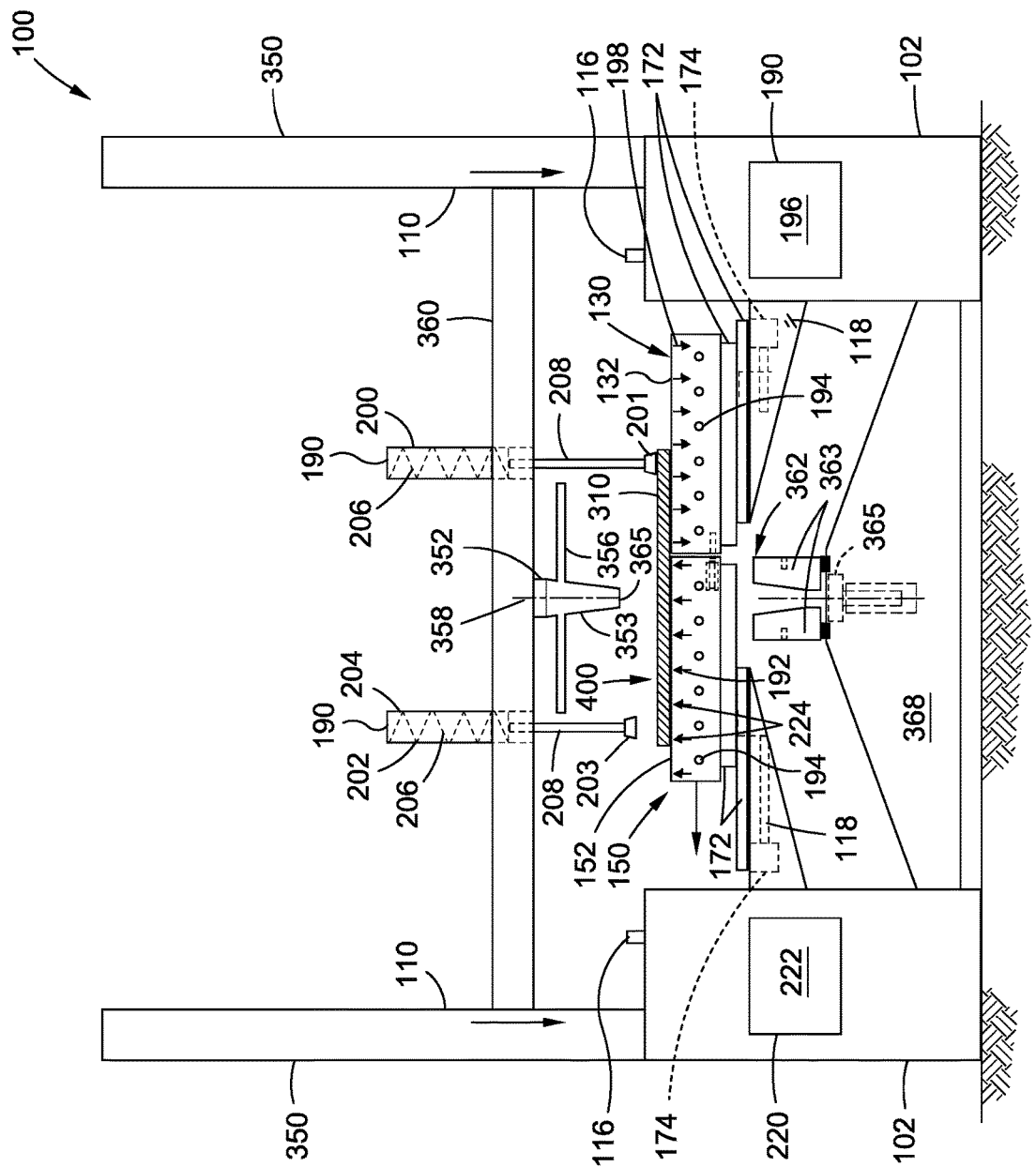
FIG. 16 is an end view of the manufacturing system showing the upper forming die vertically lowered and showing a first clamping bar clamping the composite laminate to the first mandrel surface during the application of vacuum pressure to the apertures of the first mandrel surface while the second mandrel is translated away from the first mandrel during the discharge of positive air pressure from the apertures in the second mandrel surface.
Figure 17:
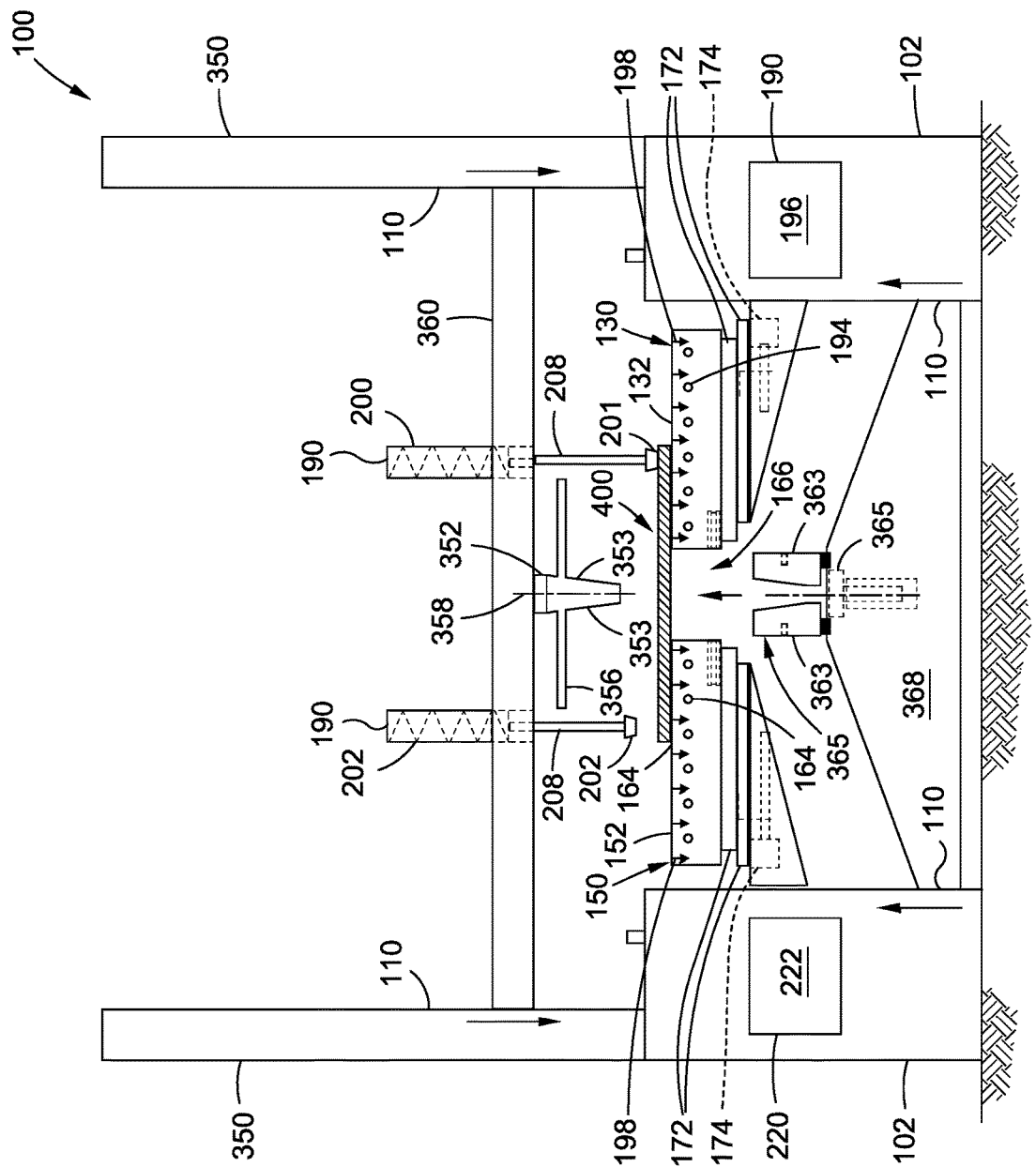
FIG. 17 is an end view of the manufacturing system showing the second mandrel in the open position forming a gap between the first mandrel and the second mandrel and illustrating the upper forming die further vertically lowered and showing the first clamping bar clamping the composite laminate to the first mandrel surface.

Referring to FIG. 16, shown is an end view of the manufacturing system 100 in which the gantry 104 has been omitted for clarity. The upper forming die 352 may be formed as a unitary structure and may include an opposing pair of upper die web portions 353 and an upper die cap portion 355. Alternatively, the upper forming die 352 may be provided as a series of end-to-end upper die segments (not shown). As described below and shown in FIGS. 17-25, the upper forming die 352 is configured to urge the composite laminate 400 into the gap 166 between the first mandrel 130 and the second mandrel 150 to thereby form the composite laminate 400 into the contour of the upper forming die 352. The upper forming die 352 may be supported by a plurality of upper die crossbeams 360 arranged at spaced intervals along a lengthwise direction of the manufacturing system 100. Each one of the upper die crossbeams 360 may be coupled to a pair of posts 350 located on laterally opposite sides of the manufacturing system 100 and extending upwardly from the base member 102. Each one of the upper die crossbeams 360 is vertically movable along vertical tracks 110 via a linear actuation mechanism (not shown) such as a drive screw coupled to a servo motor and which may be incorporated into the posts 350. The plurality of upper die crossbeams 360 are movable in unison for vertically moving the upper forming die 352.

The upper forming die 352 may include a die flange 356 extending from opposite sides of the upper forming die 352. The die flange 356 may have a lateral width that may approximately span the distance between a first clamping bar 201 of the first pinch mechanisms and a second clamping bar 203 of the second pinch mechanisms. The die flange 356 may increase the stiffness of the upper forming die 352 at locations between the upper die crossbeams 360 such that the pressure applied by the upper forming die 352 onto the composite laminate 400 is approximately constant along the length of the upper forming die 352. In addition, the die flange 356 may stop downward movement of the upper forming die 352 upon contact of the die flange 356 with the upper surface of the composite laminate 400.

Referring again to FIGS. 14-16, the manufacturing system 100 may further include laminate securing mechanisms 190 configured as pinch mechanisms 200, 202 configured to mechanically clamp the composite laminate 400 against the first mandrel surface 132 and/or against the second mandrel surface 152. In the example shown, the pinch mechanisms 200, 202 are configured as passive devices that apply clamping pressure to the composite laminate 400 against the first mandrel 130 and the second mandrel 150 as the upper forming die 352 is lowered, as described in greater detail below. Each one of the pinch mechanisms 200, 202 may include a pinch rod 208 extending downwardly from a housing 204 containing a compression spring 206 or a pneumatically-controlled piston (not shown) for delivering stable pressure. In the example shown, the compression spring 206 of each pinch mechanism is captured between the upper end of the pinch rod 208 and the upper end of the housing 204. Each one of the upper die crossbeams 360 may include a first pinch mechanism 200 and a second pinch mechanism 202 respectively mounted on opposite sides of the upper forming die 352.

The free ends of the pinch rods 208 of the first pinch mechanisms 200 may be coupled to the first clamping bar 201 that may extend continuously along a lengthwise direction of the first mandrel 130 for applying a clamping force that is constant along the length of the composite laminate 400 against the first mandrel surface 132. Likewise, the free ends of the pinch rods 208 of the second pinch mechanisms 202 may be coupled to the second clamping bar 203 that may extend continuously along the lengthwise direction of the second mandrel 150 for applying a clamping force that is constant along the length of the composite laminate 400 against the second mandrel surface 152. In one example, the first pinch mechanism 200 and the second pinch mechanism 202 may be positioned on the upper die crossbeam 360 at locations such that the first clamping bar 201 of the first pinch mechanisms 200 and the second clamping bar 203 of the second pinch mechanisms 202 contact the flange portions 404 (FIG. 13) of the composite laminate 400 when the upper die crossbeam 360 is sufficiently lowered. As mentioned above, prior to laying up the composite laminate 400, a sacrificial layer of low-friction material (not shown) may be positioned on the first mandrel surface 132 and the second mandrel surface 152 to facilitate sliding motion of the composite during forming of the composite laminate 400. Similarly, after the composite laminate 400 is laid up, a sacrificial layer of low-friction material may be positioned on top of the composite laminate 400 to facilitate sliding motion of the composite laminate 400 relative to the first clamping bar 201 and second clamping bar 203 during forming of the composite laminate 400.

As shown in FIG. 16, the pinch rod 208 of each one of the first pinch mechanisms 200 extends further downwardly than the pinch rod 208 of each one of the second pinch mechanisms 202 resulting in the first clamping bar 201 of the first pinch mechanisms 200 contacting and clamping the composite laminate 400 against the first mandrel surface 132 prior to the second clamping bar 203 of the second pinch mechanisms 202 clamping the composite laminate 400 against the second mandrel surface 152, thereby allowing the second mandrel 150 to move from the closed position 160 (FIG. 12) toward the open position 164 (FIG. 17) while the first clamping bar 201 clamps the composite laminate 400 in position on the first mandrel surface 132. The first pinch mechanisms 200 and the second pinch mechanisms 202 may be substantially similar to each other with the primary difference being the length of the pinch rod 208. In addition, the compression spring 206 of the second pinch mechanism 202 may optionally be provided with a higher spring constant than the compression spring 206 of the first pinch mechanism 200 so that when the pinch rods 208 of the first pinch mechanisms 200 and the second pinch mechanisms 202 are in contact with the composite laminate 400 and the upper forming die 352 is positioned within the gap 166 between the first mandrel 130 and second mandrel 150, the clamping force exerted by the first clamping bar 201 on the composite laminate 400 against the first mandrel surface 132 is approximately equal to the clamping force exerted by the second clamping bar 203 on the composite laminate 400 against the second mandrel surface 152.

As shown in FIG. 16, the manufacturing system 100 may further include a lower forming die 362 that is positionable within the gap 166 (FIG. 17) between the first mandrel 130 and the second mandrel 150 in the open position 164. In one example, the lower forming die 362 may be positioned below the first mandrel 130 and the second mandrel 150 in the open position 164 and is upwardly translatable into the gap 166 between the first mandrel 130 and the second mandrel 150 as shown in FIG. 17 and described below. In an alternative example, the manufacturing system 100 may be configured such that the lower forming die 362 is vertically static, and the first mandrel 130 and second mandrel 150 are vertically lowered into position on opposite sides of the lower forming die 362. The lower forming die 362 may include an opposing pair of lower die web portions 363. The lower forming die 362 may optionally include a lower die cap potion that may be independently vertically moveable relative to the lower die web portions 363 as described below. Although each one of the lower die web portions 363 is shown as a unitary structure, each lower die web portion 363 may optionally be provided as a series of end-to-end lower die web portion segments (not shown) to allow the segments to accommodate variations in thickness of the composite laminate 400 along the length of the composite laminate 400.

The lower die web portions 363 of the lower forming die 362 are configured to support the composite laminate 400 against forming pressure applied by the upper die web portions 353 of the upper forming die 352. The lower forming die 362 may be supported by a plurality of lower die crossbeams 368 arranged at spaced intervals along the lengthwise direction of the manufacturing system 100. Each one of the lower die crossbeams 368 may extend between and may be movably coupled to the base members 102 located on laterally opposite sides of the manufacturing system 100. For example, the opposing ends of each one of the lower die crossbeams 368 may be engaged to vertical tracks 110 for movement via a linear actuation mechanism (not shown) such as a drive screw coupled to a servo motor and which may be incorporated into the base members 102 at the location of each one of the lower die crossbeams 368. The plurality of lower die crossbeams 368 are movable in unison for vertically moving the lower forming die 362.

Referring still to FIG. 16, the upper forming die 352 is shown lowered into a vertical position in which the first clamping bar 201 of the first pinch mechanism 200 contacts the composite laminate 400 and at least partially clamps the composite laminate 400 against the first mandrel surface 132. Also shown is the second mandrel 150 being translated by the mandrel actuators 174 from the closed position 160 toward the open position 164. As mentioned above, the open position 164 defines a gap 166 between the first mandrel surface edge 134 and the second mandrel surface edge 154. The second mandrel 150 is movable to a lateral location such that the gap 166 is wide enough to receive the lower forming die 362. For example, the second mandrel 150 may be moved to a lateral location forming a gap that is wide enough to receive the lower die web portions 363 when in side-by-side contact with each other (not shown). In the example shown in FIGS. 20-21 and described in greater detail below, the second mandrel 150 is moved to a lateral location that is complementary to the width of the lower die web portions 363 when spaced apart at a distance that results in the composite laminate 400 being clamped between the upper die web portion 353 and the lower die web portion 363 on each of opposite sides of the laminate centerline 402.

In FIG. 16, the manufacturing system 100 may include one or more one or more laminate releasing mechanisms 220 configured to release the composite laminate 400 from the second mandrel surface 152 and allow relative motion between the composite laminate 400 and the second mandrel surface 152 during translation of the second mandrel 150, which may otherwise be hindered by tack or adhesion between the second mandrel surface 152 and the layup material 310 of the composite laminate 400. In one example, the laminate releasing mechanism 220 may be provided as a plurality of apertures 192 (FIG. 6) formed in the second mandrel surface 152, and which may be the same apertures 192 that may be coupled (e.g., via a switch or valve—not shown) to a vacuum source 196 as described above for generating vacuum pressure 198 for securing the composite laminate 400 to the second mandrel surface 152 during layup and trimming. In FIG. 16, the apertures 192 of the second mandrel surface 152 may be coupled to a positive air pressure source 222 via a plurality of fluid conduits 194. Activation of the positive air pressure source 222 may generate positive air pressure 224 in the form of air discharged from the plurality of apertures 192. The discharging air may urge the composite laminate 400 away from the second mandrel surface 152 to allow unhindered translation of the second mandrel 150. Prior to and during translation of the second mandrel 150, the vacuum source 196 may be activated for generating vacuum pressure 198 at the apertures 192 in the first mandrel 130 for securing the composite laminate 400 to the first mandrel surface 132. As mentioned above, the first clamping bar 201 may also apply clamping pressure on the composite laminate 400 against the first mandrel surface 132 during translation of the second mandrel 150.

Referring to FIG. 17, shown is the second mandrel 150 in the open position 164 and resulting in the gap 166 between the first mandrel 130 and the second mandrel 150. The positive air pressure source 222 may be deactivated once the second mandrel 150 is moved to an open position 164 in which the gap 166 is wide enough to receive the lower die web portions 363 of the lower forming die 362. The vacuum source 196 may be activated to generate vacuum pressure 198 between the composite laminate 400 and the first mandrel surface 132 and/or to generate vacuum pressure 198 between the composite laminate 400 and the second mandrel surface 152 to maintain the composite laminate 400 in fixed position relative to the first mandrel surface 132 and the second mandrel surface 152.

Figure 18:
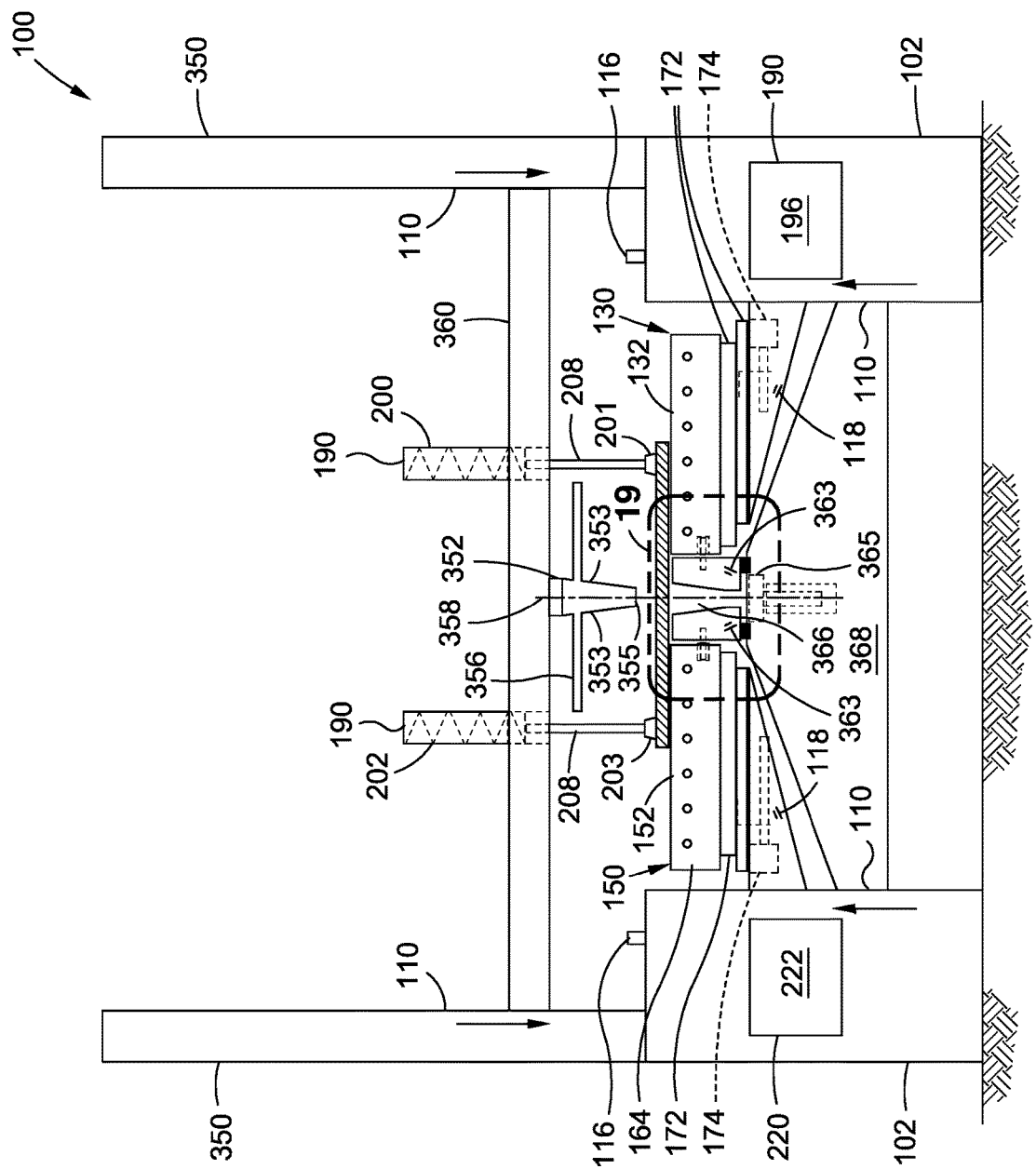
FIG. 18 is an end view of the manufacturing system showing the first clamping bar and a second clamping bar clamping the composite laminate respectively to the first mandrel surface and the second mandrel surface and further illustrating an opposing pair of lower die web portions of a lower forming die vertically raised into position within the gap between the first mandrel and the second mandrel.

FIG. 18 shows the lower forming die 362 vertically raised into position within the gap 166 between the first mandrel 130 and the second mandrel 150. The first pinch mechanism 200 continues to clamp the composite laminate 400 against the first mandrel surface 132. Also shown in FIG. 18 is the upper forming die 352 further lowered to a position in which the second clamping bar 203 applies clamping pressure on the composite laminate 400 against the second mandrel surface 152. Once the first clamping bar 201 and the second clamping bar 203 are applying clamping force of the composite laminate 400 respectively to the first mandrel surface 132 and second mandrel surface 152, the vacuum source 196 may be deactivated. As mentioned above, the manufacturing system 100 may include one or more alignment mechanisms 170 configured to maintain vertical alignment of the second mandrel surface 152 with the first mandrel surface 132.

Figure 19:
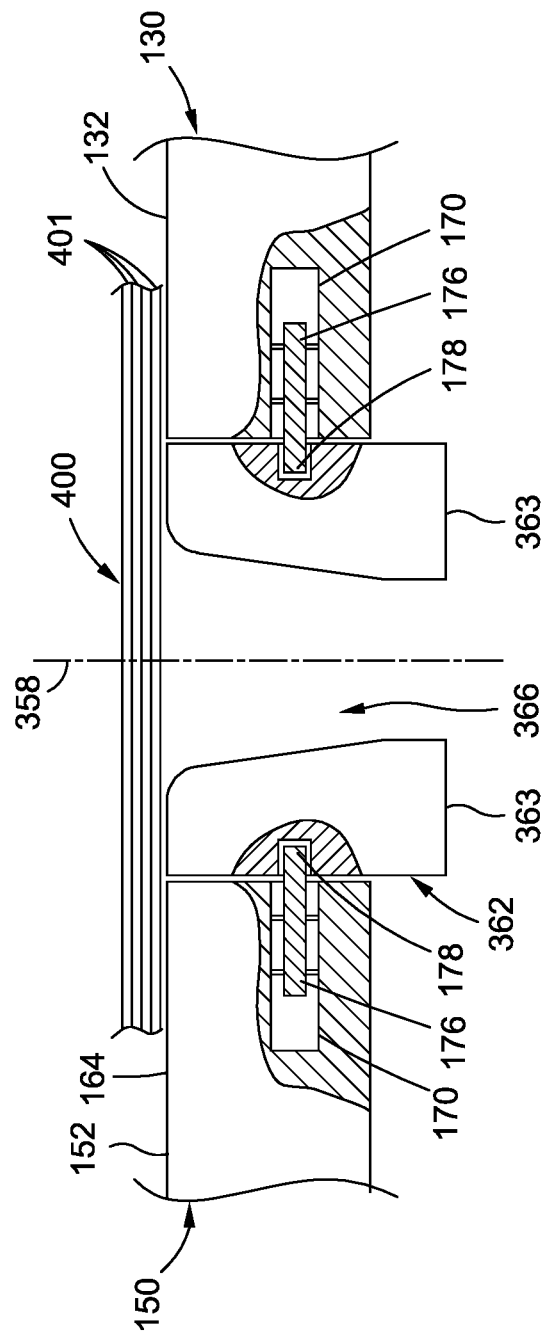
FIG. 19 is a view of the encircled region identified by reference numeral 19 of FIG. 18 and illustrating the first mandrel, the lower die web portions, and the second mandrel interconnected and aligned with each other via alignment mechanisms.

Referring to FIG. 19, shown is a portion of the first mandrel 130, the pair of lower die web portions 363, and the second mandrel 150 interconnected and aligned with one another via alignment mechanisms 170. Also shown is a portion of the composite laminate 400 made up of a plurality of composite plies 401 and supported by the first mandrel surface 132, the lower die web portions 363, and the second mandrel surface 152. The first mandrel surface edge 134 may be in abutting contact with one of the lower die web portions 363. Similarly, the second mandrel surface edge 154 may be in abutting contact with in opposing one of the lower die web portions 363. As mentioned above, the lower die web portions 363 of the lower forming die 362 may be provided with a lower forming die contour 364 configured complementary to upper forming die contour 354 defined by the upper die web portions 353 of the upper forming die 352. Furthermore, the lower edge of each of the upper die web portions 353 and the upper edge of each of the lower die web portions 363 may optionally be radiused to avoid sharp corners in the composite laminate 400 during forming. However, in some examples, the upper forming die 352 and the lower forming die 362 may be provided with sharp corners.

As mentioned above, the manufacturing system 100 may include a plurality of alignment mechanisms 170 for maintaining alignment between the first mandrel surface 132 and the second mandrel surface 152. In the example shown, the first mandrel 130 and second mandrel 150 each include a pin 176 that may be linearly actuated by a linear actuator (not shown). Each one of the lower die web portions 363 may include a socket 178 sized and configured to receive the pin 176 of the first mandrel 130 and the second mandrel 150, similar to the arrangement shown in FIGS. 7-8 and described above. The alignment mechanisms 170 may maintain vertical alignment between the first mandrel 130 and the second mandrel 150 in addition to maintaining alignment with the lower die web portions 363 of the lower forming die 362.

FIG. 20 is an end view of the manufacturing system 100 showing the upper forming die 352 vertically lowered into engagement with the composite laminate 400 while the first clamping bar 201 and second clamping bar 203 clamp the composite laminate 400 respectively to the first mandrel surface 132 and the second mandrel surface 152. The vacuum source 196 may be deactivated to prevent the application of vacuum pressure 198 between the composite laminate 400 and the first mandrel surface 132 and between the composite laminate 400 and the second mandrel surface 152.

FIG. 21 is a magnified view of a portion of the upper forming die 352, the composite laminate 400, the first mandrel 130, the second mandrel 150, and the lower die web portions 363. As mentioned above, the second mandrel 150 is moved to the open position 164 in which the spacing between the lower die web portions 363 is complementary to the width of the upper die cap portion 355. The spacing between the lower die web portions 363 results in the application of laminate clamping pressure 418 on the composite laminate on each of opposing sides of the laminate centerline 402. Notably, the laminate centerline 402 is laterally aligned with the die centerline 358 of the upper forming die 352 and the lower forming die 362.

Referring to FIG. 22, shown is the upper die crossbeam 360 further vertically lowered relative to the position of the upper die crossbeam 360 shown in FIG. 20. The downward urging of the composite laminate 400 into the recess 366 between the lower die web portions 363 simultaneously causes the one of the lower die web portions 363 to move laterally outwardly with the first mandrel 130, and causes the opposing one of the lower die web portions 363 to move laterally outwardly with the second mandrel 150. The first clamping bar 201 and the second clamping bar 203 continue to clamp the composite laminate 400 respectively against the first mandrel surface 132 and the second mandrel surface 152 while the upper forming die 352 urges the composite laminate 400 downwardly between the opposing pair of lower die web portions 363, and resulting in the generation of lateral tension 416 within the composite laminate 400 on each side of the laminate centerline 402. Advantageously, the lateral tension 416 in the composite laminate 400 reduces or prevents the formation of wrinkles or buckles within the composite plies 401 of the composite laminate 400 during forming.

FIG. 23 is a magnified view of a portion of the upper forming die 352, the first mandrel 130, the second mandrel 150, and the lower die web portions 363 showing the composite laminate 400 being urged into the recess between the lower die web portions 363. Also shown is a relatively narrow slipping zone 414 on each side of the laminate centerline 402 within which the composite plies 401 interlaminarly slip relative to one another as the upper forming die 352 is vertically urged downwardly between the lower die web portions 363. The slipping zone 414 on each side of the laminate centerline 402 occurs at the intersection or transition (e.g., the radius) of the upper surface of the lower die web portion 363 with the laterally inward-facing surface of the lower die web portion 363. The slipping zone 414 on each side of the laminate centerline 402 moves along the web portion 406 on each side of the composite laminate 400 as the upper forming die 352 is gradually urged downwardly between the lower die web portions 363, and which advantageously results in lash forming of the composite laminate 400 in a manner which minimizes wrinkles or buckles that would otherwise occur in the composite laminate 400 if the composite laminate 400 were formed to its final contour all at one time.

Also shown in FIG. 23 is the laminate clamping pressure 418 generated on each side of the laminate centerline 402 between the upper die web portion 353 and the lower die web portion 363 during forming of the composite laminate 400. Advantageously, the manufacturing system 100 is configured such that during forming of the composite laminate 400, the die centerline 358 of the upper forming die 352 is maintained in lateral alignment with the die centerline 358 of the lower forming die 362 such that the laminate clamping pressure 418 is equivalent on each side of the laminate centerline 402. The laminate clamping pressure 418 on each side of the laminate centerline 402 provides a mechanism for maintaining the composite laminate 400 in fixed position relative to the upper forming die 352 and lower forming die 362 during forming. The clamping force provided by the first clamping bar 201 and the second clamping bar 203 allows for sliding movement of the flange portions 404 (FIG. 13) of the composite laminate 400 respectively relative to the first mandrel surface 132 and second mandrel surface 152 and respectively relative to the first clamping bar 201 and the second clamping bar 203 as the first mandrel 130 and the second mandrel 150 move laterally outwardly, and which advantageously results in lateral tension 416 in each of laterally opposing sides (e.g., in the flange portions 404) of the composite laminate 400.

Figure 24:
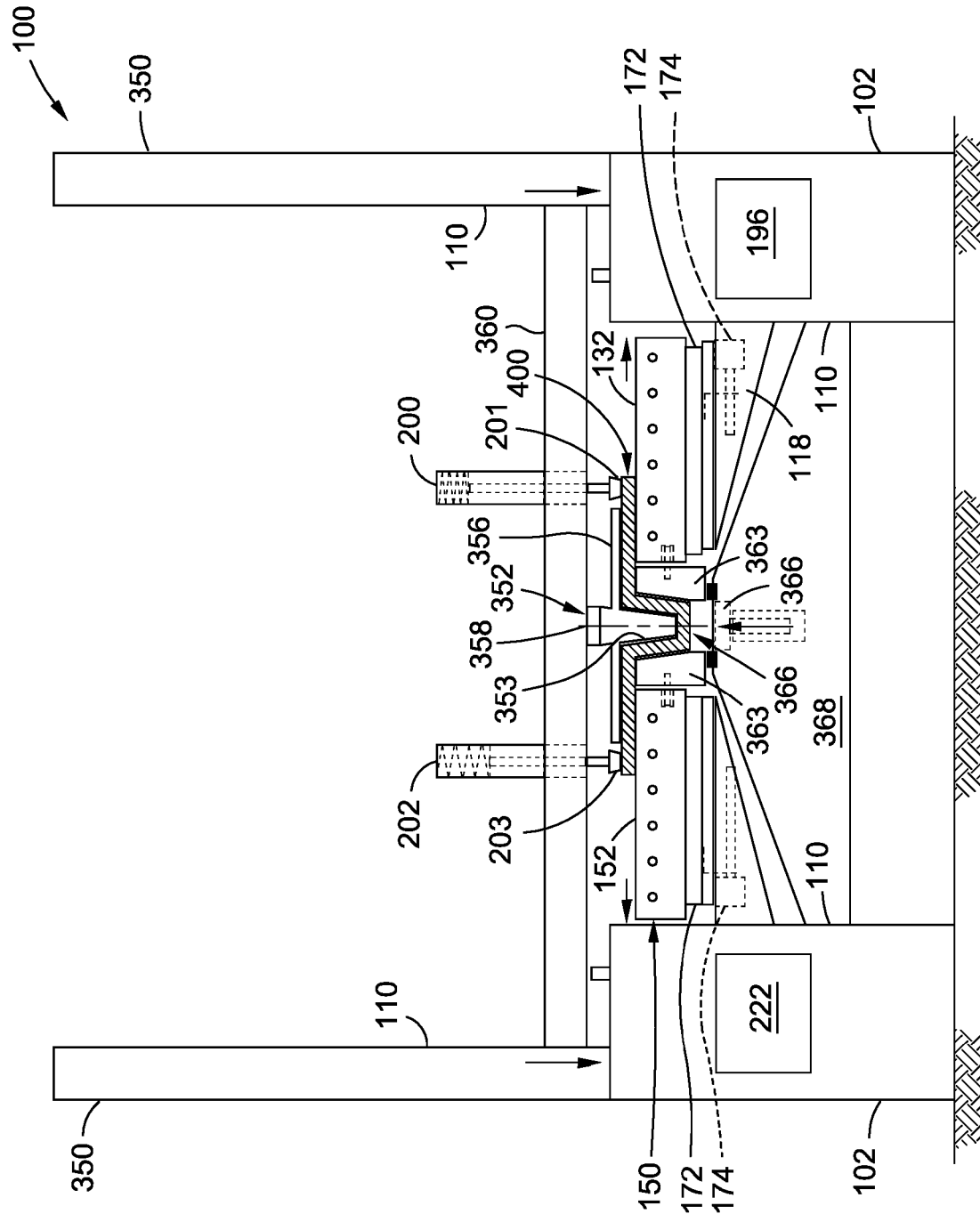
FIG. 24 is an end view of the manufacturing system showing the upper forming die further vertically lowered such that the die flange of the upper forming die is in contact with the composite laminate.

Referring to FIG. 24, shown is the upper forming die 352 further vertically lowered relative to the position of the upper forming die 352 in FIG. 22 and resulting in further laterally outward movement of the first mandrel 130 and second mandrel 150. In FIG. 24, the die flange 356 is in contact with the upper surface of the composite laminate 400 which thereby prevents further downward movement of the upper forming die 352. In some examples, laterally outward movement of the first mandrel 130 and the second mandrel 150 may be passively resisted in order to generate the lateral clamping pressure between the upper forming die 352 and the lower die web portions 363. Alternatively, the mandrel actuators 174 may be operated in a coordinated manner to generate resistance to laterally outward movement of the first mandrel 130 and second mandrel 150 as a means to generate lateral clamping pressure between the upper forming die 352 and the lower die web portions 363. As mentioned above, the first clamping bar 201 and second clamping bar 203 may apply clamping pressure of the composite laminate 400 against the first mandrel surface 132 and second mandrel surface 152 while the upper forming die 352 urges the web portions 406 (FIG. 22) and cap portion 408 (FIG. 22) of the composite laminate 400 into the gap 166 between the first mandrel 130 and the second mandrel 150 or into the recess 366 between the lower die web portions 363 during forming of the composite laminate 400, and resulting in lateral tension 416 (FIG. 22) being maintained in the flange portions 404 (FIG. 13) of the composite laminate 400 on each side of the laminate centerline 402 which thereby reduces or prevents wrinkles or buckles from forming in the composite laminate 400, as mentioned above. The first clamping bar 201 and second clamping bar 203 apply clamping pressure at a magnitude that allows the flange portions 404 to slip laterally between the first clamping bar 201 and first mandrel 130 and between the second clamping bar 203 and second mandrel 150 as the first mandrel 130 and second mandrel 150 move laterally outwardly as the upper forming die 352 progressively plunges the web portions 406 and cap portion 408 of the composite laminate 400 into the gap 166 or into the recess 366 between the lower die web portions 363. In this regard, the relative position of the first clamping bar 201 and second clamping bar 203 with respect to the flange portions 404 changes from FIG. 20 to FIG. 22 to FIG. 24.

Figure 25:
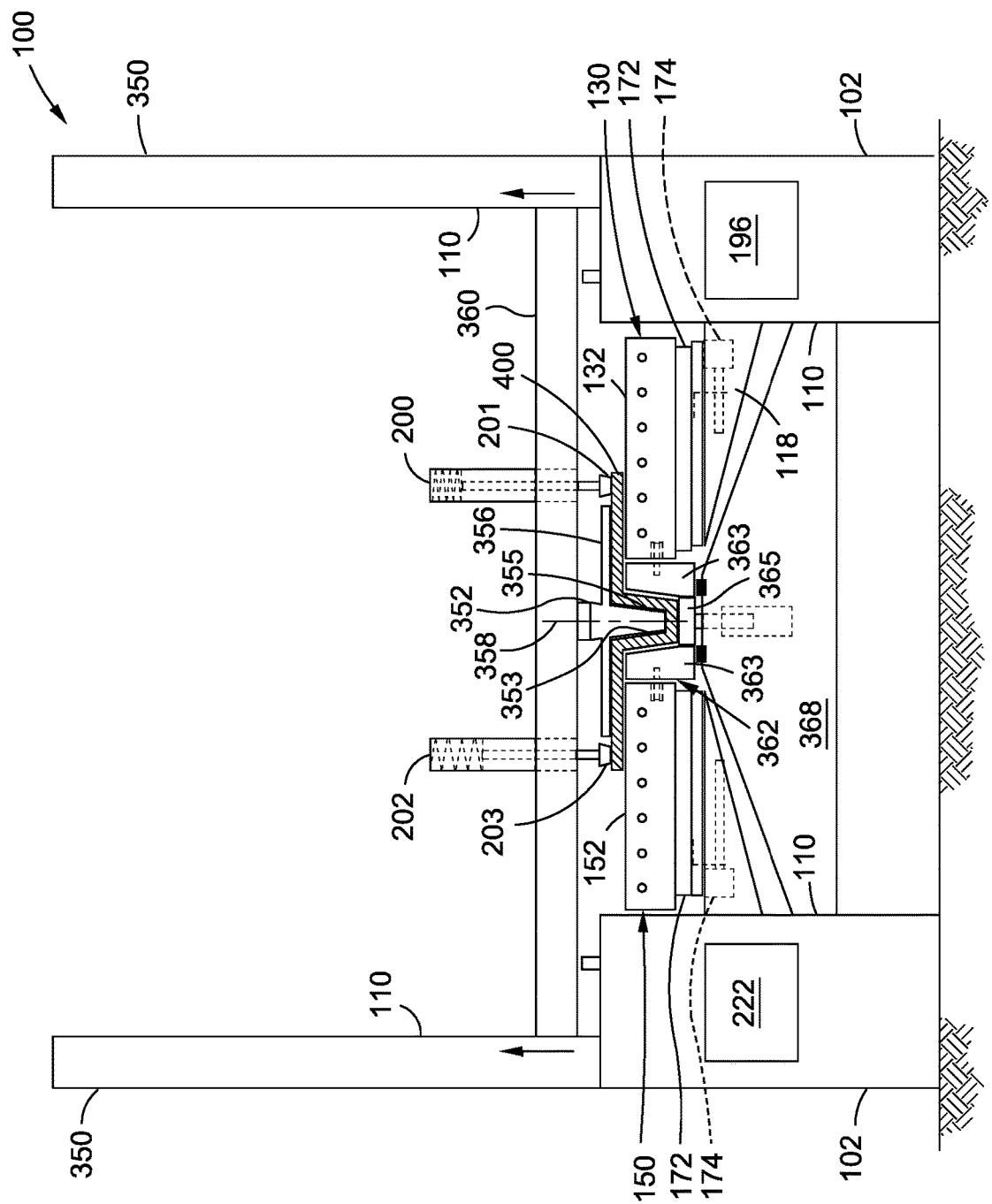
FIG. 25 is an end view of the manufacturing system showing a lower die cap portion of the lower forming die vertically translated into contact with the composite laminate.

FIG. 25 is an end view of the manufacturing system 100 showing the lower die cap portion 365 raised into contact with the cap portion 408 of the composite laminate 400. The lower die cap portion 365 may be vertically raised by linear actuator mechanisms (not shown) at each one of the lower die crossbeam 368. The lower die cap portion 365 may provide support against clamping pressure applied to the composite laminate 400 by the upper die cap portion 355 of the upper forming die 352. During the forming process, the first clamping bar 201 and the second clamping bar 203 may maintain clamping pressure on the composite laminate 400 against the first mandrel surface 132 and the second mandrel surface 152 to generate lateral tension 416 (FIG. 22) in the laterally opposite sides of the composite laminate 400.

Figure 26:
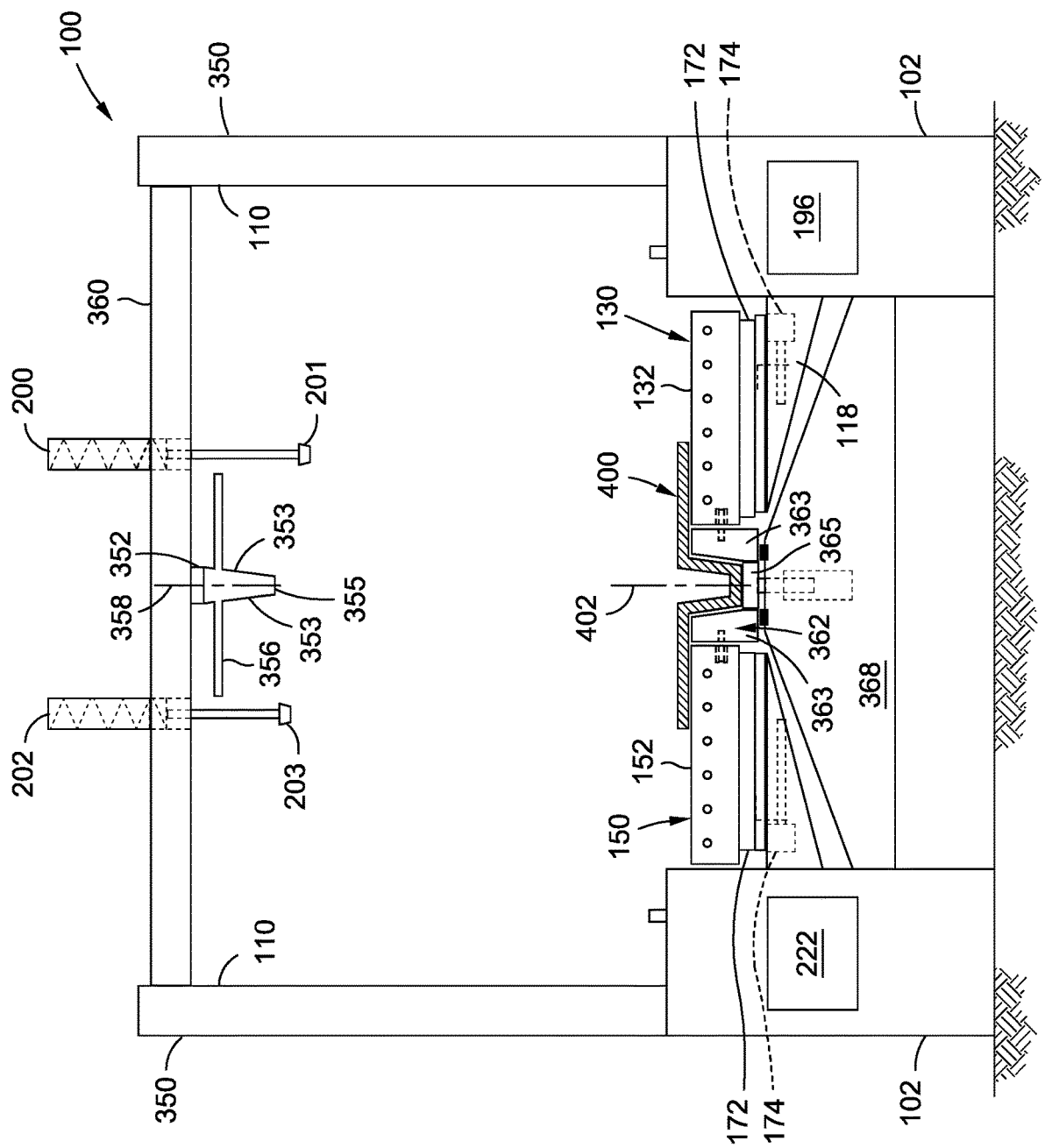
FIG. 26 is an end view of the manufacturing system showing the upper forming die moved back to its original positions.

Referring to FIG. 26, shown is the manufacturing system 100 with the upper forming die 352 moved back to its original position (e.g., FIG. 1) via vertical movement of the upper die crossbeam 360 using one or more linear actuation mechanisms (not shown). The lower forming die 362 may be maintained in position between the first mandrel 130 and the second mandrel 150 to provide support for the composite laminate 400 formed into the final contour.

FIG. 27 shows the composite laminate 400 in the formed condition after removal from the manufacturing system 100. The composite laminate 400 in the formed condition may optionally be transferred to additional processing stations (not shown) for further processing such as further debulking and final curing of the composite laminate 400 into a composite stringer. Although the manufacturing system is described in the context of manufacturing a composite laminate having a hat-shaped or omega-shaped cross section as shown in FIG. 27, the manufacturing system may be operated in a manner to manufacturing composite laminates having alternative cross-sectional shapes. For example, the manufacturing system 100 may be operated in a manner to form a composite laminate having a blade-shaped cross section (not shown) by lowering the lower forming die 362 out of the gap 166 between the first mandrel 130 and the second mandrel 150 in FIG. 26 with the upper forming die 352 already removed from the gap 166, and then bringing the first mandrel 130 and the second mandrel 150 back toward each other to pinch together the composite laminate 400 web portions 406 (FIG. 13) and cap portion 408 (FIG. 13) between the opposing end faces of the first mandrel 130 and the second mandrel 150. In a still further alternative example, the manufacturing system 100 may be operated in a manner to form a composite laminate having a I-shaped cross section (not shown) by pinching together only the web portions 406 (FIG. 13) and allowing the cap portion 408 of the composite laminate to form into the lower horizontal flange (not shown) of the I-shaped cross section and allowing the flange portions 404 of the composite laminate to form into the upper horizontal flange (not shown) of the I-shaped cross section.

Figure 28:
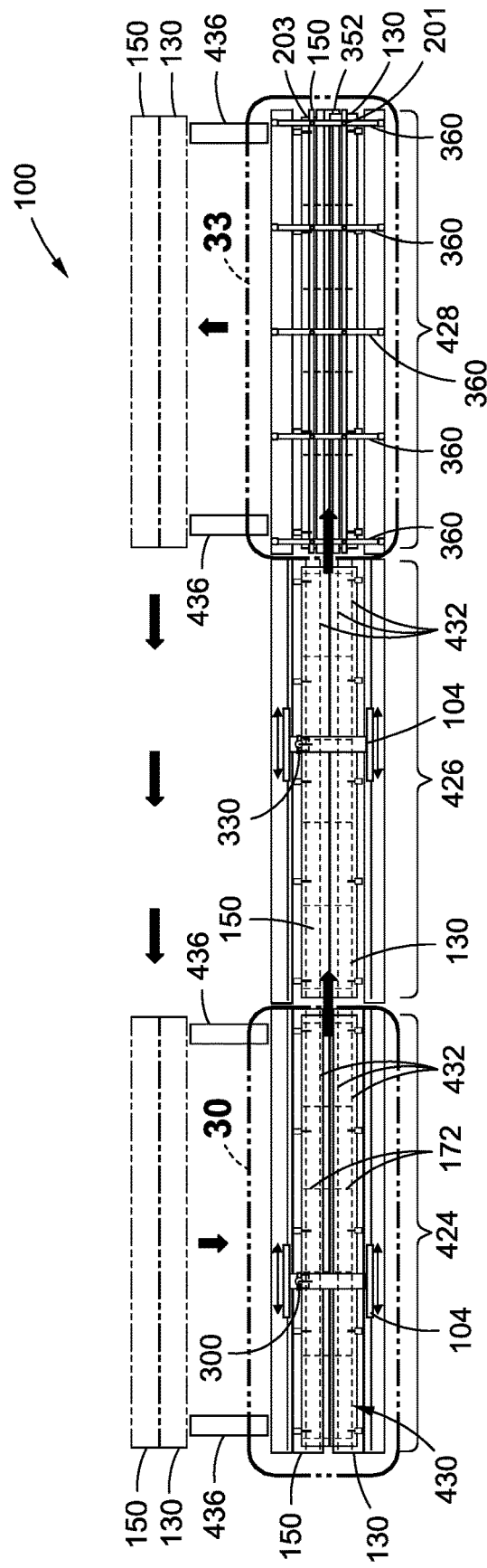
FIG. 28 is a top view of an example of a manufacturing system in which the laying up, trimming, and forming of the composite laminate are respectively performed in a layup station, a trimming station, and a forming station and in which the composite laminate is maintained in fixed position on the first mandrel and/or the second mandrel during the sequential transfer of the first mandrel and second mandrel from the layup station to the trimming station and from the trimming station to the forming station.
Figure 29:
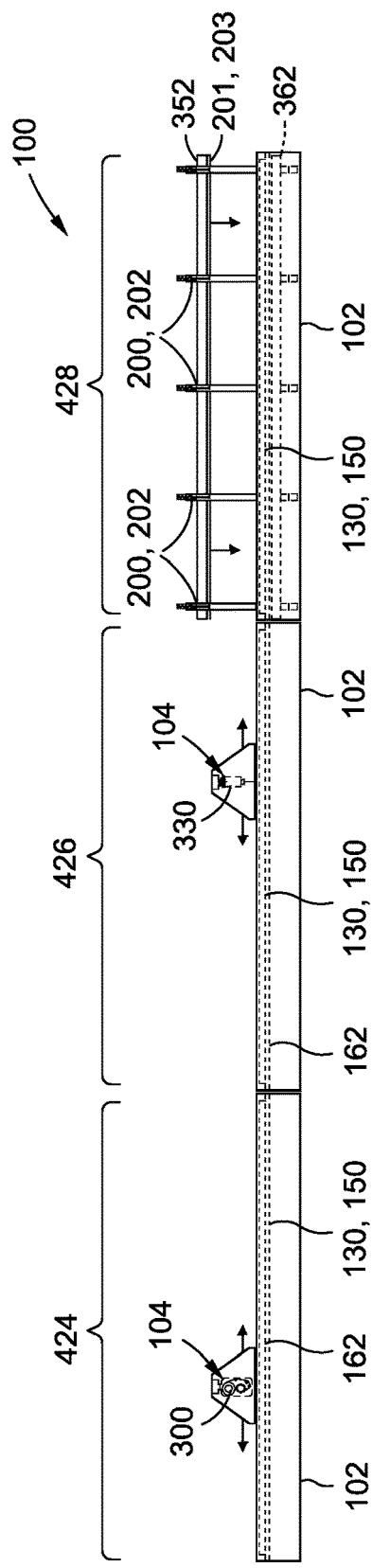
FIG. 29 is a side view of the manufacturing system of FIG. 28.

FIG. 28 is a top view of an example of a manufacturing system 100 in which the trimming, laying up, and forming of the composite laminate 400 are respectively and sequentially performed in a layup station 424, a trimming station 426, and a forming station 428. FIG. 29 is a side view of the manufacturing system 100 of FIG. 28. In the manufacturing system 100 of FIGS. 28-29, the composite laminate 400 is maintained in fixed position on the first mandrel 130 and/or the second mandrel 150 during the sequential transfer of the first mandrel 130 and second mandrel 150 from the layup station 424 to the trimming station 426 to the forming station 428. The manufacturing system 100 of FIGS. 28-29 may include an interstation transfer mechanism 430 configured to facilitate the transfer of the first mandrel 130 and the second mandrel 150 from the layup station 424 to the trimming station 426 to the forming station 428. In one example, the interstation transfer mechanism 430 may include a plurality of longitudinal rails 432 extending lengthwise along the first mandrel 130 and the second mandrel 150, as described in greater detail below. The manufacturing system 100 of FIGS. 28-29 may include one or more linear actuation mechanisms (not shown) for transferring the first mandrel 130 and second mandrel 150 between the layup station 424, the trimming station 426, and the forming station 428 while supported on the longitudinal rails 432. However, the manufacturing system 100 may include any one of a variety of alternative arrangements for supporting and transferring the first mandrel 130 and second mandrel 150 between the layup station 424, the trimming station 426, and the forming station 428.

The above-described laminate securing mechanisms 190 may maintain the composite laminate 400 in fixed position on the first mandrel 130 and/or the second mandrel 150 during the transfer of the first mandrel 130 and the second mandrel 150 from the layup station 424 to the trimming station 426 and from the trimming station 426 to the forming station 428. For example, the manufacturing system 100 may include one or more of the above-described vacuum sources 196 fluidly coupled to apertures (FIG. 6) formed in the first mandrel surface 132 and the second mandrel surface 152 for fixing the composite laminate 400 to the first mandrel 130 or second mandrel 150 via vacuum pressure 198 (e.g., FIGS. 5 and 12) during the transfer of the first mandrel 130 and second mandrel 150 from the layup station 424 to the trimming station 426, and from the trimming station 426 to the forming station 428.

Figure 32:
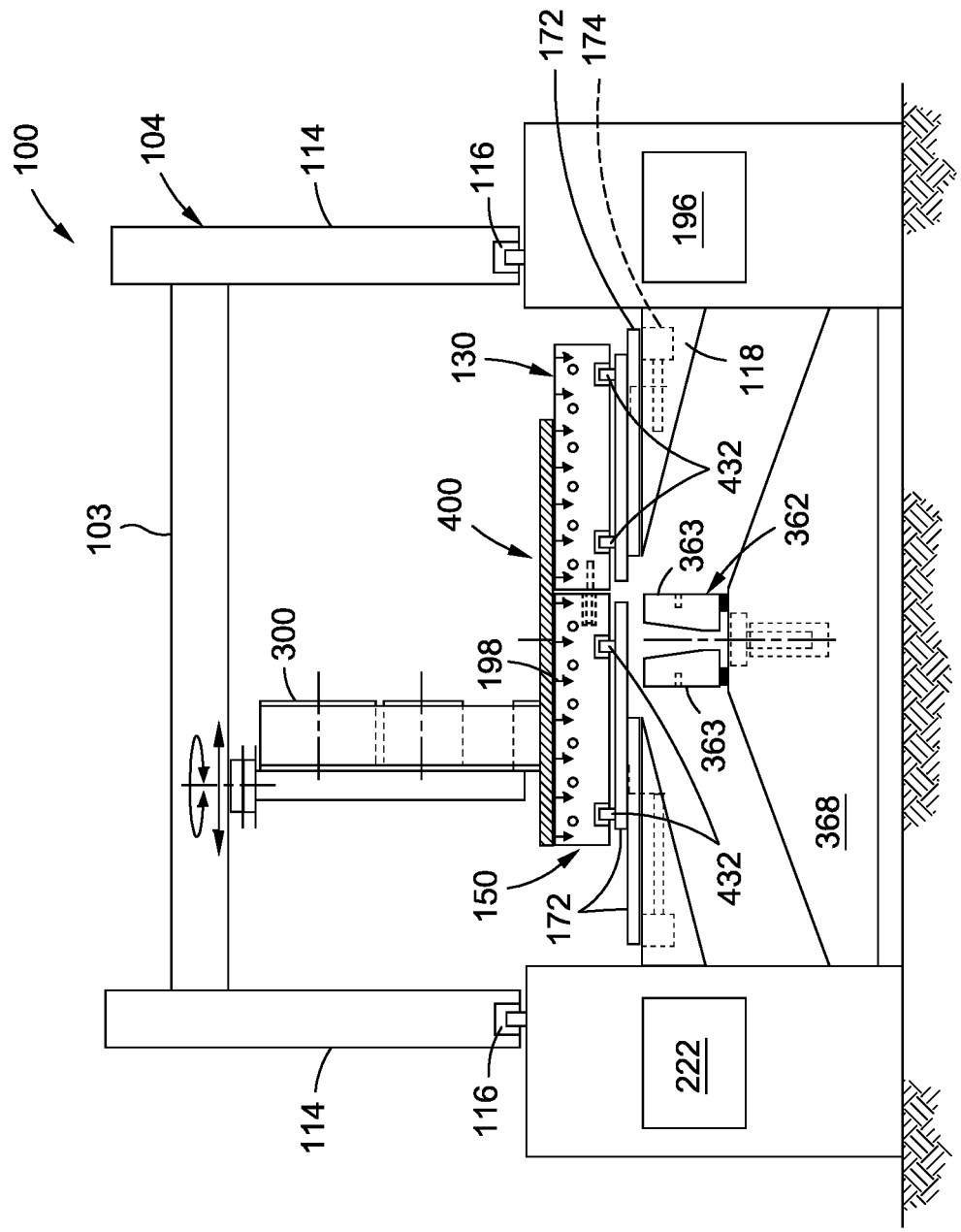
FIG. 32 is an end view of the layup station of FIG. 30.

FIG. 30 is a top view of an example of the layup station 424 of the manufacturing system 100 of FIGS. 28-29. FIG. 31 is a side view of the layup station 424 and FIG. 32 is an end view of the layup station 424. The layup station 424 of FIGS. 30-32 may be configured similar to the above-described arrangement shown in FIGS. 1-8 with the exception that the upper forming die 352, the upper die crossbeam 360, the vertical posts, the lower forming die 362, the lower die crossbeam and the staging area 380 may be omitted, and the interstation transfer mechanism 430 may be included with the first mandrel 130 and the second mandrel 150. For example, FIG. 32 illustrates a parallel set of longitudinal rails 432 supporting the first mandrel 130 and a parallel set of longitudinal rails 432 supporting the second mandrel 150. As described above, the layup station 424 may be configured for laying up the composite laminate 400 on the first mandrel 130 and the second mandrel 150 in the closed position 160 defining the continuous mandrel surface 162. Although shown having a gantry 104, the lamination head 300 may be supported by any one of a variety of arrangements including, but not limited to, a robotic device, a cantilevered support system, or other arrangements.

Although not shown, the trimming station 426 of FIGS. 28-29 may be configured substantially similar to the layup station 424 of FIGS. 30-32 with the exception that in the trimming station 426, the lamination head 300 may be replaced with a trimming device 330 (e.g., FIG. 12) such as an ultrasonic cutter or other trimming device 330. As described above, the trimming station 426 may perform the above-described process of trimming the composite laminate 400 on the continuous mandrel surface 162 which is defined by the first mandrel 130 and second mandrel 150 in the closed position 160. As mentioned above, the trimming of the composite laminate 400 may be performed while the composite laminate 400 is maintained in fixed relation to the first mandrel surface 132 and/or the second mandrel surface 152 such as by using vacuum pressure 198 exerted through the apertures 192 formed in the first mandrel surface 132 an/or the second mandrel surface 152.

Figure 35:
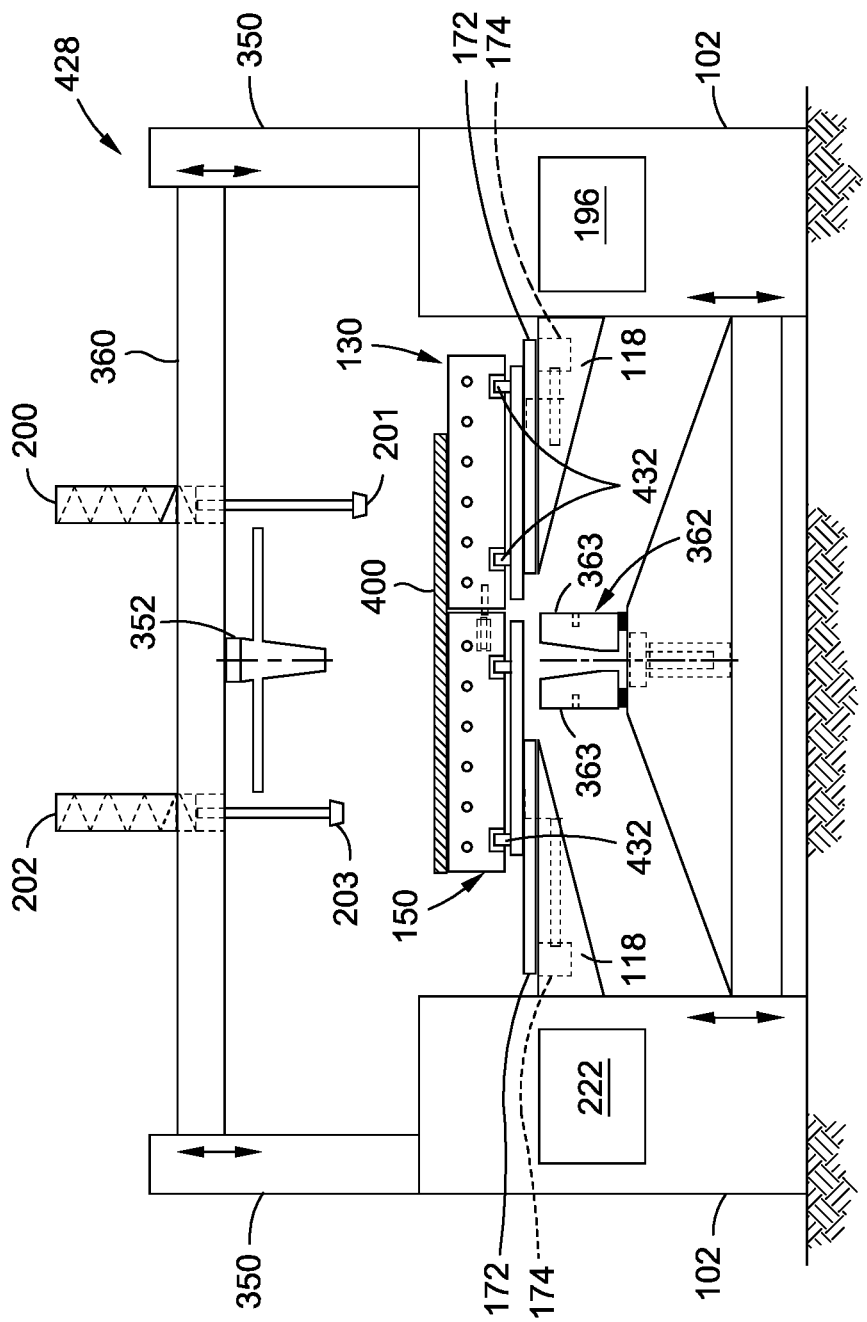
FIG. 35 is an end view of the forming station of FIG. 33.

FIG. 33 is a top view of an example of the forming station 428 of the manufacturing system 100 of FIG. 28-29. FIG. 34 is a side view of the forming station 428 and FIG. 35 is an end view of the forming station 428 of FIG. 33 showing the longitudinal rails 432 for supporting the first mandrel 130 and the second mandrel 150 on the respective mandrel supports 118. The forming station 428 of FIGS. 33-35 may be configured similar to the above-described arrangement shown in FIGS. 1-8 and 16-26 with the exception of the addition of the interstation transfer mechanism 430 (e.g., longitudinal rails 432) and the omission of the gantry 104 and the staging area 380. As described above and illustrated in FIGS. 16-26, the forming station 428 includes the upper forming die 352 and the lower forming die 362 for forming the composite laminate 400 when supported on the first mandrel 130 and the second mandrel 150 in the open position 164 after the composite laminate 400 has been trimmed on the continuous mandrel surface 162 defined by the first mandrel 130 and the second mandrel 150 in the closed position 160.

It should be noted that the examples of the manufacturing system 100 and associated components are not limited to the arrangement shown in the figures and described above. In this regard, the manufacturing system 100 may be provided in any one of a variety of alternative sizes, shapes and configurations for supporting any one or more of the above-described components including, but not limited to, the first mandrel 130, the second mandrel 150, the lamination head 300, the trimming device 330, the upper forming die 352, the lower forming die 362, the laminate releasing mechanisms 220, the alignment mechanisms 170, and the laminate securing mechanisms 190 including the pinch mechanisms 200, 202. For example, as an alternative to using a gantry 104 for positioning a lamination head 300 during layup of a composite laminate 400 on the continuous panel surface, the manufacturing system 100 may include one or more lamination heads 300 supported by one or more robotic devices (not shown) configured to position the lamination head 300 during layup of the composite laminate 400. In another example, as an alternative to using the gantry 104 for positioning a single trimming device 330, the manufacturing system 100 may include a plurality of trimming devices 330 (not shown) that are fixedly supported by a corresponding series of support members (not shown) arranged at spaced intervals along the lengthwise direction of the first mandrel 130 and second mandrel 150.

In yet another example, as an alternative to the upper forming die 352 being fixedly coupled to the vertically-movable upper die crossbeam 360, the upper forming die 352 may be vertically movable by a series of forming die actuators (not shown) supported by a corresponding series of cantilevered beams (not shown) coupled to the base member 102 and arranged at spaced intervals along a lengthwise direction of the upper forming die 352. As an alternative to the lower forming die 362 being vertically raised into the gap 166 between the first mandrel 130 and the second mandrel 150, the lower forming die 362 may be horizontally translated into the gap 166 along a direction parallel to the lengthwise direction of the first mandrel 130 and second mandrel 150. As an alternative to the pinch mechanisms 200, 202 being passive mechanisms coupled to the vertically movable upper die crossbeam 360, the pinch mechanisms 200, 202 may be actively controlled electro-mechanical clamping actuators (not shown) fixedly mounted to the manufacturing system 100. It should also be noted that the manufacturing system 100 may be configured for laying up, trimming, and forming any one of a variety of different sizes, shapes, and configurations of composite laminates, and is not limited to the laying up, trimming and forming a composite laminate into a composite stringer.

Figure 36:
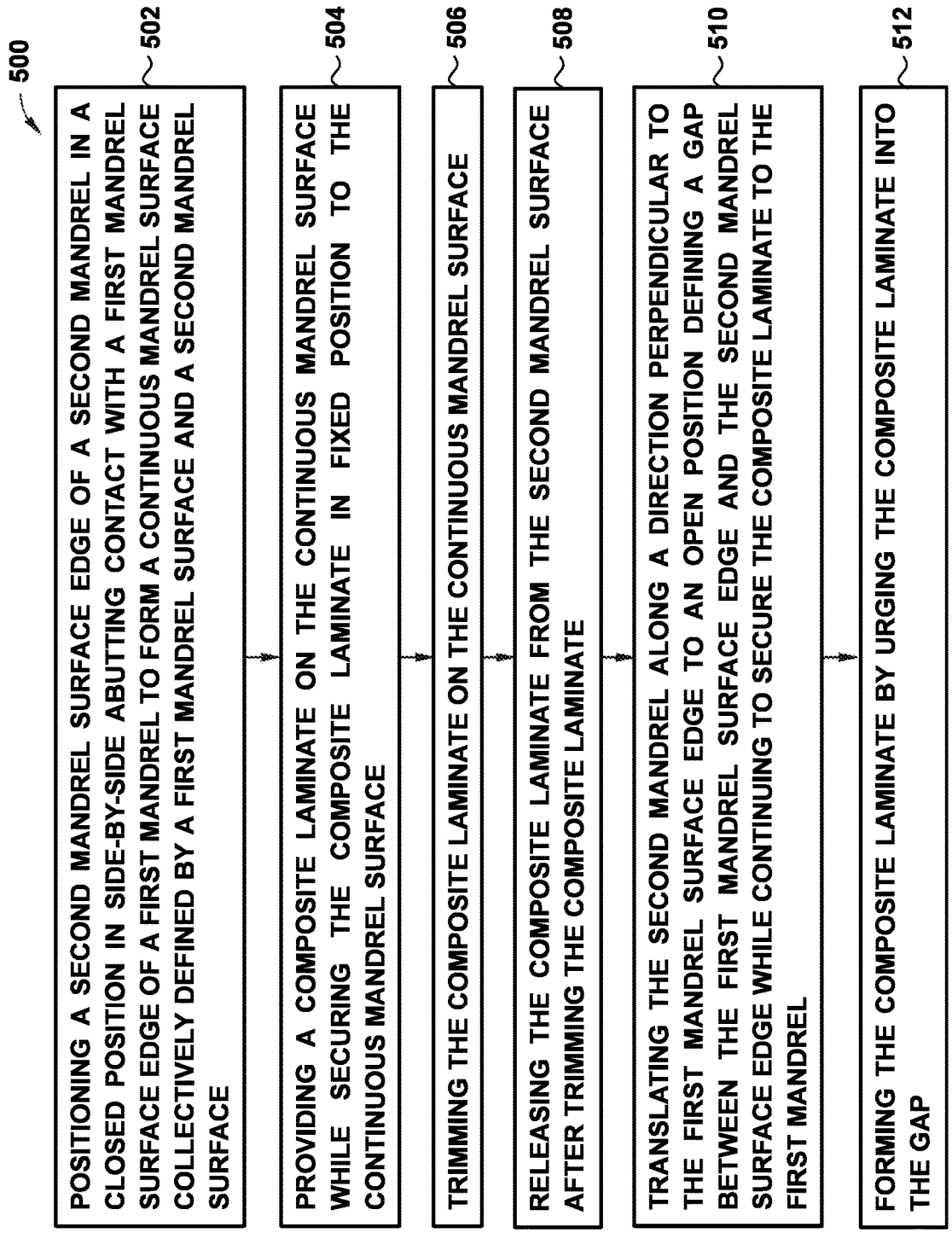
FIG. 36 is a flowchart of operations included in a method of manufacturing a composite laminate.

Referring to FIG. 36, shown is a flowchart of operations included in a method 500 of manufacturing a composite laminate 400. Step 502 of the method 500 includes positioning the second mandrel surface edge 154 of a second mandrel 150 in the closed position 160 in side-by-side abutting contact with the first mandrel surface edge 134 of a first mandrel 130 to form a continuous mandrel surface 162 collectively defined by the first mandrel surface 132 and the second mandrel surface 152. As shown in FIG. 1 and described above, a plurality of mandrel actuators 174 may move the second mandrel 150 toward the first mandrel 130 until the second mandrel 150 edge is in abutting contact with the first mandrel 130 edge to thereby form the continuous mandrel surface 162. The method may further include maintaining alignment between the first mandrel 130 and the second mandrel 150 during the layup, trimming, and/or forming of the composite laminate 400. Vertical alignment may be maintained between the first mandrel surface 132 and the second mandrel surface 152 via a plurality of alignment mechanisms 170 such as the pin 176 and socket 178 arrangement shown in FIGS. 7-8 and/or FIG. 19 and described above.

Step 504 of the method 500 includes providing a composite laminate 400 on the continuous mandrel surface 162 while securing the composite laminate 400 in fixed position to the first mandrel surface 132 and/or the second mandrel surface 152. As mentioned above, in some examples, the composite laminate 400 may be laid up at a remote location (not shown) and then transferred onto the continuous mandrel surface 162. Alternatively, the step of providing the composite laminate 400 may include laying up or applying layup material 310 over the continuous mandrel surface 162 using a lamination head 300 as shown in FIGS. 4-6 and described above. Step 504 may further include securing the composite laminate 400 to the first mandrel surface 132 and/or the second mandrel surface 152 while forming the composite laminate 400. The method may include securing the composite laminate 400 to the first mandrel surface 132 and/or the second mandrel surface 152 after the composite laminate 400 has been provided on the continuous mandrel surface 162. For example, as shown in FIGS. 5-6 and described above, the method may include using vacuum pressure 198 to secure the composite laminate 400 to the first mandrel surface 132 and/or the second mandrel surface 152. The vacuum pressure 198 may be applied to the composite laminate 400 through a plurality of apertures 192 (FIG. 6) that may be formed in the first mandrel surface 132 an/or the second mandrel surface 152. A vacuum source 196 such as a vacuum pump may be activated for generating the vacuum pressure 198 at the apertures 192 for securing the composite laminate 400 to the first mandrel 130 and/or the second mandrel 150. In an alternative example not shown, the method may include mechanically clamping the composite laminate 400 to the first mandrel surface 132 and/or the second mandrel surface 152. Mechanical clamping may be performed using any one of a variety of different configurations of clamping devices. For example, mechanical clamping may be performed using the pinch mechanisms 200, 202 described above and/or illustrated in FIGS. 17-18 and 20-21.

Step 506 of the method 500 includes trimming the composite laminate 400 on the continuous mandrel surface 162 as shown in FIG. 12. Trimming of the composite laminate 400 may be performed using a trimming device 330 such as an ultrasonic cutter, a laser cutter, a mechanical blade, and/or other trimming devices 330. Advantageously, trimming the composite laminate 400 on the continuous mandrel surface 162 may improve the accuracy of trimming due to the entirety of the composite laminate 400 being supported during the trimming operation. Trimming may be performed prior to movement of the second mandrel 150 from the closed position 160 (FIG. 12) to the open position 164 (FIGS. 16-18, 20, 22, and 24-26), as described below. Alternatively, the trimming of the composite laminate 400 may be performed after forming such as when the composite laminate 400 is supported by the first mandrel 130 and second mandrel 150 and optionally additionally supported by the lower die web portions 363 as shown in FIG. 26.

Step 508 of the method 500 includes releasing, using one or more laminate releasing mechanisms 220, the composite laminate 400 from the second mandrel surface 152 after trimming the composite laminate 400 and prior to moving the second mandrel 150 from the closed position 160 to the open position 164. In one example shown in FIG. 16, releasing the composite laminate 400 from the second mandrel surface 152 may be achieved by discharging air from a plurality of apertures 192 (FIG. 6) formed in the second mandrel surface 152. As mentioned above and shown in FIG. 16, the apertures 192 may be fluidly coupled to a positive air pressure source 222 via a plurality of fluid conduits 194 that may be incorporated into the second mandrel 150. Activation of the positive air pressure source 222 results in positive air pressure 224 (FIG. 16) at the apertures 192 which forces the composite laminate 400 away from the second mandrel surface 152 to allow movement of the second mandrel 150.

During movement of the second mandrel 150, the composite laminate 400 may continue to be secured to the first mandrel surface 132 via the laminate securing mechanisms 190. For example, a plurality of first pinch mechanisms 200 (FIG. 16) may at least partially clamp, via a first clamping bar 201, the composite laminate 400 to the first mandrel surface 132 prior to and during movement of the second mandrel 150 to thereby maintain the composite laminate 400 in fixed position on the first mandrel surface 132 while the second mandrel 150 moves relative to the portion of the composite laminate 400 overlying the transiting mandrel surface. As described above, the first clamping bar 201 of the first pinch mechanisms 200 may clamp the composite laminate 400 to the first mandrel surface 132 as a result of lowering the upper die crossbeam 360 as shown in FIG. 16. Alternatively or additionally, the composite laminate 400 may be secured to the first mandrel surface 132 as a result of the continued application of vacuum pressure 198 to the apertures 192 in the first mandrel surface 132.

Step 510 of the method 500 includes translating the second mandrel 150 along a direction transverse to or perpendicular to the first mandrel surface edge 134 from the closed position 160 (FIG. 12) toward the open position 164 to define a gap 166 (FIG. 17) between the first mandrel surface edge 134 and the second mandrel surface edge 154 while continuing to secure the composite laminate 400 to the first mandrel surface 132 via the laminate securing mechanisms 190 (e.g., vacuum pressure 198, pinch mechanisms 202) and while continuing to discharge positive air pressure 224 from apertures 192 in the second mandrel surface 152. Movement of the second mandrel 150 may be effectuated by the mandrel actuators 174. The second mandrel 150 may be supported on the above-described lateral rails 172 (FIGS. 16-17) which may facilitate sliding movement of the second mandrel 150. Once the second mandrel 150 is moved into an open position 164 in which the width of the gap 166 (FIG. 17) is complementary to the width of the upper forming die 352 and/or the lower die web portions 363, a plurality of laminate securing mechanisms 190 may be activated for securing the composite laminate 400 to the second mandrel surface 152. For example, as shown in FIG. 18, the upper die crossbeam 360 may be lowered into a position in which the second clamping bar 203 of the second pinch mechanisms 202 at least partially clamp the composite laminate 400 to the second mandrel surface 152 while the first clamping bar 201 of the first pinch mechanisms 200 continue to at least partially clamp the composite laminate 400 to the first mandrel surface 132. In addition, vacuum pressure 198 may assist in securing the composite laminate 400 to first mandrel surface 132 and the second mandrel surface 152.

Step 512 of the method 500 includes forming the composite laminate 400 into a laminate contour 412 (FIGS. 26-27) by urging the composite laminate 400 into the gap 166. In this regard, the method may include translating the upper forming die 352 downwardly into contact with the composite laminate 400 and forcing the composite laminate 400 into the gap 166 between the first mandrel 130 and second mandrel 150 while the laminate securing mechanisms 190 (e.g., the first clamping bar 201 and the second clamping bar 203) clamp the composite laminate 400 to the first mandrel surface 132 and the second mandrel surface 152. In some examples, prior to vertically lowering the upper forming die 352 into contact with the composite laminate 400, the method may include translating the lower die web portions 363 upwardly into the gap 166 between the first mandrel 130 and the second mandrel 150. The lower forming die 362 may support the composite laminate 400 against forming pressure applied by the upper forming die 352. If the manufacturing system 100 includes the lower forming die 362, the method may include translating the upper forming die 352 to urge the composite laminate 400 into the recess 366 between the lower die web portions 363 while the laminate securing mechanisms 190 continue to clamp the composite laminate 400 to the first mandrel surface 132 and the second mandrel surface 152. As mentioned above, vertical movement of the upper forming die 352 may be facilitated by vertically lowering the upper die crossbeam 360 via linear actuators (not shown). Vertical movement of the lower forming die 362 may be facilitated by vertically raising the lower die crossbeam 360 via linear actuators (not shown).

The method may additionally include maintaining alignment between the first mandrel surface 132 and the second mandrel surface 152 using one or more alignment mechanisms 170 during the process of forming the composite laminate 400. For example, as shown in FIGS. 18-19, prior to the upper forming die 352 making contact with the composite laminate 400, the method may include linearly actuating the pins 176 of the first mandrel 130 and second mandrel 150 into engagement with corresponding sockets 178 formed in the laterally opposite sides of the lower die web portions 363 (FIG. 19) as a means to maintain vertical alignment between the first mandrel surface 132, the lower die web portions 363, and the second mandrel surface 152.

Referring to FIGS. 20-21, as the upper forming die 352 contacts the composite laminate 400, the laminate securing mechanisms 190 (e.g., the first clamping bar 201 and the second clamping bar 203) may continue to at least partially clamp the laterally opposing sides (e.g., the flange portions 404) of the composite laminate 400 respectively to the first mandrel surface 132 and the second mandrel surface 152. As shown in FIG. 21, the spacing between the lower die web portions 363 is complementary to the width of the upper die cap portion 355 which results in the application of laminate clamping pressure 418 on the composite laminate 400 on each of opposing sides of the laminate centerline 402. As mentioned above, the laminate centerline 402 is laterally aligned with the die centerline 358 of the upper forming die 352 and the lower forming die 362 such that the laminate clamping pressure 418 is simultaneously applied in equal magnitude on each of opposing sides of the laminate centerline 402. The laminate clamping pressure 418 maintains the laminate centerline 402 in alignment with the die centerline 358 during forming of the composite laminate 400.

Referring to FIGS. 22-23, shown is the further progression of the plunging of the upper forming die 352 into the recess 366 between the lower die web portions 363 which causes laterally outward movement of the pair of lower die web portions 363 and the first mandrel 130 and the second mandrel. Clamping pressure may be continuously applied by the first clamping bar 201 and the second clamping bar 203 while the upper forming die 352 urges the composite laminate 400 into the recess 366 between the lower die web portions 363, and resulting in the flange portions 404 slipping between the first clamping bar 201 and first mandrel 130 and between the second clamping bar 203 and second mandrel 150 as the first mandrel 130 and second mandrel 150 move laterally outwardly. The combination of laminate clamping pressure 418 between the upper forming die 352 and lower die web portions 363 in combination with the clamping force applied by the first clamping bar 201 and the second clamping bar 203 results in lateral tension 416 on the composite laminate 400 on each of opposing sides of the laminate centerline 402. As mentioned above, the lateral tension 416 in the composite laminate 400 reduces or prevents wrinkling or buckling of the composite plies 401 during forming of the composite laminate 400.

Referring to FIGS. 24-25, shown is the upper forming die 352 lowered into its final position in which the die flange 356 is in contact with the upper surface of the composite laminate 400. In an optional configuration, the lower forming die 362 may include a lower die cap portion 365 which may be raised into contact with the cap portion 408 of the composite laminate 400 to provide support against clamping pressure applied on the composite laminate 400 by the upper die cap portion 355 of the upper forming die 352.

Referring to FIG. 26, after the composite laminate 400 is formed into the laminate contour 412, the method may include vertically translating the upper forming die 352 back to its original position (e.g., FIG. 1). Referring to FIG. 27, the method may include removing the formed composite laminate 400 from the manufacturing system 100 for optional further processing such as debulking and/or final curing.

Referring to FIGS. 28-35, the method of manufacturing the composite laminate 400 may be performed on a manufacturing system 100 having a layup station 424, a trimming station 426, and a forming station 428 described above. In such a configuration of the manufacturing system 100, the method may include transferring the first mandrel 130 and the second mandrel from the layup station 424 to the trimming station 426 after laying up the composite laminate 400, and transferring the composite laminate 400 from the trimming station 426 to the forming station 428 after trimming of the composite laminate 400. The transfer of the first mandrel 130 and second mandrel 150 between the layup station 424, the trimming station 426 and the forming station 428 may be performed using an interstation transfer mechanism 430 such as the above-described longitudinal rails 432 and one or more linear actuation mechanisms (not shown). During the transfer of the first mandrel 130 and second mandrel 150 between the layup station 424, the trimming station 426, and the forming station 428, the method may include maintaining the composite laminate 400 in fixed position on the first mandrel 130 and/or the second mandrel 150. Maintaining the composite laminate 400 in fixed position on the first mandrel 130 and/or the second mandrel 150 may be performed using the above-described laminate securing mechanisms 190 for applying vacuum pressure 198 to the composite laminate 400 via apertures 192 formed in the first mandrel surface 132 and/or the second mandrel surface 152. Alternatively or additionally, the composite laminate 400 may be secured on the first mandrel 130 an/or the second mandrel 150 by using one or more mechanical clamping devices (not shown).

For a manufacturing system 100 configured as shown in FIGS. 28-35, Step 504 of providing a composite laminate 400 on the continuous mandrel surface 162 may include laying up the composite laminate 400 at the layup station 424. The layup of the composite laminate 400 may be performed on the continuous mandrel surface 162 collectively defined by the first mandrel 130 and the second mandrel 150 in the closed position 160. As described above, the layup station 424 may be configured similar to the arrangement shown in FIGS. 30-32 and may include a lamination head 300 supported on a gantry 104 as described above with regard to FIGS. 4-5, although the lamination head 300 may be supported by any number of devices including a robotic device, a cantilevered support, or other structural arrangements.

For the manufacturing system 100 of FIGS. 28-35, Step 506 of trimming the composite laminate 400 may be performed on the continuous mandrel surface 162 at the trimming station 426 after laying up the composite laminate 400 on the same continuous mandrel surface 162 at the layup station 424 and then transferring the composite laminate 400 from the layup station 424 to the trimming station 426 via the interstation transfer mechanism 430 such as the above-described longitudinal rails 432 using one or more linear actuation mechanisms (not shown). Alternatively, the composite laminate 400 may be trimmed after forming such as when supported by the first mandrel 130 and second mandrel 150 and by the lower die web portions 363 as shown in FIG. 26. Trimming of the composite laminate 400 may be performed using a trimming device 330 such as the ultrasonic cutter illustrated in FIG. 12. After trimming of the composite laminate 400 is complete, the method may include transferring the first mandrel 130 and second mandrel 150 from the trimming station 426 to the forming station 428 via the above-described interstation transfer mechanism 430 (e.g., longitudinal rails 432 and linear actuation mechanisms).

Step 512 of forming the composite laminate 400 may be performed at the forming station 428 with the first mandrel 130 and the second mandrel 150 in the open position 164 as described above and illustrated in FIGS. 16-26. After forming of the composite laminate 400 is complete, the composite laminate 400 may be removed from the first mandrel 130 and second mandrel 150 and transferred to another location (not shown) such as to a holding station (not shown) or to a subsequent manufacturing (station) for further processing such as debulking and/or final curing. The composite laminate 400 may be manually lifted off of the first mandrel 130 and the second mandrel 150, or a vacuum lifting device (not shown) and overhead crane or gantry (not shown) may be used to lift the composite laminate 400 off of the first mandrel 130 and the second mandrel 150 and transfer the composite laminate 400 to another location (not shown). After removal of the composite laminate 400, the first mandrel 130 and the second mandrel 150 may be recirculated back to the layup station 424 for layup of another composite laminate 400 on the continuous mandrel surface 162 defined by the first mandrel 130 and second mandrel 150 in the closed position 160. Recirculation of the first mandrel 130 and second mandrel 150 from the forming station 428 back to the layup station 424 may be performed using a mandrel recirculation system 434. For example, the first mandrel 130 and second mandrel 150 may be transferred from the forming station 428 back to the layup station 424 using a conveyor system 436 which may include a pair of laterally-oriented conveyor belts (not shown) respectively positioned at opposing ends of the forming station 428 and configured to transfer the first mandrel 130 and second mandrel 150 from the forming station 428 onto a longitudinally-oriented conveyor belt (not shown) extending from the forming station 428 to the layup station 424. The manufacturing system 100 may include another pair of laterally-oriented conveyor belts respectively located at opposing ends of the layup station 424 for transferring the first mandrel 130 and second mandrel 150 from the longitudinally-oriented conveyor belt to the layup station 424. The mandrel recirculation system 434 may include additional hardware such as one or more robotic devices for picking up and placing the first mandrel 130 on and off the conveyor system 436.

Referring to FIGS. 37-51, shown in FIGS. 37 and 38 is a top view and a side view respectively of a further example of a manufacturing system 100 in which the layup, trimming, and forming of the composite laminate 400 (FIG. 39) are respectively and sequentially performed in a layup station 424, a trimming station 426, and a forming station 428. The layup station 424 has a layup mandrel set 425 including a first mandrel 130 and a second mandrel 150 configured for supporting the composite laminate 400 during the laying up of the composite laminate 400 via one or more lamination heads 300. The trimming station 426 has a trimming mandrel set 427 including a first mandrel 130 and a second mandrel 150 configured for supporting the composite laminate 400 during trimming of the composite laminate 400 via a trimming device 330. The forming station 428 has a forming mandrel set 429 including a first mandrel 130 and a second mandrel 150 configured for supporting the composite laminate 400 during forming via an upper forming die 352 and a lower forming die 362 at the forming station 428.

In FIGS. 37-51, the interstation transfer mechanism 430 is comprised of an upper clamping mechanism 450 and a lower clamping mechanism 480 configured to clamp onto the composite laminate 400 and transfer the composite laminate 400 between the stations while the first mandrel 130 and the second mandrel 150 at each station remain stationary. In FIGS. 37-51, the upper forming die 352 and the lower forming die 362 may function respectively as the upper clamping mechanism 450 and the lower clamping mechanism 480 for engaging (e.g., clamping onto) and transferring the composite laminate 400 between the stations. Advantageously, the upper forming die 352 and/or the lower forming die 362 may maintain the composite laminate 400 in alignment with the stations during the transfer. As described below, in one example, the upper clamping mechanism 450 (e.g., the upper forming die 352) and/or the lower clamping mechanism 480 (e.g., the lower forming die 362) are configured to engage the composite laminate 400. For example, the upper clamping mechanism 450 and the lower clamping mechanism 480 may be configured to clamp onto the cap portion 408 (e.g., FIGS. 44 and 58) of the composite laminate 400 which spans the gap 166 (e.g., FIGS. 43 and 57) between the first mandrel 130 and second mandrel 150 when in the open position 164 (FIG. 43). In another example described below, the lower clamping mechanism 480 may be configured to engage the cap portion 408 via the application of vacuum pressure 198 drawn through apertures 192 formed in the lower clamping mechanism 480. During the transferring of the composite laminate 400 between stations and/or to subsequent manufacturing stations (not shown), the lower clamping mechanism 480 (e.g., the lower die cap portion 365 of the lower forming die 362) may move within and along a lengthwise direction of the gap 166. In some examples, positive air pressure 224 (FIG. 43) may be discharged from a plurality of apertures 192 (FIG. 6) formed in the first mandrel 130 and/or second mandrel 150 to float the composite laminate 400 over the first mandrel 130 and second mandrel 150 at each station during the transferring of the composite laminate 400. Advantageously, the ability to use the upper forming die 352 and/or the lower forming die 362 for transferring the composite laminate 400 between stations eliminates the need for external equipment such as a separate pick-and-place system (not shown) for transferring the composite laminate 400.

Referring to FIGS. 37-38, the layup station 424 may include a gantry 104 supporting one or more lamination heads 300. The gantry 104 may be configured similar to the above-described arrangement shown in FIGS. 4-5. In this regard, the gantry 104 may be movable along the gantry tracks 116 (FIG. 39) that may be included with the base members 102 of the manufacturing system 100. The gantry tracks 116 may extend continuously along the layup station 424, the trimming station 426 and the forming station 428 to allow the gantry 104 to be temporarily positioned at the trimming station 426 and/or at the forming station 428 (e.g., FIGS. 40-41, 45) to avoid interfering with the movement of the upper forming die 352 and lower forming die 362 when transferring the composite laminate 400 between the stations.

In FIGS. 37-38, the trimming station 426 may also include a gantry 104 which may support a trimming device 330 for trimming the composite laminate 400 after being transferred from the layup station 424. Similar to the above-described arrangement of the gantry 104 supporting the lamination head 300, the gantry 104 supporting the trimming device 330 may also be movable along the above-described gantry tracks 116 to allow the trimming device 330 to be temporarily positioned at the layup station 424 and/or forming station 428 to avoid interfering with the movement of the upper clamping mechanism 450 and lower clamping mechanism 480 when transferring the composite laminate 400 between stations.

FIG. 39 is a sectional view of the layup station 424 showing an example of a lamination head 300 laying up the composite laminate 400 on the first mandrel 130 and the second mandrel 150 in the closed position 160. The first mandrel 130 and/or the second mandrel 150 may include the above-mentioned apertures 192 for drawing a vacuum pressure 198 on the composite laminate 400 to secure the composite laminate 400 in position in the same manner as described above with regard to FIGS. 5-6. Alternatively or additionally, positive air pressure 224 (FIG. 43) may be discharged from the apertures 192 for releasing the composite laminate 400 from the first mandrel surface 132 (FIG. 43) and/or the second mandrel surface 152 (FIG. 43) in the same manner described above with regard to FIG. 16. The lamination head 300 and the supporting hardware may be configured similar to the above-described arrangement shown in FIGS. 5-8. For example, the lamination head 300 may be supported on a gantry crossbeam 106 of a gantry 104. The opposing ends of the gantry crossbeam 106 may be coupled to a pair of beam supports 114 which may be movable along a pair of gantry tracks 116 respectively mounted on the pair of base members 102. The base members 102 may include additional gantry tracks 116 to facilitate movement of the upper forming die 352 (FIGS. 37-38) and lower forming die 362 (FIGS. 37-38) between stations, as described below.

FIG. 40 is a side view of the manufacturing system 100 showing the upper forming die 352 and the lower forming die 362 moving from the forming station 428 toward the layup station 424. As described above with regard to FIG. 16, the upper forming die 352 may be supported by a plurality of upper die crossbeams 360 (FIG. 42) arranged at spaced intervals along a lengthwise direction of the manufacturing system 100. Each one of the upper die crossbeams 360 may be coupled to a pair of posts 350 (FIG. 42) extending upwardly respectively from the base members 102 on laterally opposite sides of the manufacturing system 100. The plurality of posts 350 are movable in unison along the gantry tracks 116 via one or more linear actuation mechanisms (not shown). In FIG. 40, the gantry 104 of the trimming device 330 and the gantry 104 of the lamination head 300 are shown temporarily placed in the forming station 428 to avoid interfering with the movement of the upper forming die 352 and lower forming die 362 in transferring the composite laminate 400 (FIG. 39) from the layup station 424 to the trimming station 426. FIG. 41 shows the upper forming die 352 and lower forming die 362 at the layup station 424 in preparation for clamping onto the composite laminate 400.

Figure 42:
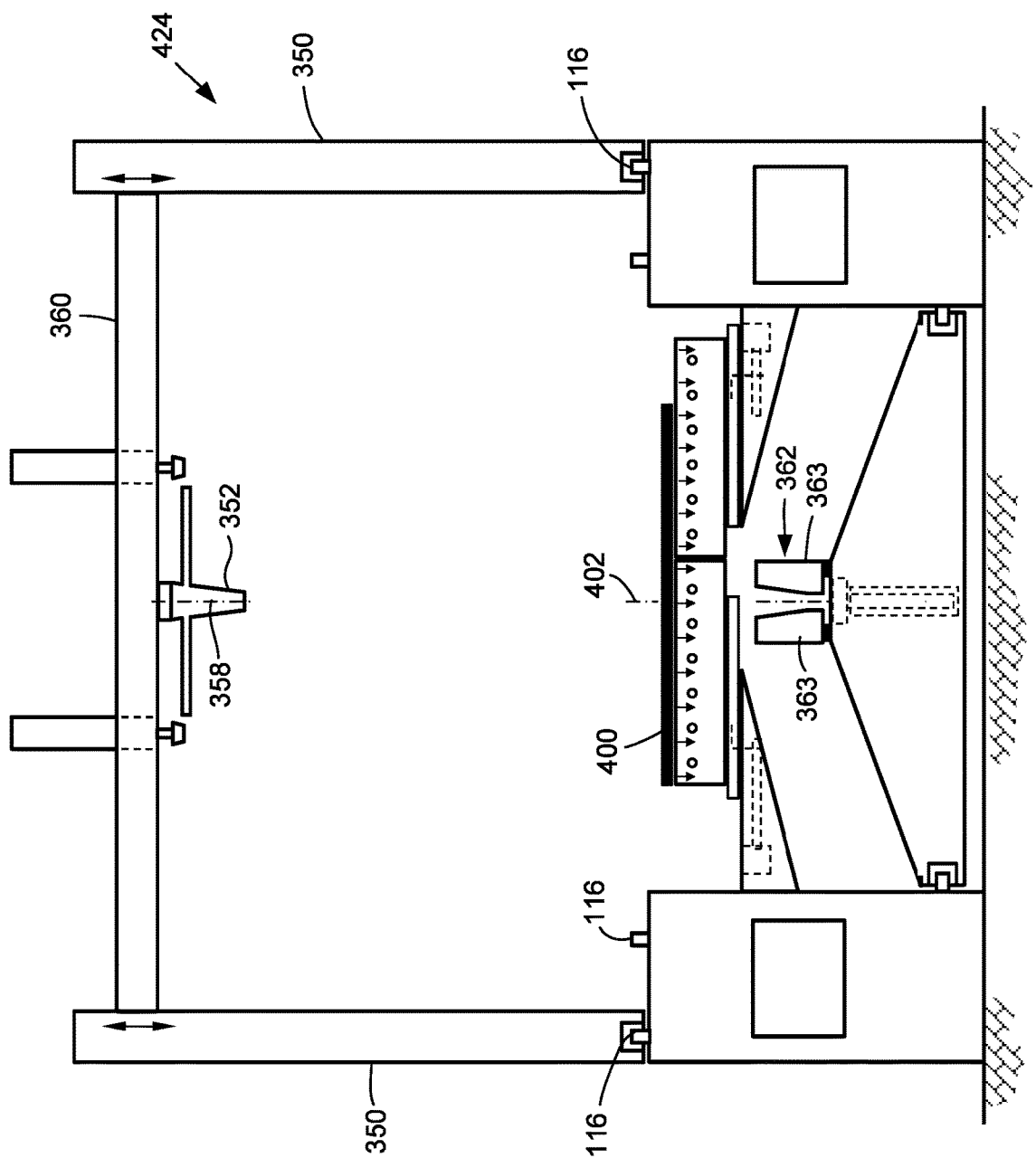
FIG. 42 is a sectional view of the layup station taken along line 42-42 of FIG. 41 and showing the initial position of the upper forming die and lower forming die prior to clamping onto the composite laminate.
Figure 43:
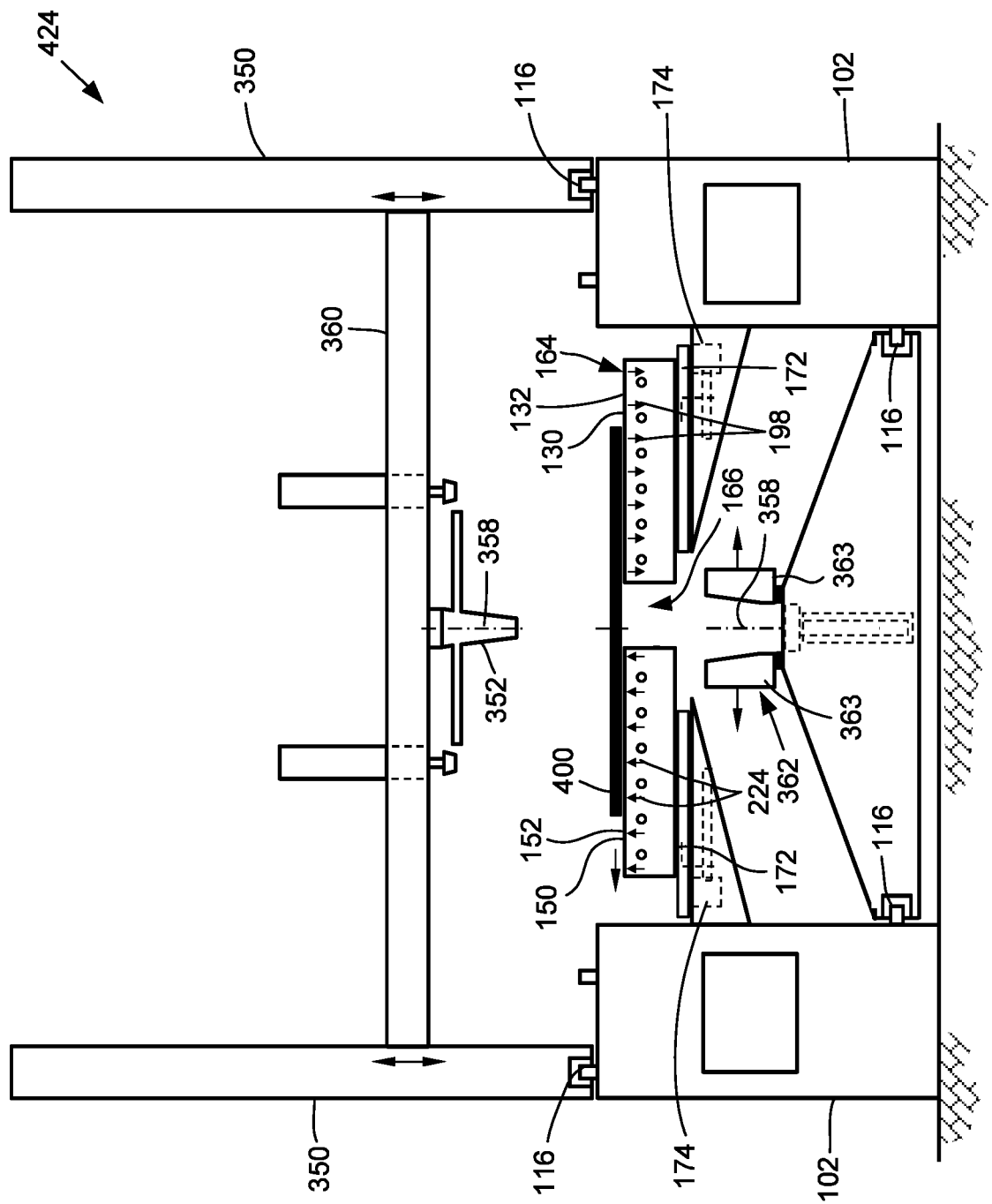
FIG. 43 is a sectional view of the layup station showing the upper forming die lowering toward the composite laminate, and further showing the second mandrel translated away from the first mandrel into the mandrel open position defining a gap, and also showing the pair of lower die web portions moving away from each other.

FIG. 42 is a sectional view of the layup station 424 showing the initial position of the upper forming die 352 and lower die web portions 363 of the lower forming die 362 prior to the upper forming die 352 and the lower die cap portion 365 (FIG. 44) engaging or clamping onto the composite laminate 400. The upper forming die 352 and the lower forming die 362 may be configured substantially similar to the arrangement shown in FIG. 5 with the exception that in FIG. 42, the posts 350 of the upper forming die 352 are supported on the gantry tracks 116. As mentioned above, the gantry tracks 116 for the upper forming die 352, the lower forming die 362, and the gantries 104 may be continuous from the layup station 424 to the forming station 428.

FIG. 43 shows the upper forming die 352 and the lower forming die 362 at the layup station 424. The upper forming die 352 is shown being lowered by the gantry crossbeam 106 toward the composite laminate 400. The pair of lower die web portions 363 are shown translating away from each other. Also shown is the second mandrel 150 being translated away from the first mandrel 130 into the open position 164 to define the gap 166. In the layup station 424, the trimming station 426 (FIGS. 37-38), and in the forming station 428 (FIGS. 37-38), the first mandrel 130 and the second mandrel 150 may be configured substantially similar to the above-described arrangement shown in FIGS. 1-3. For example, at each station, the first mandrel 130 and the second mandrel 150 may each be laterally translated along lateral rails 172 (FIG. 43) coupling the first mandrel 130 and second mandrel 150 respectively to the base members 102. Translation of the first mandrel 130 and second mandrel 150 may be facilitated by one or more mandrel actuators 174 located at spaced intervals along the lengthwise direction of each mandrel.

To facilitate lateral translation of the second mandrel 150 away from the first mandrel 130, positive air pressure 224 may be discharged from the apertures 192 in the second mandrel surface 152 to urge the composite laminate 400 away from the second mandrel surface 152 in the same manner described above with regard to FIG. 16. Vacuum pressure 198 may be drawn on the first mandrel surface 132 to fixedly secure the position of the composite laminate 400 on the first mandrel 130. In this regard, during the clamping and release of the composite laminate 400 at any one of the stations, the application of vacuum pressure 198 between the composite laminate 400 and the first mandrel 130 and/or second mandrel 150 may maintain the laminate centerline 402 in lateral alignment with the die centerline 358 of the upper forming die 352 and the die centerline 358 of the lower forming die 362 which may improve the accuracy with which the composite laminate 400 is trimmed and/or formed.

FIG. 44 shows the upper forming die 352 in contact with a top side of the cap portion 408 of the composite laminate 400. As described above with regard to FIG. 16, the upper forming die 352 may be configured as a unitary structure such as a bar member having a length at least as long as the composite laminate 400. Alternatively, the upper forming die 352 may be provided as a series of end-to-end bar segments. The lower die cap portion 365 of the lower forming die 362 is shown extended vertically upwardly through the gap 166 and into contact with a bottom side of the cap portion 408 of the composite laminate 400. The lower die cap portion 365 may be configured as a unitary bar member or as a series of end-to-end bar segments having a total length that is at least as long as the composite laminate 400. The upper forming die 352 and lower die cap portion 365 (of the lower forming die 362) may apply light clamping pressure on the composite laminate 400 to allow transferring of the composite laminate 400 without locally indenting the composite laminate 400. Alternatively or additionally, vacuum pressure 198 may be applied to apertures 192 (not shown) formed in the upper forming die 352 and/or in the lower die cap portion 365 to fixedly secure the composite laminate 400 to the upper forming die 352 and/or lower die cap portion 365 during transferring of the composite laminate 400 between stations. In a still further example, vacuum pressure 198 may be applied to apertures 192 and the lower die cap portion 365 to secure (without the upper forming die 352) the composite laminate 400 to the lower die cap portion 365 for transferring the composite laminate 400 between stations. Vacuum pressure 198 (FIG. 42) on the first mandrel 130 or second mandrel 150 may be deactivated prior to initiating the transfer of the composite laminate 400 from the layup station 424.

FIG. 45 is a side view of the manufacturing system 100 showing the upper forming die 352 and the lower forming die 362 moving the composite laminate 400 from the layup station 424 toward the trimming station 426. As mentioned above, the posts 350 (FIG. 43) of the upper forming die 352 and the lower die crossbeam 368 (FIG. 43) each move along the gantry tracks 116 (FIG. 43) which may extend continuously from the layup station 424 to forming station 428. During the transferring of the composite laminate 400 between stations, positive air pressure 224 (e.g., 43) may be discharged from the apertures 192 in the first mandrel 130 and second mandrel 150 at each station to allow the composite laminate 400 to float on a thin cushion of air over the first mandrel 130 and second mandrel at each station. FIG. 46 shows the upper forming die 352 and the lower forming die 362 at the trimming station 426. The gantry 104 for the lamination head 300 is shown moved from the forming station 428 back to the layup station 424. The gantry 104 for the trimming device 330 is shown temporarily positioned in the forming station 428.

FIG. 47 is a sectional view of the trimming station 426 showing the upper forming die 352 and the lower forming die 362 retracted away from the composite laminate 400 and showing the trimming device 330 moved back into the trimming station 426 for trimming the composite laminate 400 on the continuous mandrel surface 162 defined by the first mandrel 130 and second mandrel 150. As mentioned above with regard to FIG. 12, vacuum pressure 198 may be applied to the first mandrel 130 and/or the second mandrel 150 as shown in FIG. 47 to fixedly secure the composite laminate 400 in position on the continuous mandrel surface 162 during trimming operations. During trimming of the composite laminate 400 at the trimming station 426, another composite laminate (not shown) may be laid up at the layup station 424 and/or another composite laminate (not shown) may be formed at the forming station 428. At the completion of trimming of the composite laminate 400 at the trimming station 426, the trimming device 330 may be moved to the layup station 424, and the upper forming die 352 and lower die cap portion 365 may be moved into contact with the composite laminate 400 in the same manner as described above with regard to FIGS. 42-44.

FIG. 48 is a side view of the manufacturing system 100 showing the gantry 104 for the trimming device 330 temporarily positioned in the layup station 424. Also shown is the upper forming die 352 and lower forming die 362 transferring the composite laminate 400 from the trimming station 426 toward the forming station 428. FIG. 49 shows the upper forming die 352 and lower forming die 362 at the forming station 428 in preparation for forming the composite laminate 400. During forming of the composite laminate 400 at the forming station 428, another composite laminate (not shown) may be laid up at the layup station 424 and/or another composite laminate (not shown) may be trimmed at the trimming station 426.

FIG. 50 is a sectional view of the forming station 428 showing the upper forming die 352 and the lower die cap portion 365 retracted away from the composite laminate 400. Vacuum pressure 198 may be applied to the first mandrel surface 132 for securing the composite laminate 400 in position on the first mandrel 130 prior to retracting the upper forming die 352 and lower die cap portion 365 away from the composite laminate 400. To further secure the composite laminate 400 in position on the first mandrel 130, the first clamping bar 201 may clamp the composite laminate 400 to the first mandrel surface 132 while the second mandrel 150 translates laterally away from the first mandrel 130. Positive air pressure 224 may be discharged from the apertures 192 in the second mandrel surface 152 to urge the composite laminate 400 away from the second mandrel surface 152 to facilitate lateral translation of the second mandrel 150 away from the first mandrel 130 toward the open position 164 (FIG. 51).

Figure 51:
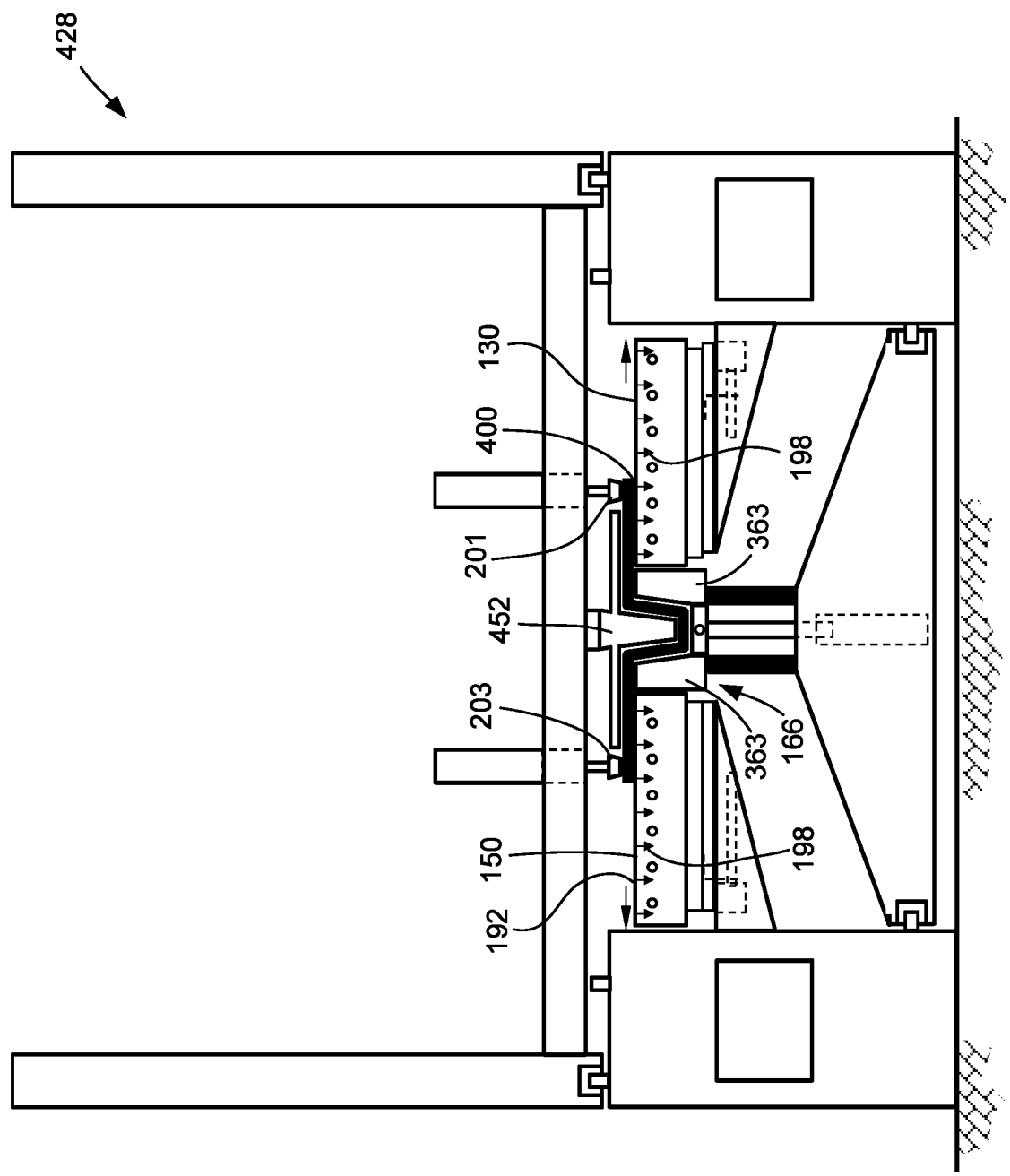
FIG. 51 is a sectional of the forming station view showing the lower die cap portion moved upwardly between the lower die web portions and further showing the upper forming die forming the composite laminate against the lower die web portions and the lower die cap portion.

FIG. 51 is a sectional view of the forming station 428 showing the upper forming die 352 after forming the composite laminate 400 against the lower die web portions 363 and the lower die cap portion 365 positioned within the gap 166 between the first mandrel 130 and the second mandrel 150 during a forming process similar to the process described above and shown in FIGS. 17-26. The first clamping bar 201 and the second clamping bar 203 may respectively clamp the opposing flange portions 404 of the composite laminate 400 respectively to the first mandrel 130 and the second mandrel 150 to generate lateral tension 416 (FIGS. 20 and 22) in the composite laminate 400 as the upper forming die 352 urges the composite laminate 400 against the lower forming die 352 during the forming process. In FIG. 51, at the completion of the forming process, vacuum pressure 198 may be applied to the apertures 192 in the first mandrel 130 and second mandrel 150 to prevent the composite laminate 400 from lifting off of the first mandrel 130 and second mandrel 150 as the upper forming die 352 is vertically retracted. The composite laminate 400 may be formed as shown in FIG. 27 or in any one a variety of alternative cross-sectional shapes dictated by the shape and configuration of the upper forming die 352 and the lower forming die 362. Although not shown, after completion of the forming of the composite laminate 400, the upper forming die 352 and/or the lower forming die 362 may be configured to transfer the composite laminate 400 from the forming station 428 to a holding station (not shown) or to any one of a variety of subsequent manufacturing stations (not shown) such as for consolidating and/or curing the composite laminate 400.

In an example of the above-described method 500 (FIG. 36) of manufacturing the composite laminate 400 using the manufacturing system 100 shown in FIGS. 37-51, the method may include transferring the composite laminate 400 between stations such as between the layup station 424, the trimming station 426, and the forming station 428 shown in FIGS. 37-38. As described above, transferring the composite laminate 400 between stations may include engaging, using the upper clamping mechanism 450 and/or the lower clamping mechanism 480, a portion of the composite laminate 400 spanning the gap 166 between the first mandrel 130 and the second mandrel 150 in the open position 164. The upper clamping mechanism 450 may be the upper forming die 352, and the lower clamping mechanism 480 may be the lower die cap portion 365 of the lower forming die 362 as described above. The upper clamping mechanism (upper forming die 352) and the lower clamping mechanism 480 (lower die cap portion 365) may clamp onto the composite laminate 400 prior to transferring between stations. As an alternative to clamping the composite laminate 400 between the upper clamping mechanism 450 and lower clamping mechanism 480, the method may include applying or drawing vacuum pressure 198 on apertures 192 in the lower die cap portion 365 for securing (e.g., without the use of the upper clamping mechanism 450) the composite laminate 400 to the lower clamping mechanism 480 for transferring the composite laminate 400 between stations. The method may include forcing air through the apertures 192 in the first mandrel surface 132 and second mandrel surface 152 at each station for floating the composite laminate 400 over the first mandrel 130 and second mandrel 150 at each station during the transferring of the composite laminate 400.

The method may include maintaining the composite laminate 400 in alignment with the stations during the transfer while the first mandrel 130 and the second mandrel 150 at each station are stationary. As mentioned above, the alignment of the composite laminate 400 may be maintained by the use of vacuum pressure 198 on the first mandrel 130, second mandrel 150, upper forming die 352, and/or lower die cap portion 365 during the release and clamping of the composite laminate 400 at one or more of the stations. After forming of the composite laminate 400 is complete (e.g., FIG. 51), the method 500 may optionally include using the upper forming die 352 and lower die cap portion 365 of the lower forming die 362 to transfer the composite laminate 400 from the forming station 428 to a dismount station (not shown) or a holding station (not shown) or to a subsequent manufacturing station (not shown) as mentioned above. The upper forming die 352 and lower die cap portion 365 may clamp onto the cap portion 408 of the composite laminate 400 in a manner similar to the clamping process shown in FIG. 44. Prior to moving the composite laminate 400 to a holding station (not shown) or subsequent manufacturing station (not shown), the first and second clamping bar 201, 203 (FIG. 51) may be upwardly retracted away from the composite laminate 400, and the lower die web portions 363 (FIG. 51) may be downwardly retracted away from the composite laminate 400.

Referring to FIGS. 52-69, shown in FIGS. 52 and 53 is a top view and a side view respectively of a further example of a manufacturing system 100 in which the layup, trimming, and forming of the composite laminate 400 (FIG. 54) are respectively and sequentially performed in a layup station 424, a trimming station, and a forming station 428. The layup station 424 has a layup mandrel set 425 including a first mandrel 130 and a second mandrel 150 configured for supporting the composite laminate 400 during the laying up of the composite laminate 400. The trimming station 426 includes a trimming mandrel set 427 having a first mandrel 130 and a second mandrel 150 configured to receive the composite laminate 400 from the layup station 424, and supporting the composite laminate 400 during trimming. The forming station 428 has a forming mandrel set 429 including a first mandrel 130 and a second mandrel 150 configured to receive the composite laminate 400 from the trimming station 426. The forming station 428 is configured to laterally translate the first mandrel 130 and second mandrel 150 into a forming stand 490 having a plurality of forming heads 492 for forming the composite laminate 400.

The manufacturing system 100 of FIGS. 52-69 includes a dedicated upper clamping mechanism 450 and a dedicated lower clamping mechanism 480, as distinguished from the manufacturing system 100 shown in FIG. 37-51 in which the upper forming die 352 and the lower die cap portion 365 of the lower forming die 362 are respectively used as the upper clamping mechanism 450 and lower clamping mechanism 480 for transferring the composite laminate 400 between stations. As described below, in FIGS. 52-69, the upper clamping mechanism 450 is configured as a plurality of upper clamp modules 452. The lower clamping mechanism 480 is configured as a lower clamp member 484 supported on one or more lower crossmembers 482. The upper clamping mechanism 450 and/or the lower clamping mechanism 480 are configured to engage the composite laminate 400, and transfer the composite laminate 400 from the layup station 424 to the trimming station 426 and from the trimming station 426 to the forming station 428. The manufacturing system 100 may include a pair of base members 102 extending along and between the layup station 424, the trimming station 426, and the forming station 428.

In FIGS. 52-53, the layup station 424 may include at least one lamination head 300 for laying up the composite laminate 400 on the layup mandrel set 425. In the example shown, the lamination head 300 may be supported on a gantry 104 configured to move along the length of the layup station 424. As described below, the layup station 424 may include a staging area 380 for temporarily storing the lamination head 300 during the engagement of the upper clamping mechanism 450 and lower clamping mechanism 480 to the composite laminate 400 for transferring to the trimming station 426. The trimming station 426 may include a trimming device 330 provided in any one of the above-described configurations. The trimming device 330 may be supported on a gantry 104 configured to move along the length of the trimming station 426 similar to the movement of the gantry 1044 for moving the lamination head 300 along the layup station 424. The forming station 428 may include the above-mentioned forming stand 490 which may support a plurality of forming heads 492 located at spaced intervals along the length of the forming station 428. As described below, the forming heads 492 may be movable in unison for vertically actuating an upper forming die 352 for forming the composite laminate 400 against the lower forming die 362 which may also be supported in the forming stand 490.

Referring to FIG. 54, shown is a sectional view of the layup station 424 illustrating the first mandrel 130 and the second mandrel 150 in the closed position 160. Also shown is an example of a lamination head 300 laying up a composite laminate 400. Vacuum pressure 198 may be applied to the first mandrel surface 132 and second mandrel surface 152 for non-movably securing the composite laminate 400 to the first mandrel 130 and second mandrel 150 during layup by the lamination head 300. As indicated above, the lamination head 300 may be configured similar to the above-described arrangement of the lamination head 300 shown in FIGS. 4-5. In the example shown, the lamination head 300 may be supported on an upper beam 113 of a gantry 104. The upper beam 113 may be cantilevered outwardly from generally vertically oriented beam support 114 that may be movably mounted on one or more longitudinal tracks 464 extending along a lengthwise direction of the layup station 424. However, the lamination head 300 may be supported by any one a variety of different arrangements (e.g., a robotic arm, etc.), and is not limited to being supported by a gantry 104 as shown in FIG. 54.

Figure 57:
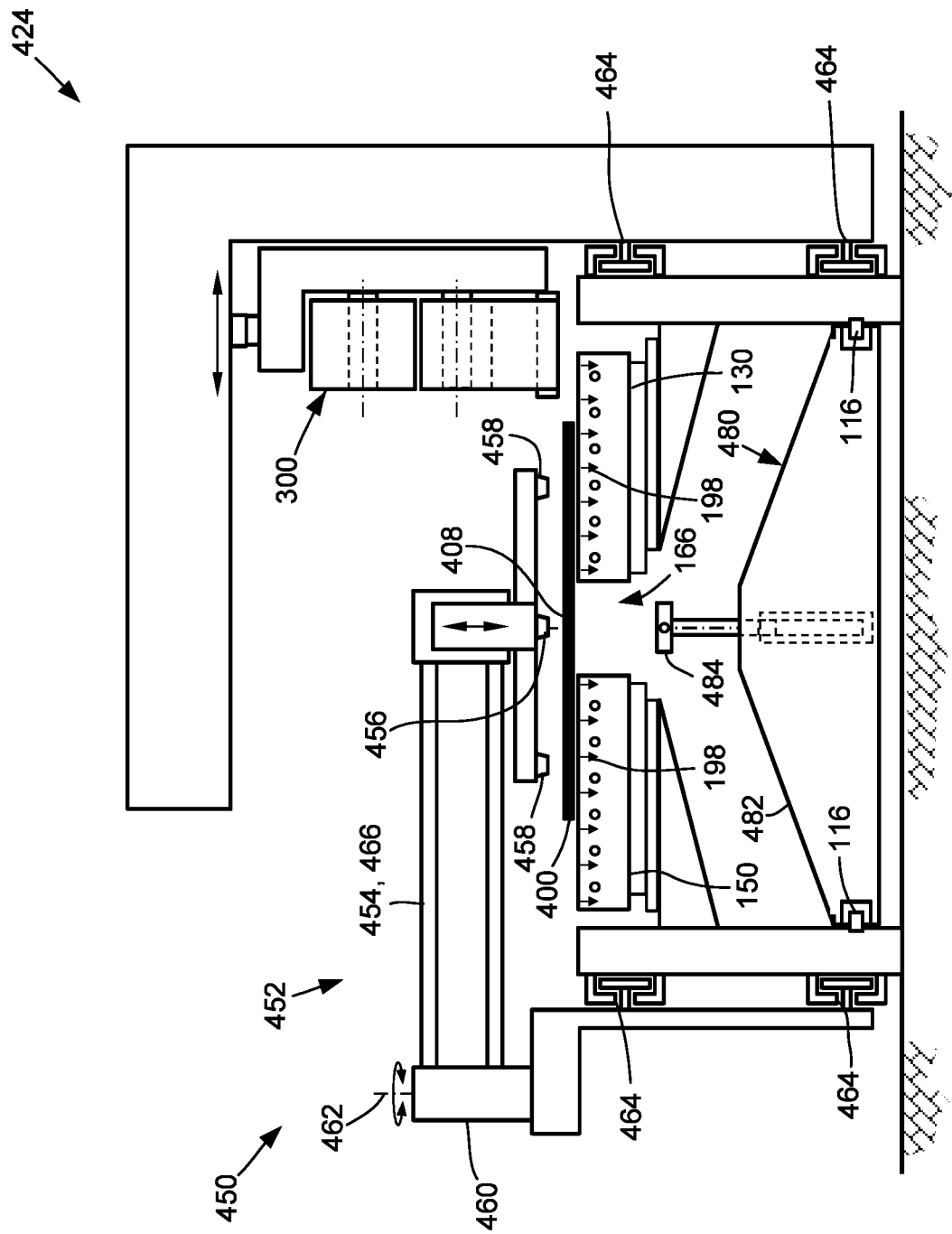
FIG. 57 is a sectional view of the layup station taken along line 57-57 of FIG. 56 and showing a clamping arm having a cap portion clamp and a pair of flange portion clamps, and further showing the lower clamping mechanism having a lower clamp member configured to extend upwardly into the gap between the first mandrel and the second mandrel of the layup mandrel set.

Referring to FIGS. 54-57, shown is an example of the upper clamping mechanism 450. FIG. 55 is a top view of the layup station 424. FIG. 56 is a side view of the layup station 424. FIG. 57 is a sectional view of the layup station 424 showing an example of an upper clamp module 452. As mentioned above, the upper clamping mechanism 450 may include a plurality of the upper clamp modules 452, each of which may be mounted to a side of the layup station 424. As shown in FIGS. 55-56, the upper clamp modules 452 may be located at spaced intervals along the length of the layup station 424. As shown in FIG. 57, each upper clamp module 452 may include a clamping arm 454 pivotably coupled to a generally vertically-oriented arm support 460. Each one of the arm supports 460 may be movably coupled to one or more longitudinal tracks 464 located on a side of the manufacturing system 100. The longitudinal tracks 464 may extend continuously along the lengthwise direction of the manufacturing system 100 from the layup station 424 to the forming station 428.

As shown in FIGS. 54, 55, and 57, each clamping arm 454 may be pivotable (e.g., approximately 90 degrees) between a clamping position 466 (e.g., FIG. 55—shown in solid lines) and a retracted position 468 (e.g., FIG. 55—shown in phantom lines). The clamping arm 454 may be pivoted about a vertical axis 462 (FIG. 54) by a rotary actuation mechanism (not shown) driven by electromechanical, pneumatic, and/or hydraulic means. In the clamping position 466 (FIG. 57), each clamping arm 454 may extend laterally over the top of the composite laminate 400. In the retracted position 468 (FIG. 54), each clamping arm 454 may be oriented parallel to a side of the layup station 424 or may be otherwise oriented in a manner to prevent interfering with the movement of the lamination head 300 during the laying up of the composite laminate 400.

FIG. 57 shows a clamping arm 454 oriented in the clamping position 466. The terminal end of the clamping arm 454 may include a vertically-actuatable cap portion clamp 456 located between a pair of vertically-actuatable flange portion clamps 458. The flange portion clamps 458 may optionally be included with each clamping arm 454. The cap portion clamp 456 may be actuatable independent of the actuation of the flange portion clamps 458. The pair of flange portion clamps 458 may be actuatable independent of each other. The cap portion clamp 456 and the flange portion clamps 458 may be actuatable by one or more linear actuation mechanisms (not shown) driven by electromechanical, pneumatic, and/or hydraulic means. The terminal end (e.g., bottom) of the cap portion clamp 456 and the flange portion clamps 458 may each include an elastomeric (e.g., rubber, foam) pad to prevent damage to the composite laminate 400.

Referring still to FIG. 57, the lower clamping mechanism 480 may be located below the first mandrel 130 and second mandrel 150. The lower clamping mechanism 480 may include at least one lower clamp member 484 and at least one lower crossmember 482. For example, the lower clamping mechanism 480 may include a plurality of lower crossmembers 482 located at spaced intervals along the length of the lower clamp member 484. The lower clamp member 484 may be configured as a single elongate bar or the lower clamp member 484 may be configured as a series of end-to-end bar segments. Regardless of configuration, the lower clamp member 484 may have a total length that is at least as long as the composite laminate 400. The lower crossmember 482 may have ends coupled respectively to a pair of gantry tracks 116 extending continuously along a lengthwise direction of the manufacturing system 100 from the layup station 424 to the forming station 428. Each one of the lower crossmembers 482 may include an actuator (not shown) for vertically actuating the lower clamp member 484.

Figure 58:
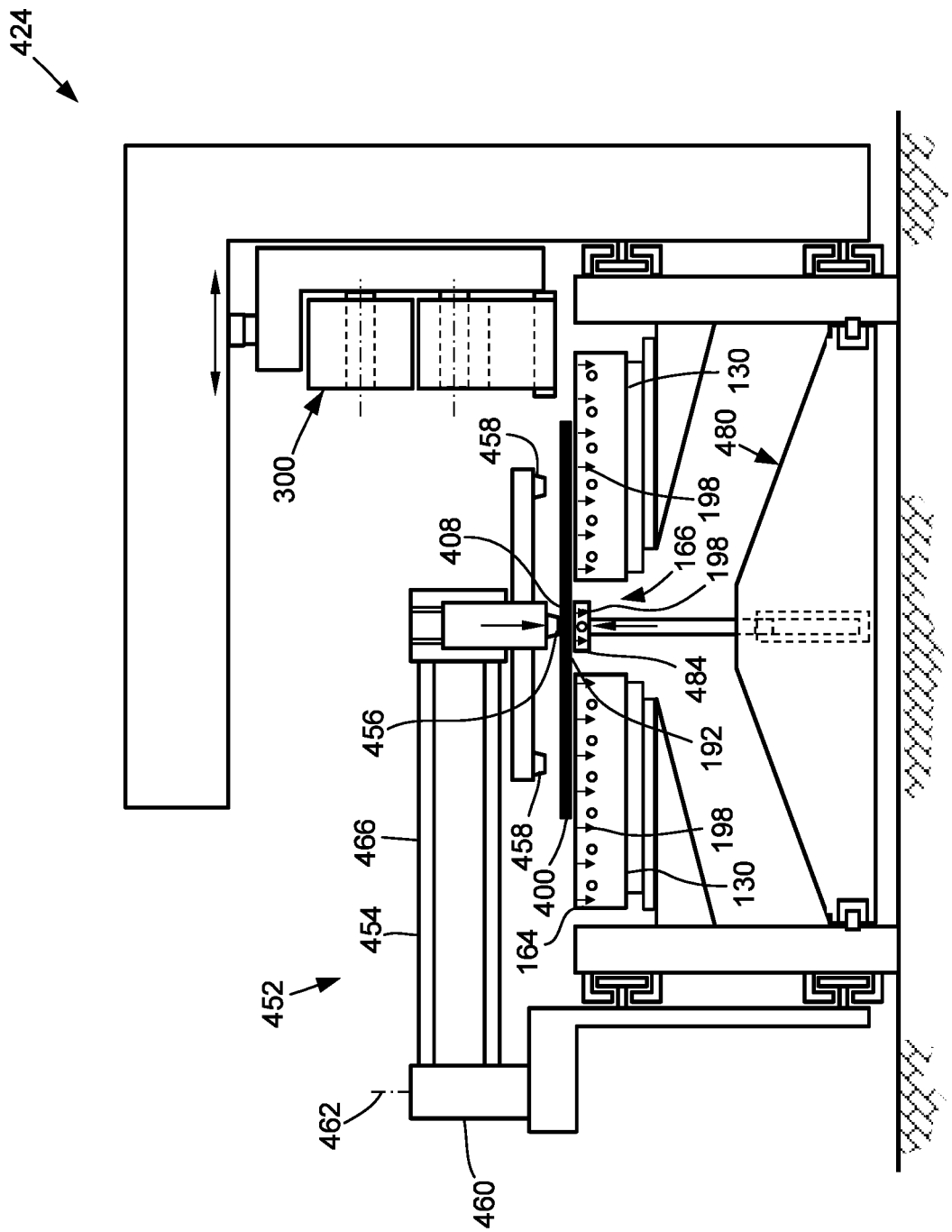
FIG. 58 is a sectional view of the layup station showing the composite laminate clamped between the cap portion clamp and the lower clamp member.

Referring to FIG. 58, shown is the second mandrel 150 laterally translated to the open position 164 to form the gap 166 between the first mandrel 130 and second mandrel 150. The upper clamp modules 452 and/or the lower clamp member 484 are configured to engage with the composite laminate 400 for transferring the composite laminate 400 between stations. In one example, the upper clamp modules 452 and the lower clamp member 484 may be configured to clamp onto the cap portion 408 of the composite laminate 400 spanning the gap 166. The lower clamp member 484 is shown upwardly actuated through the gap 166 and into contact with the bottom side of the composite laminate 400. The cap portion clamp 456 of the upper clamp module 452 is shown downwardly actuated into contact with the top side of the composite laminate 400. Vacuum pressure 198 may optionally be drawn on apertures 192 formed in the lower clamp member 484 and/or the cap portion clamp 456 for securing the composite laminate 400 to the upper clamping mechanism 450 and lower clamping mechanism 480 during the transfer process. In a further example of the manufacturing system 100 in which the upper clamping mechanism 450 may be omitted, vacuum pressure 198 may be drawn on apertures 192 in the lower clamp member 484 for securing the composite laminate to the lower clamp member 484 prior to transferring, using the lower clamp member 484, the composite laminate 400 between stations. The vacuum pressure 198 on the first mandrel 130 and second mandrel 150 may be deactivated prior to initiating the transfer of the composite laminate 400 from the layup station 424 to the trimming station 426. Positive air pressure 224 may be discharged through the apertures 192 in the first mandrel surface 132 and second mandrel surface 152 at each station for floating the composite laminate 400 over the first mandrel 130 and second mandrel 150 at each station as the composite laminate 400 is transferred between stations.

FIG. 59 is a top view of the manufacturing system 100 showing the upper clamping mechanism 450 and the lower clamping mechanism 480 (FIG. 58) transferring the composite laminate 400 from the layup station 424 to the trimming station 426. FIG. 60 is a side view of the manufacturing system 100. As mentioned above, the plurality of upper clamp modules 452 may move along the longitudinal tracks 464 extending along the length of the manufacturing system 100. The lower crossmembers 482 (FIG. 58) may move along the gantry tracks 116 also extending along the length of the manufacturing system 100.

Figure 61:
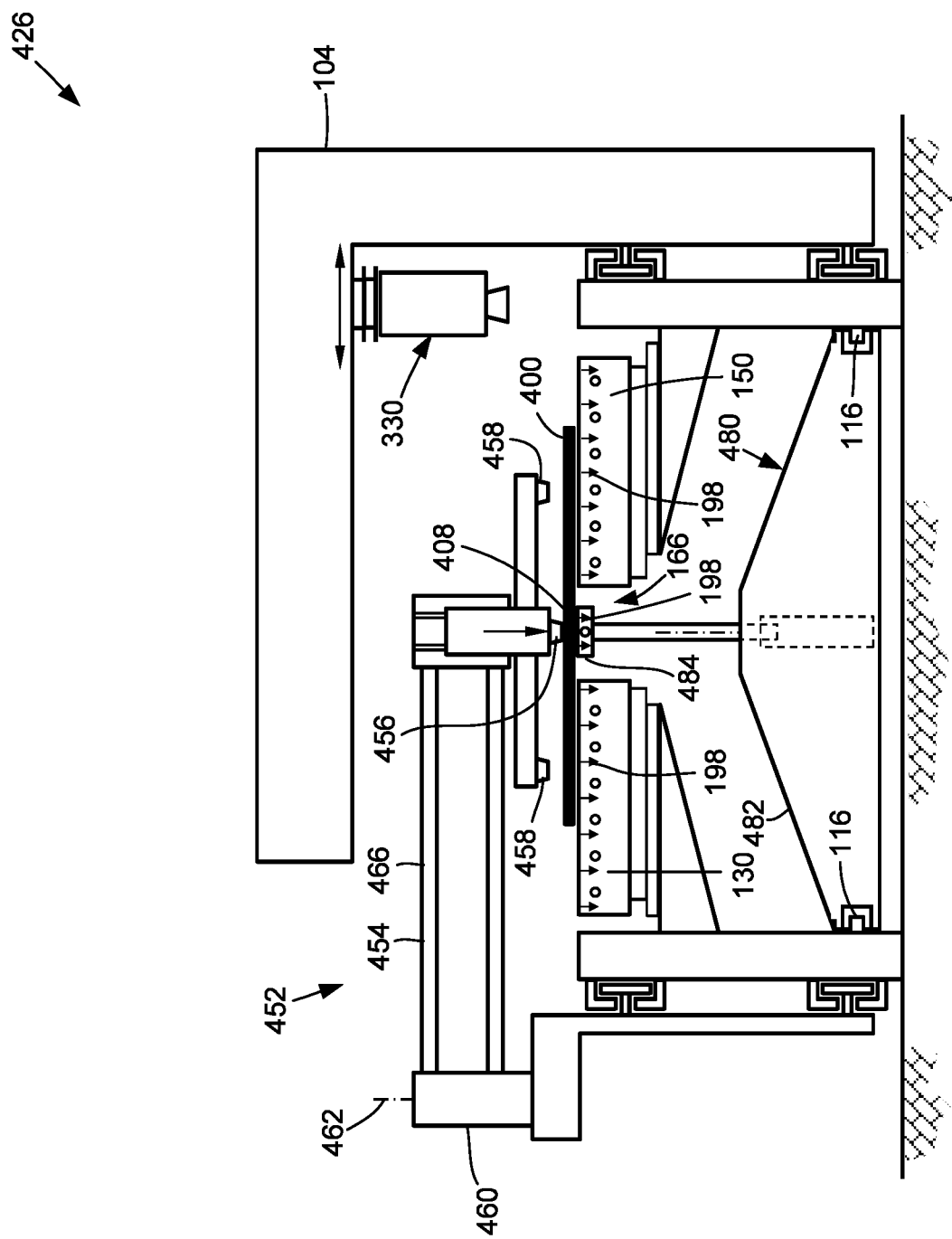
FIG. 61 is a sectional view of the trimming station taken along line 61-61 of FIG. 60 and showing the composite laminate supported on the first mandrel and second mandrel of the trimming mandrel set while clamped between the cap portion clamp and the lower clamp member.

Referring to FIG. 61, shown is a sectional view of the trimming station 426 illustrating the composite laminate 400 supported on the first mandrel 130 and second mandrel 150 of the trimming mandrel set 427 (FIG. 52) while clamped between the cap portion clamp 456 and the lower clamp member 484. The trimming device 330 is shown temporarily located to one side of the trimming mandrel set 427 to avoid interfering with the movement of the upper clamp module 452. Vacuum pressure 198 may optionally be drawn on the apertures 192 (FIG. 54) in the first mandrel 130 and second mandrel 150 of the trimming mandrel set 427 for securing the composite laminate 400 in position on the first mandrel 130 and second mandrel 150 prior to retraction of the cap portion clamp 456 and the lower clamp member 484 away from the composite laminate 400.

Figure 62:
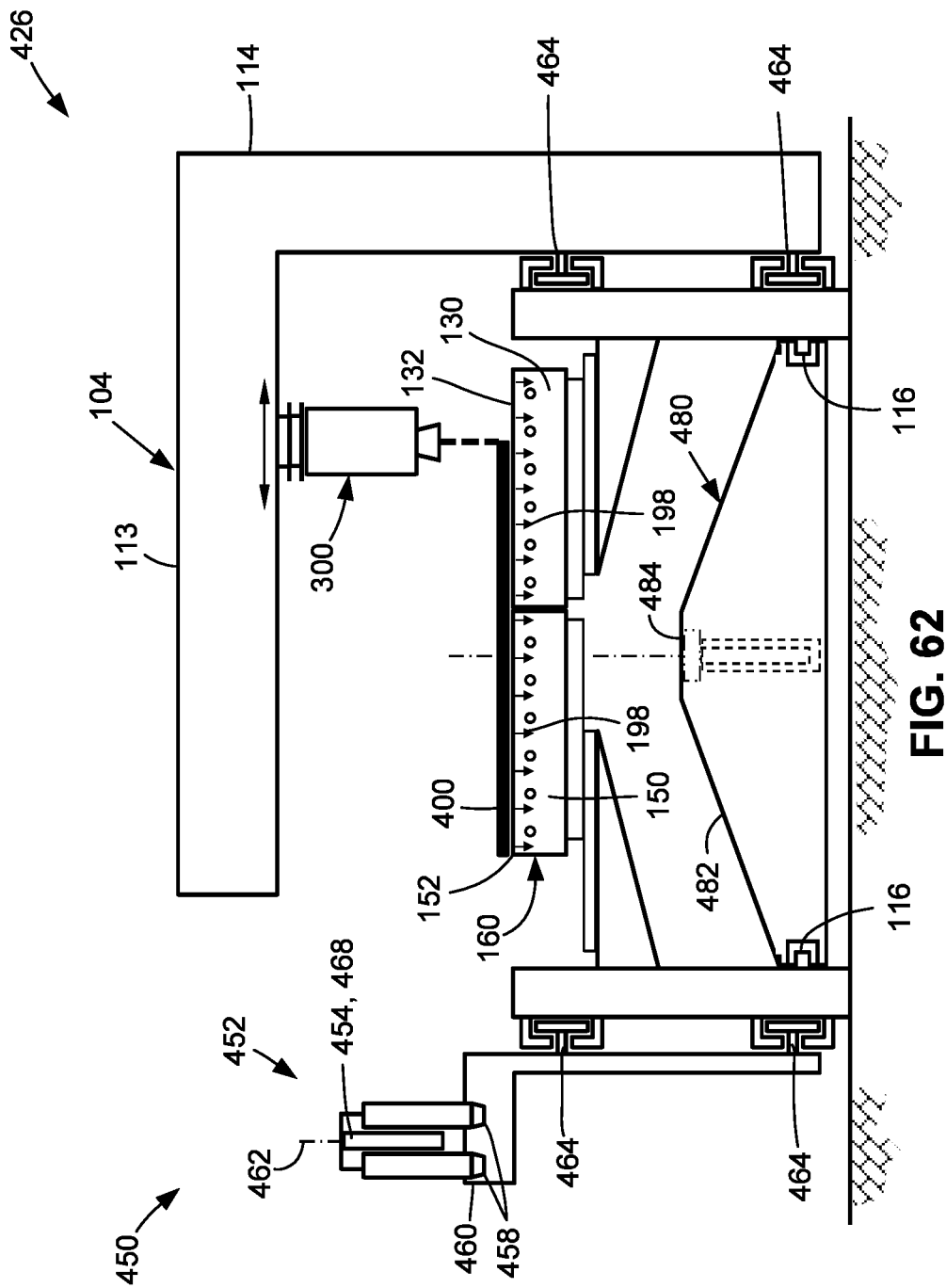
FIG. 62 is a sectional view of the trimming station showing the lower clamp member retracted away from the composite laminate and the clamping arms pivoted into the retracted position and further illustrating the second mandrel moved into the closed position against the first mandrel for supporting the composite laminate during trimming by the trimming device.

FIG. 62 is a sectional view of the trimming station 426 showing the lower clamp member 484 retracted away from the composite laminate 400. Also shown are the clamping arms 454 pivoted from the clamping position 466 (FIG. 61) to the retracted position 468 along a side of the first mandrel 130 to prevent interference with the movement of the trimming device 330. The second mandrel 150 is shown moved into the closed position 160 against the first mandrel 130 for supporting the composite laminate 400 during trimming by the trimming device 330. Although not shown, positive air pressure 224 (e.g., FIG. 16) may be discharged through the apertures 192 (FIG. 54) in the second mandrel 150 to urge the composite laminate 400 away from the second mandrel 150 to facilitate lateral translation of the second mandrel 150 into the closed position 160 adjacent the first mandrel 130. In the closed position 160, the first mandrel 130 and the second mandrel 150 provide a continuous mandrel surface 162 (FIG. 12) for supporting the composite laminate 400 during trimming by the trimming device 330. After completion of the trimming process, the second mandrel 150 may be translated back into the open position 164 (e.g., FIG. 57), and the lower clamp member 484 may be extended into the gap 166 (e.g., FIGS. 57-58) between the first mandrel 130 and the second mandrel 150. The clamping arms 454 may be pivoted back into the clamping position 466 (FIG. 57), and the cap portion clamp 456 may be downwardly actuated for clamping the cap portion 408 of the composite laminate 400 between the cap portion clamp 456 and the lower clamp member 484 similar to the above-described process shown in FIGS. 57-58.

FIG. 63 is a top view of the manufacturing system showing the upper clamping mechanism 450 (e.g., the upper clamp modules 452) and the lower clamping mechanism 480 (hidden) transferring the composite laminate 400 from the trimming station 426 to the forming station 428. FIG. 64 is a side view of the manufacturing system of FIG. 63. Similar to the above-described process shown in FIGS. 59-60, the upper clamp modules 452 may move along the longitudinal tracks 464 (FIG. 62), and the lower crossmembers 42 may move along the gantry tracks 116 (FIG. 62). However, in an alternative example mentioned above, the upper clamp modules 452 may be omitted, and the composite laminate 400 may be secured via vacuum pressure 198 to the lower clamping mechanism 480 (lower clamp member 484) for transferring the composite laminate 400 between stations.

Figure 65:
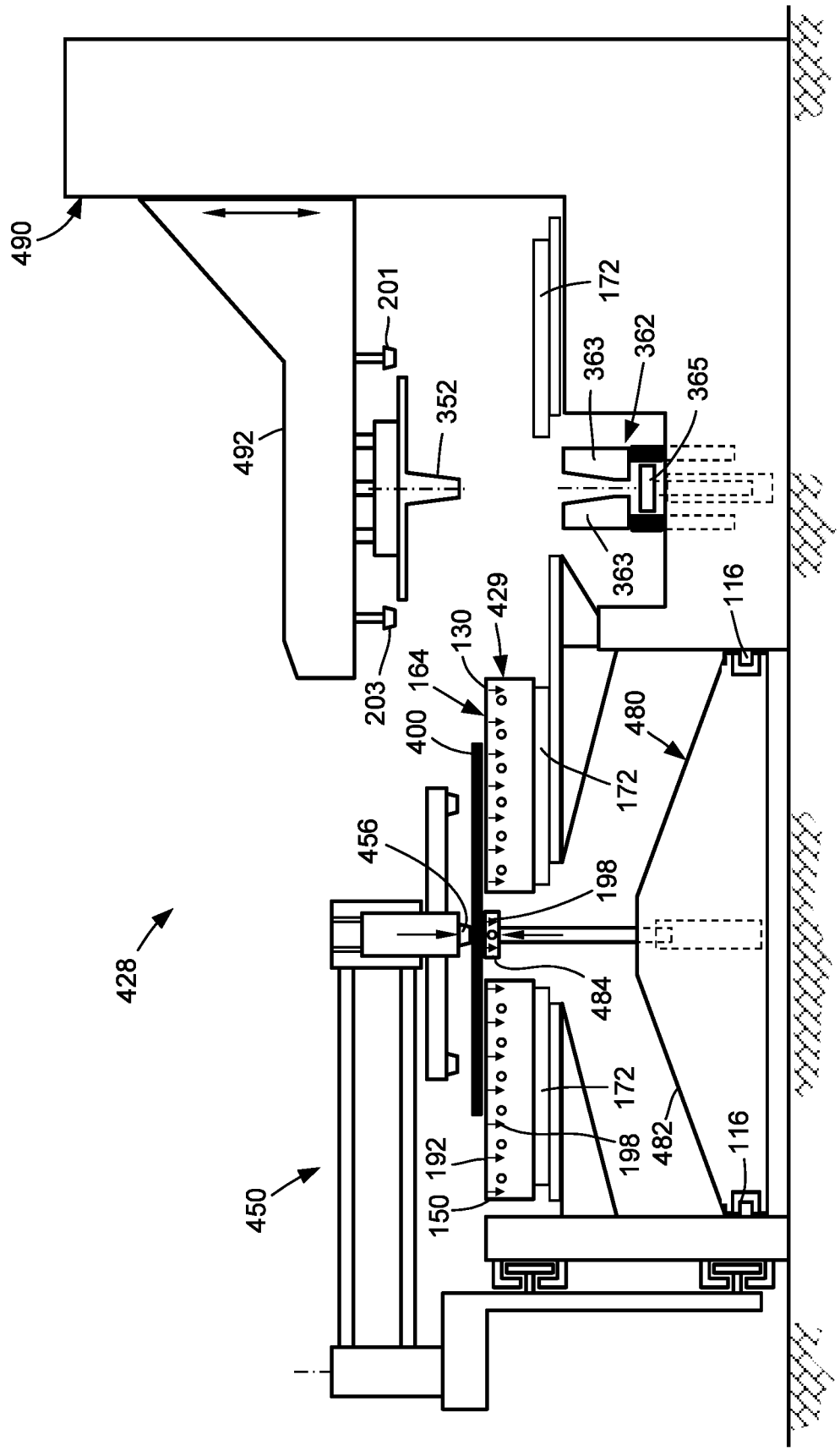
FIG. 65 is a sectional view of the forming station taken along line 65-65 of FIG. 64 and showing the composite laminate supported on the first mandrel and second mandrel of the forming mandrel set while clamped between the cap portion clamp and the lower clamp member.

FIG. 65 is a sectional view of the forming station 428 showing the composite laminate 400 supported on the first mandrel 130 and second mandrel 150 of the forming mandrel set 429. Also shown is the composite laminate 400 clamped between the cap portion clamp 456 of the upper clamping mechanism 450 and the lower clamp member 484 of the lower clamping mechanism 480. Vacuum pressure 198 may optionally be drawn on the apertures 192 in the first mandrel 130 and second mandrel 150 of the forming mandrel set 429 as a means to secure the composite laminate 400 in position prior to deactivation of the vacuum pressure 198 on the cap portion clamp 456 and lower clamp member 484 to secure the composite laminate 400 in position on the first mandrel 130 and second mandrel 150 prior to retraction of the cap portion clamp 456 and lower clamp member 484 away from the composite laminate 400. Also shown in FIG. 65 is the forming stand 490 which may include a plurality of forming heads 492 that may be vertically movable for moving the upper forming die 352. The forming stand 490 may also include a lower forming die 362 having a pair of lower die web portions 363 and a lower die cap portion 365.

Figure 66:
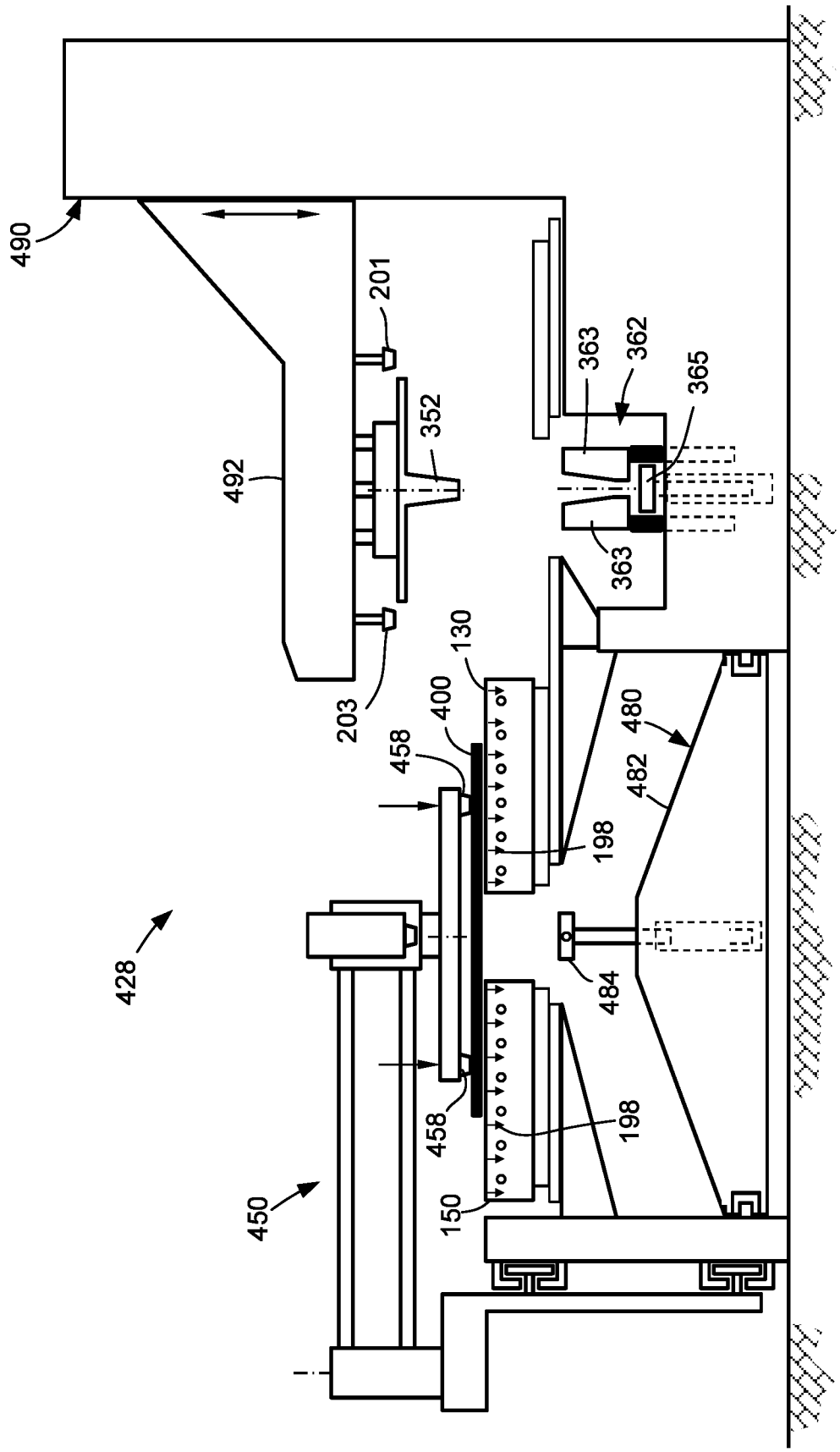
FIG. 66 is a sectional view of the forming station showing the lower clamp member and the cap portion clamp retracted away from the composite laminate and further showing the flange portion clamps clamping the composite laminate against the first mandrel and the second mandrel.

FIG. 66 shows the lower clamp member 484 retracted away from the bottom side of the composite laminate 400 and into the lower crossmember 482. The cap portion clamp 456 is shown retracted away from the top side of the composite laminate 400. Also shown is the pair of flange portion clamps 458 which may optionally clamp the composite laminate 400 against the first mandrel 130 and the second mandrel 150. For examples of the lower clamp member (not shown) that are translatable along a direction parallel to the surface of the composite laminate 400 (e.g., in an out of the plane of FIG. 66) and not vertically movable (FIG. 66) in the example shown, the flange portion clamps 458 may prevent movement of the composite laminate 400 during translating movement of such lower clamp member. As mentioned above, vacuum pressure 198 may be continuously drawn on the composite laminate 400 for preventing movement of the composite laminate 400 relative to the first mandrel 130 and second mandrel 150. The first mandrel 130 and the second mandrel 150 may be maintained in the open position 164 to define a gap 166 sized for receiving the lower forming die 352. In an optional example not shown, the first mandrel 130 and/or the second mandrel 150 may be laterally translated to the closed position 160 via one or more mandrel actuators 174 (e.g., FIG. 1) that may be included at the layup station 424, the trimming station 426, and the forming station 428.

Figure 67:
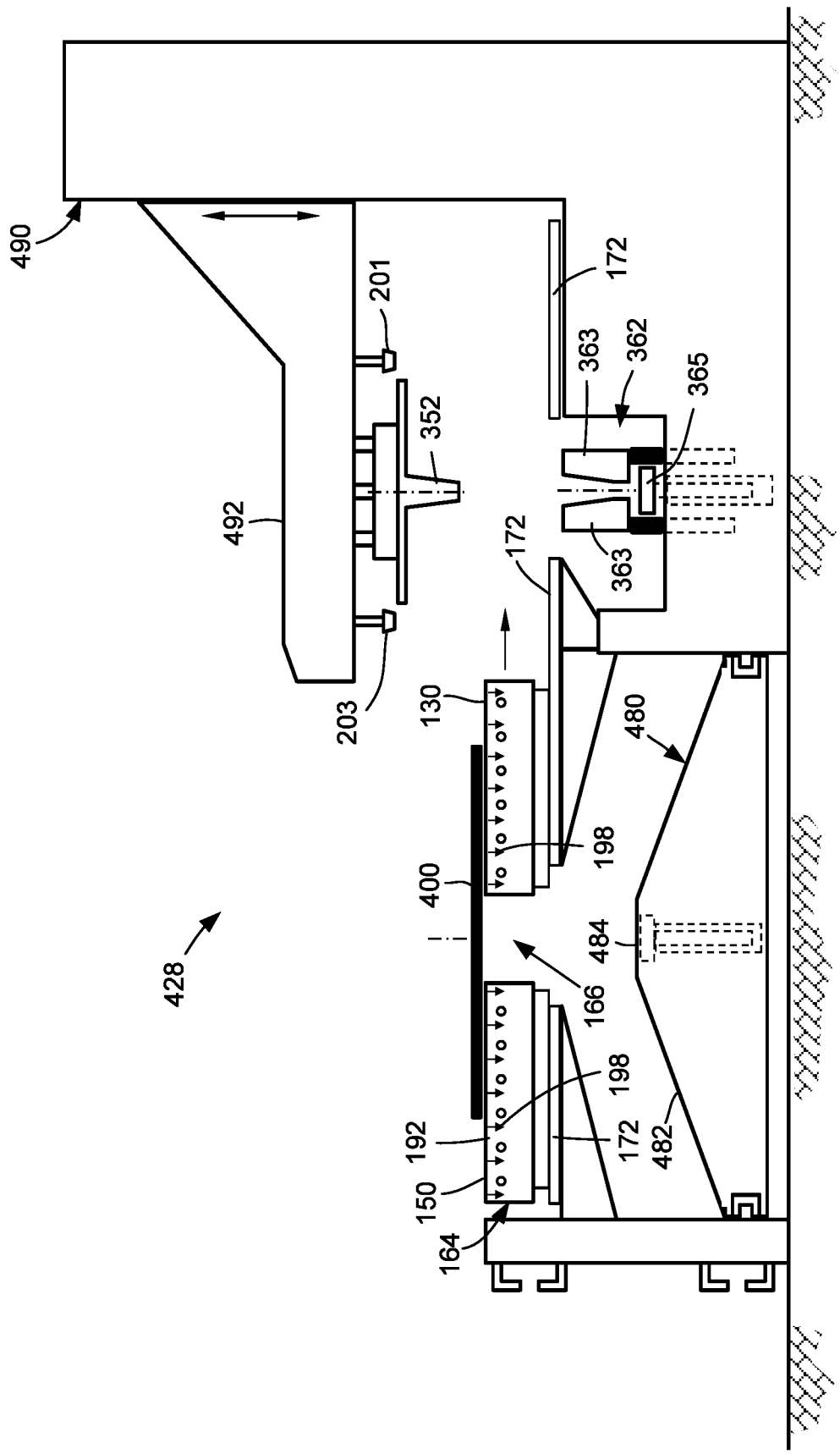
FIG. 67 is a sectional view of the forming station showing the first mandrel and second mandrel laterally translating the composite laminate into a forming stand at the forming station.

FIG. 67 shows the first mandrel 130 and second mandrel 150 in the open position 164 and laterally translating the composite laminate 400 into the forming stand 490. The first mandrel 130 and the second mandrel 150 may be laterally translatable along the lateral rails 172 of the forming station 428. As mentioned above, the forming stand 490 may be configured to support a plurality of forming heads 492 located at spaced intervals along the lengthwise direction of the forming station 428. In addition, the forming stand 490 may include the lower forming die 362 which may include a pair of lower die web portions 363 and a lower die cap portion 365.

Figure 68:
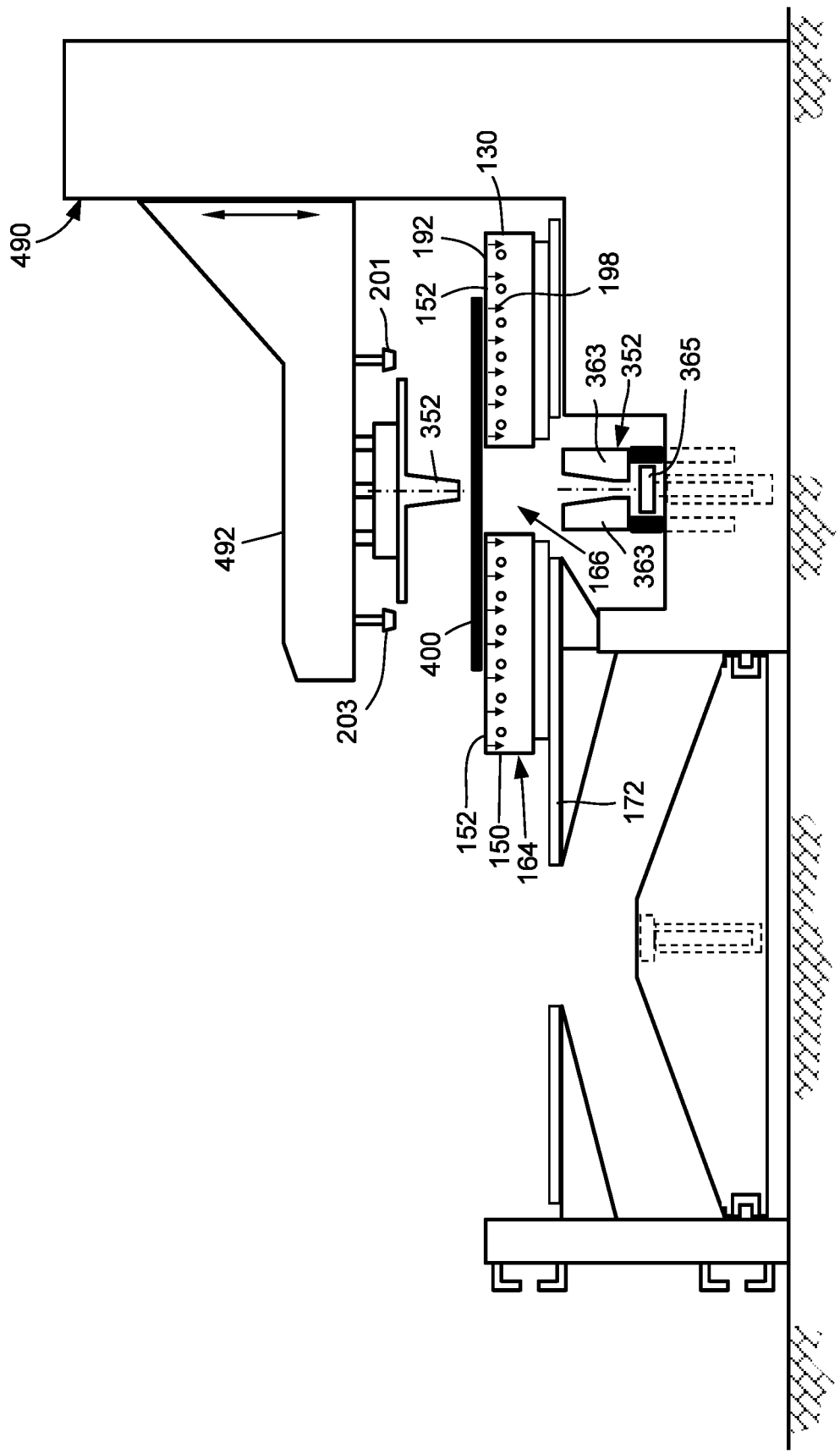
FIG. 68 is a sectional view of the forming station showing the first mandrel and second mandrel supporting the composite laminate prior to forming.

FIG. 68 shows the first mandrel 130 and the second mandrel 150 supporting the composite laminate 400 between the upper forming die 352 and the lower forming die 362 in the forming stand 490. The upper forming die 352 and the lower forming die 362 may be configured and operated in a manner similar to the above-described arrangement shown in FIGS. 16-26. For example, vacuum pressure 198 may optionally be applied to the apertures 192 of the first mandrel surface 132 and second mandrel surface 152 to secure the composite laminate 400 to the first mandrel 130 and second mandrel 150. As described above and shown in FIGS. 16-26, the lower die web portions 363 may be vertically translated into the gap 166 between the first mandrel 130 and the second mandrel 150. The upper forming die 352 may progressively urge the composite laminate 400 into the gap 166 (e.g., FIGS. 20-24) for forming the composite laminate 400 against the pair of lower die web portions 363. Prior to the upper forming die 352 urging the composite laminate 400 into the gap 166, the first clamping bar 201 and second clamping bar 203 may apply clamping pressure onto the flange portions 404 of the composite laminate 400 for generating lateral tension 416 (e.g., FIG. 22) in the composite laminate 400 as the upper forming die 352 urges the composite laminate 400 against the pair of lower die web portions 363. The lower die cap portion 365 may be vertically translated between the lower die web portions 363 when the die flanges 356 of the upper forming die 352 approach the composite laminate 400 (FIG. 25).

Figure 69:
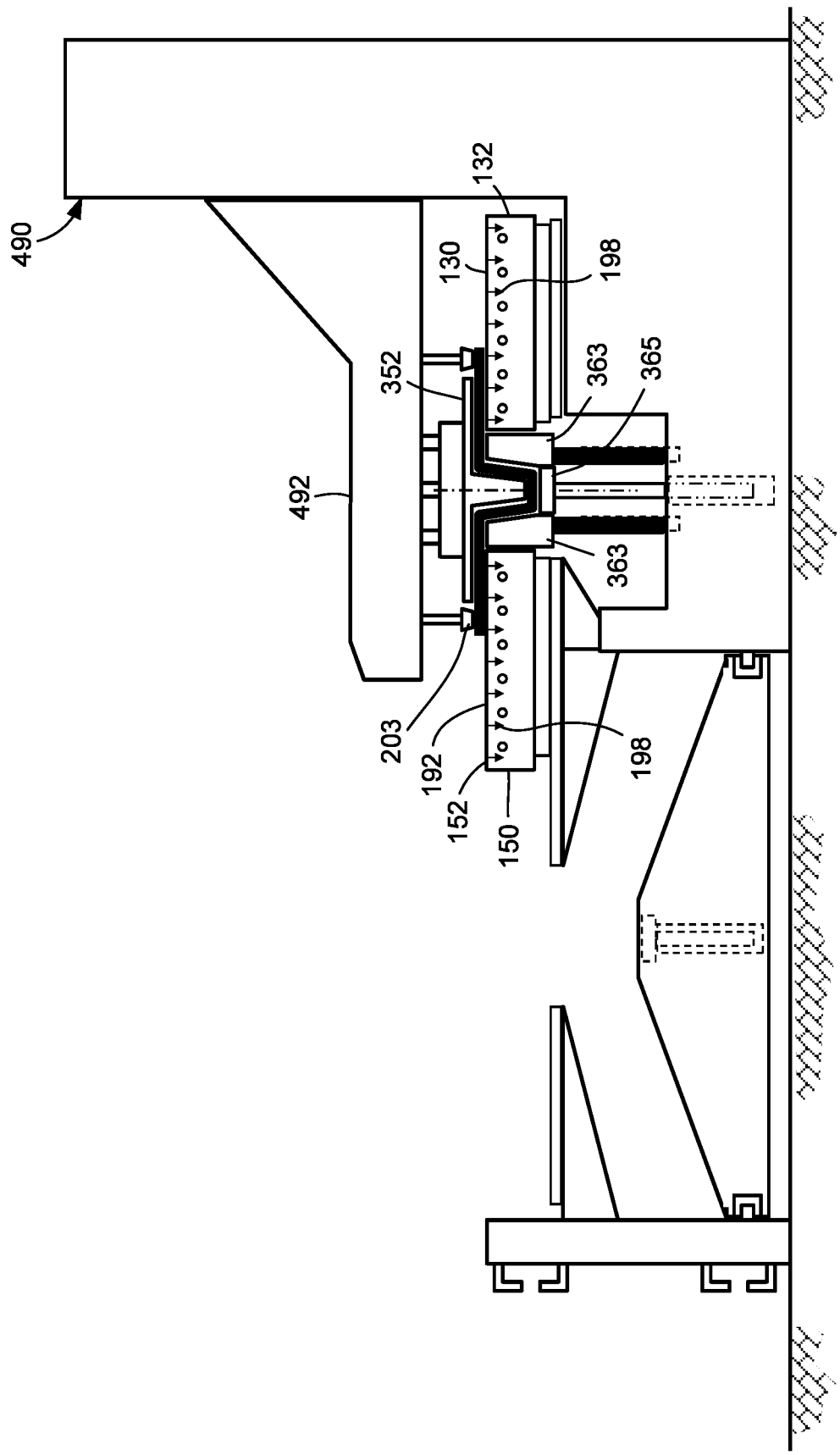
FIG. 69 is a sectional view of the forming station showing the upper forming die after forming the composite laminate against the lower die web portions and lower die cap portion of the lower forming die.

FIG. 69 shows the upper forming die 352 forming the composite laminate 400 against the lower die web portions 363 and lower die cap portion 365 and against the first mandrel surface 132 and second mandrel surface 152. At the completion of forming, the first clamping bar 201 and second clamping bar 203 may be vertically retracted away from the composite laminate 400, and vacuum pressure 198 may be applied to the apertures 192 in the first mandrel surface 132 and second mandrel surface 152 to prevent the composite laminate 400 from lifting off the first mandrel 130 and second mandrel 150 as the upper forming die 352 is vertically retracted. After forming of the composite laminate 400 is complete, the composite laminate 400 may be transferred to another manufacturing station (not shown) for further processing such as for debulking and/or final curing.

In an example of the above-described method 500 (FIG. 36) of manufacturing the composite laminate 400 using the manufacturing system 100 shown in FIGS. 52-69, the method may include transferring the composite laminate 400 between stations such as between the layup station 424 and the trimming station 426 as shown in FIGS. 59-60, and between the trimming station 426 and the forming station 428 as shown in FIGS. 63-64. Transferring the composite laminate 400 between stations may include engaging a portion of the composite laminate 400 with an upper clamping mechanism 450 and/or a lower clamping mechanism 480. For example, the method may include clamping the composite laminate 400 between the cap portion clamp 456 of a plurality of clamping arms 454 located above the composite laminate 400 and a lower clamp member 484 located below the first mandrel 130 and second mandrel 150 as shown in FIGS. 58 and 61, and using the upper clamping mechanism 450 (e.g., the clamping arms 454) and lower clamping mechanism 480 (e.g., the lower clamp member 484) to transfer the composite laminate 400 between stations. Alternatively, the method may include applying vacuum pressure 198 to the lower clamping mechanism 480 (e.g., lower clamp member 484) to secure the composite laminate 400 to the lower clamping mechanism 480 for transferring the composite laminate 400 between stations. The method may include maintaining the composite laminate 400 in alignment with the layup station 424 and forming station 428 when transferring the composite laminate 400 from the layup station 424 to the forming station 428. The composite laminate 400 may be maintained in alignment as a result of the clamping between the upper clamping mechanism 450 and the lower clamping mechanism 480 or through the use of vacuum coupling (e.g., via vacuum pressure 198) of the lower clamping mechanism 480 to the composite laminate 400. Alignment may also may be maintained through the use of vacuum pressure 198 to secure the composite laminate 400 to the first mandrel 130 and/or the second mandrel 150 at each of the stations prior to the retraction of the cap portion clamp 456 and/or the lower clamp member 484 away from the composite laminate 400 (e.g., FIG. 61).

After forming of the composite laminate 400 is complete (e.g., FIG. 69), the composite laminate 400 may be removed from the first mandrel 130 and second mandrel 150 at the forming station 428, and transferred by a transfer mechanism (not shown) from the forming station 428 to a dismount station (not shown) or to a subsequent manufacturing station (not shown) for further processing. The first mandrel 130 and second mandrel 150 may be laterally translated along the lateral rails (FIG. 67) from the forming stand 490 back to the left-hand side of the forming station in preparation for receiving another composite laminate 400 for forming in the forming stand 490.

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A manufacturing system, comprising:
a first mandrel, comprising a first-mandrel surface and a first-mandrel surface edge;
a second mandrel, comprising a second-mandrel surface and a second-mandrel surface edge, wherein
the second mandrel is positionable so that the first-mandrel surface edge and the second-mandrel surface edge abut each other in side-by-side relation and so that a continuous mandrel surface is collectively formed by the first-mandrel surface and the second-mandrel surface, at least for trimming of a composite laminate,
the continuous mandrel surface is devoid of steps, gaps, breaks, interruptions, or discontinuities, and
the second mandrel is configured to translate relative to the first mandrel in a direction, perpendicular to the first-mandrel surface edge, so that the first-mandrel surface edge and the second-mandrel surface edge are spaced apart from each other such that a gap is formed between the first-mandrel surface edge and the second-mandrel surface edge for receiving a forming die for forming the composite laminate; and
at least one laminate-securing mechanism, configured to secure the composite laminate to at least one of the first mandrel and the second mandrel, at least during trimming and forming of the composite laminate, and also configured to non-movably secure the composite laminate to the first mandrel while translating the second mandrel relative to the first mandrel so that the first mandrel is spaced apart from the second mandrel.

2. The manufacturing system of claim 1, wherein the at least one laminate-securing mechanism comprises at least one of:
first apertures formed in the first-mandrel surface, and second apertures, formed in the second-mandrel surface, wherein the first apertures and the second apertures are fluidically coupled to a vacuum source for generating vacuum pressure securing the composite laminate to the first mandrel and the second mandrel; and
at least one pinch mechanism configured to mechanically clamp the composite laminate to at least one of the first-mandrel surface and the second-mandrel surface.

3. The manufacturing system of claim 1, further comprising:
at least one laminate releasing mechanism configured to release the composite laminate from the second-mandrel surface and to enable relative motion between the composite laminate and the second-mandrel surface while translating the second mandrel relative to the first mandrel.

4. The manufacturing system of claim 3, wherein the at least one laminate releasing mechanism comprises:
second apertures formed in the second-mandrel surface and fluidically coupled to a positive-air-pressure source for generating positive air pressure that forces the composite laminate away from the second-mandrel surface to enable the second mandrel to be translated relative to the first mandrel.

5. The manufacturing system of claim 1, further comprising:
an upper forming die, downwardly translatable into contact with a portion of the composite laminate spanning the gap between the first-mandrel surface edge and the second-mandrel surface edge and
the upper forming die configured to urge the composite laminate into the gap for forming the composite laminate.

6. The manufacturing system of claim 5, further comprising:
a lower forming die, movable into the gap between the first-mandrel surface edge and the second-mandrel surface edge and
the lower forming die configured to support the composite laminate against forming pressure applied by the upper forming die.

7. The manufacturing system of claim 1, further comprising:
a forming station configured for forming the composite laminate on the first mandrel and the second mandrel;
at least one of a layup station, configured for laying up the composite laminate on the first mandrel and the second mandrel with the first-mandrel surface edge and the second-mandrel surface edge abutting each other, and a trimming station configured for trimming the composite laminate on the first mandrel and the second mandrel with the first-mandrel surface edge and the second-mandrel surface edge abutting each other; and
an interstation transfer mechanism, configured to transfer the composite laminate from at least one of the layup station or the trimming station to the forming station,
wherein the at least one laminate-securing mechanism is configured to maintain the composite laminate in alignment with the at least one of the layup station or the trimming station and the forming station while the composite laminate is being transferred from the at least one of the layup station or the trimming station to the forming station.

8. The manufacturing system of claim 7, wherein the interstation transfer mechanism comprises interconnected longitudinal rails that extend along the at least one of the layup station or the trimming station and the forming station;

the first mandrel and the second mandrel are configured to be supported on the interconnected longitudinal rails and to translate along the interconnected longitudinal rails while supporting the composite laminate; and the at least one laminate-securing mechanism is configured to maintain the composite laminate in a fixed position on at least one of the first mandrel and the second mandrel when the first mandrel and the second mandrel are translated between the at least one of the layup station or the trimming station and the forming station.

9. The manufacturing system of claim 7, wherein the interstation transfer mechanism comprises an upper clamping mechanism and a lower clamping mechanism, each configured to clamp onto a respective portion of the composite laminate, spanning the gap between the first-mandrel surface edge and the second-mandrel surface edge the upper clamping mechanism and the lower clamping mechanism are configured to transfer the composite laminate between the at least one of the layup station or the trimming station and the forming station while the first mandrel and the second mandrel at each of the at least one of the layup station or the trimming station and the forming station are stationary; and the lower clamping mechanism is configured to move within the gap at the layup station and at the forming station while the composite laminate is being transferred between the at least one of the layup station or the trimming station and the forming station.

10. The manufacturing system of claim 9, wherein the upper clamping mechanism comprises an upper forming die, configured to urge the composite laminate into the gap at the forming station, for forming the composite laminate; and the lower clamping mechanism comprises a lower forming die, configured to support the composite laminate against forming pressure applied to the composite laminate by the upper forming die at the forming station.

11. A manufacturing system, comprising:

a first mandrel, comprising a first-mandrel surface and a first-mandrel surface edge, the first-mandrel surface comprising first apertures;

a second mandrel, comprising a second-mandrel surface and a second-mandrel surface edge, the second-mandrel surface comprising second apertures, wherein the second mandrel is positionable so that the first-mandrel surface edge and the second-mandrel surface edge abut each other and so that a continuous mandrel surface is collectively formed by the first-mandrel surface and the second-mandrel surface, at least for trimming of a composite laminate, and the second mandrel is configured to translate relative to the first mandrel in a direction, perpendicular to the first-mandrel surface edge so that the first-mandrel surface edge and the second-mandrel surface edge are spaced apart and so that a gap is formed between the first-mandrel surface edge and the second-mandrel surface edge for receiving a forming die for forming the composite laminate;

a vacuum pressure source, fluidically coupled at least to the first apertures in the first-mandrel surface and configured to generate vacuum pressure for securing the composite laminate on the first mandrel during at least one of layup, trimming, and forming of the composite laminate and also configured to non-movably secure the composite laminate in a fixed position on the first mandrel while the second mandrel is being translated so that the second mandrel is spaced apart from the first mandrel; and a positive-air-pressure source, fluidically coupled to the second apertures in the second-mandrel surface and configured to generate positive air pressure that urges the composite laminate away from the second-mandrel surface while the second mandrel is being translated relative to the first mandrel so that the second mandrel is spaced apart from first mandrel.

12. A method of using the manufacturing system of claim 1 to manufacture the composite laminate, the method comprising steps of:

positioning the second mandrel so that the second-mandrel surface edge and the first-mandrel surface edge abut each other in side-by-side relation and so that the continuous mandrel surface is collectively formed by first-mandrel surface and the second-mandrel surface, the continuous mandrel surface is devoid of steps, gaps, breaks, interruptions, or discontinuities;

providing the composite laminate on the continuous mandrel surface;

securing the composite laminate to the continuous mandrel surface;

trimming the composite laminate on the continuous mandrel surface;

releasing the composite laminate from the second-mandrel surface after trimming the composite laminate;

translating the second mandrel relative to the first mandrel in a direction, perpendicular to the first-mandrel surface edge so that the first-mandrel surface edge and the second-mandrel surface edge and the second-mandrel surface edge, while continuing to secure the composite laminate to the first-mandrel surface; and forming the composite laminate by urging the composite laminate into the gap.

13. The method of claim 12, wherein the step of forming the composite laminate comprises clamping the composite laminate to at least one of the first-mandrel surface and the second-mandrel surface while forming the composite laminate.

14. The method of claim 13, wherein the step of securing the composite laminate to the continuous mandrel surface comprises at least one of:

applying vacuum pressure to the composite laminate via first apertures formed in the first-mandrel surface, and via second apertures formed in the second-mandrel surface; and mechanically clamping the composite laminate to the first-mandrel surface and/or to the second-mandrel surface using one or more pinch mechanisms.

15. The method of claim 12, wherein the step of releasing the composite laminate from the second-mandrel surface comprises:

forcing air through second apertures, formed in the second-mandrel surface and which are fluidically coupled to a positive-air-pressure source.

16. The method of claim 12, wherein the step of forming the composite laminate comprises:

translating an upper forming die downwardly into contact with the composite laminate; and forcing the composite laminate into the gap using the upper forming die.

17. The method of claim 16, wherein the step of forming the composite laminate further comprises:

moving a lower forming die into the gap between the first-mandrel surface edge and the second-mandrel surface edge prior to translating the upper forming die downwardly into contact with the composite laminate; and supporting, using the lower forming die, the composite laminate against forming pressure applied to the composite laminate by the upper forming die.

18. The method of claim 12, further comprising steps of:
transferring the composite laminate between stations, including a forming station and at least one of a layup station and a trimming station; and
maintaining the composite laminate in alignment with the forming station and the at least one of the layup station and the trimming station when transferring the composite laminate between the forming station and the at least one of the layup station and the trimming station.

19. The method of claim 18, wherein;
the step of transferring the composite laminate between the forming station and the at least one of the layup station and the trimming station comprises translating the first mandrel and the second mandrel between the forming station the at least one of the layup station and the trimming station while supporting the first mandrel and the second mandrel on interconnect longitudinal rails, wherein the intercourse longitudinal rails extend along the forming station and the at one of the layup station and the trimming station; and
the step of maintaining the composite laminate in alignment with the forming station and the at least one of the layup station and the trimming station comprises maintaining the composite laminate in a fixed position on at least one of the first mandrel and the second mandrel when translating the first mandrel and the second mandrel between the forming station and the at least one of the layup station and the trimming station.

20. The method of claim 18, wherein
the step of transferring the composite laminate between the stations comprises a step of engaging, using at least one of an upper clamping mechanism and a lower clamping mechanism, a portion of the composite laminate spanning the gap between the first-mandrel surface edge and the second-mandrel surface edge; and the step of maintaining the composite laminate in alignment with the stations comprises maintaining the composite laminate in alignment with the stations while the first mandrel and the second mandrel are stationary at each of the stations.

21. The method of claim 20, wherein the step of forming the composite laminate comprise:
urging, using the upper clamping mechanism configured as an upper forming die, the composite laminate into the gap at the forming station; and
supporting, using the lower clamping mechanism configured as a lower forming die, the composite laminate against forming pressure applied to the composite laminate by the upper forming die at the forming station.

22. The method of claim 20, wherein the step of engaging the portion of the composite laminate, spanning the gap between the first-mandrel surface edge and the second-mandrel surface edge, comprises
clamping the composite laminate between a lower clamp member and upper clamp modules,
wherein:
the upper clamp modules are pivotably positioned over a top of the composite laminate; and
the lower clamp member is located below the first mandrel and the second mandrel.

23. The method of claim 20, wherein the step of transferring the composite laminate between the stations further comprises:
forcing air through first apertures in the first-mandrel surface, and second apertures in the second-mandrel surface, for floating the composite laminate over the first mandrel and the second mandrel at each of the stations.

24. The method of claim 20, wherein the steps of engaging the portion of the composite laminate spanning the gap between the first-mandrel surface edge and the second-mandrel surface edge, and maintaining the composite laminate in alignment with the stations comprise:
applying vacuum pressure to third apertures in the lower clamping mechanism to secure the composite laminate to the lower clamping mechanism.

\* \* \* \* \*